(12) United States Patent
Kajino et al.

(10) Patent No.: US 8,265,825 B2
(45) Date of Patent: Sep. 11, 2012

(54) SUSPENSION SYSTEM

(75) Inventors: Hideonori Kajino, Nagoya (JP); Ryo Kanda, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 461 days.

(21) Appl. No.: 12/670,478

(22) PCT Filed: Nov. 21, 2008

(86) PCT No.: PCT/JP2008/071750
§ 371 (c)(1),
(2), (4) Date: Jan. 25, 2010

(87) PCT Pub. No.: WO2009/069793
PCT Pub. Date: Jun. 4, 2009

(65) Prior Publication Data
US 2010/0204885 A1 Aug. 12, 2010

(30) Foreign Application Priority Data

Nov. 29, 2007 (JP) ................................ 2007-309187

(51) Int. Cl.
*B60G 17/00* (2006.01)
(52) U.S. Cl. ................. 701/37; 280/124.108; 280/5.515
(58) Field of Classification Search ..................... 701/37, 701/38, 39, 40; 280/5.5, 5.506, 5.507, 5.512, 280/5.515, 5.52, 124.1, 124.108; 73/570, 73/579, 581, 117.03, 862.41, 862.59, 54.25; 188/378, 379, 380
See application file for complete search history.

(56) References Cited

U.S. PATENT DOCUMENTS

| 5,175,687 A | * | 12/1992 | Tsutsumi et al. ................ 701/37 |
| 5,322,320 A | * | 6/1994 | Sahashi et al. ............. 280/5.515 |
| 5,444,621 A | * | 8/1995 | Matsunaga et al. ............. 701/37 |
| 5,497,324 A | | 3/1996 | Henry et al. |

(Continued)

FOREIGN PATENT DOCUMENTS

EP 0 704 328 A2 4/1996

(Continued)

OTHER PUBLICATIONS

International Search Report issued in corresponding International Application No. PCT/JP2008/071750, mailed Mar. 25, 2009.

(Continued)

*Primary Examiner* — Thomas G. Black
*Assistant Examiner* — Ce Li
(74) *Attorney, Agent, or Firm* — Oliff & Berridge, PLC

(57) ABSTRACT

A suspension system including: (a) a vibration obtaining device configured to obtain vertical vibration of each of at least one of a sprung portion and an unsprung portion of a vehicle; (b) a processing device configured to subject the obtained vibration to a phase advance processing, and having a plurality of characteristics different from each other with respect to a degree by which a phase of the obtained vibration is advanced; (c) a characteristic selector configured to select one of the plurality of characteristics, based on frequency of the obtained vibration of each of at least one of the sprung and unsprung portions, whereby the obtained vibration is subjected to the phase advance processing that is performed in accordance with the selected one of the plurality of characteristics of the processing device; and (d) a suspension controller configured to control a suspension disposed between the sprung and unsprung portions, based on the vibration subjected to the phase advance processing.

15 Claims, 26 Drawing Sheets

U.S. PATENT DOCUMENTS

| | | | |
|---|---|---|---|
| 5,570,289 A | | 10/1996 | Stacey et al. |
| 5,697,634 A | * | 12/1997 | Kamimae et al. ...... 280/124.108 |
| 5,781,873 A | * | 7/1998 | Sasaki ............................. 701/37 |
| 5,808,890 A | * | 9/1998 | Sasaki ............................. 701/37 |
| 5,810,384 A | * | 9/1998 | Iwasaki et al. ............. 280/5.515 |
| 5,950,776 A | * | 9/1999 | Iwasaki et al. ............. 188/266.1 |
| 5,979,885 A | * | 11/1999 | Katsuda ................... 267/140.14 |
| 5,987,368 A | * | 11/1999 | Kamimae et al. ............... 701/37 |
| 2004/0150361 A1 | * | 8/2004 | Hio et al. ...................... 318/375 |
| 2005/0178628 A1 | * | 8/2005 | Uchino et al. ................ 188/379 |
| 2005/0212666 A1 | * | 9/2005 | Kawazoe et al. ............. 340/436 |
| 2008/0054540 A1 | * | 3/2008 | Buma ............................ 267/195 |
| 2009/0121444 A1 | * | 5/2009 | Bushko et al. ............. 280/5.507 |

FOREIGN PATENT DOCUMENTS

| | | |
|---|---|---|
| EP | 2 052 885 A2 | 4/2009 |
| JP | B2 3-16281 | 3/1991 |
| JP | A 5-201224 | 8/1993 |
| JP | A 5-319056 | 12/1993 |
| JP | A-6-72121 | 3/1994 |
| JP | A 7-032838 | 2/1995 |
| JP | A 7-089321 | 4/1995 |
| JP | A-7-186660 | 7/1995 |
| JP | A 8-258529 | 10/1996 |
| JP | A-2005-255152 | 9/2005 |

OTHER PUBLICATIONS

Written Opinion of the International Searching Authority issued in corresponding International Application No. PCT/JP2008/071750, mailed Mar. 25, 2009.

Search Report issued in corresponding European Application No. 08 853 199.1, dated Aug. 26, 2010.

Japanese Office Action dated Oct. 4, 2011 issued in Japanese Patent Application No. 2007-309187(with translation).

* cited by examiner

FIG. 10

| OPERATION MODE | MOTOR FORCE GENERATING DIRECTION | DETECTED SIGNALS OF HALL ELEMENTS | | | STATES OF SWITCHING ELEMENTS | | | | | |
|---|---|---|---|---|---|---|---|---|---|---|
| | | HA | HB | HC | WLC | VLC | ULC | WHC | VHC | UHC |
| CONTROLLED-POWER SUPPLYING MODE | CCW DIRECTION | H | L | H | 0 | 0 | 1 * | 0 | 1 | 0 |
| | | H | L | L | 0 | 0 | 1 * | 1 | 0 | 0 |
| | | H | H | L | 0 | 1 * | 0 | 1 | 0 | 0 |
| | | L | H | L | 0 | 1 * | 0 | 0 | 0 | 1 |
| | | L | H | H | 1 * | 0 | 0 | 0 | 0 | 1 |
| | | L | L | H | 1 * | 0 | 0 | 0 | 1 | 0 |
| | CW DIRECTION | H | L | H | 0 | 1 * | 0 | 0 | 0 | 1 |
| | | H | L | L | 1 * | 0 | 0 | 0 | 0 | 1 |
| | | H | H | L | 1 * | 0 | 0 | 0 | 1 | 0 |
| | | L | H | L | 0 | 0 | 1 * | 0 | 1 | 0 |
| | | L | H | H | 0 | 0 | 1 * | 1 | 0 | 0 |
| | | L | L | H | 0 | 1 * | 0 | 1 | 0 | 0 |
| STAND BY MODE | CCW DIRECTION | H | L | H | 0 | 0 | 0 * | 0 | 1 | 0 |
| | | H | L | L | 0 | 0 | 0 * | 1 | 0 | 0 |
| | | H | H | L | 0 | 0 * | 0 | 1 | 0 | 0 |
| | | L | H | L | 0 | 0 * | 0 | 0 | 0 | 1 |
| | | L | H | H | 0 * | 0 | 0 | 0 | 0 | 1 |
| | | L | L | H | 0 * | 0 | 0 | 0 | 1 | 0 |
| | CW DIRECTION | H | L | H | 0 | 0 * | 0 | 0 | 0 | 1 |
| | | H | L | L | 0 * | 0 | 0 | 0 | 0 | 1 |
| | | H | H | L | 0 * | 0 | 0 | 0 | 1 | 0 |
| | | L | H | L | 0 | 0 | 0 * | 0 | 1 | 0 |
| | | L | H | H | 0 | 0 | 0 * | 1 | 0 | 0 |
| | | L | L | H | 0 | 0 * | 0 | 1 | 0 | 0 |
| BRAKING MODE | | | | | 0 | 0 | 0 | 1 | 1 | 1 |
| FREE MODE | | | | | 0 | 0 | 0 | 0 | 0 | 0 |

1 : ON STATE (CLOSED STATE)  
0 : OFF STATE (OPEN STATE)  
H : DETECTED STATE  
L : NON-DETECTED STATE  
1 * : UNDER DUTY CONTROL BY PWM  
0 * : STATE IN WHICH PULSE-ON TIME IS 0 UNDER DUTY CONTROL BY PWM $G \cdot \cos\theta_1 < G \cdot \cos\theta_2$

UNSPRUNG-PORTION-
DISPLACEMENT-BASIS CONTROL

SPRUNG-PORTION-
VELOCITY-BASIS CONTROL $G_S \cdot \cos\theta_S + G_H \cdot \cos\theta_H > 1$

UNSPRUNG-PORTION-
DISPLACEMENT-BASIS CONTROL

SPRUNG-PORTION-
VELOCITY-BASIS CONTROL $G_S \cdot \cos\theta_S + G_H \cdot \cos\theta_H = 1$

L·F$_B$=T$_M$

SUSPENSION SYSTEM

TECHNICAL FIELD

The present invention relates in general to control of a vehicle suspension, and more particularly to processing of vibration that is obtained by a vibration obtaining device.

BACKGROUND ART

JP-H08-258529A discloses an arrangement with a plurality of phase compensation filter means, one of which is selected depending on a resonance frequency of a sprung portion. Specifically, when the resonance frequency is high, one of the filter means which has a characteristic of small phase delay is selected. When the resonance frequency is low, one of the filter means which has a characteristic of large phase delay is selected. In this arrangement, when a load applied to the sprung portion is small and accordingly the resonance frequency is high, it is possible to improve responsiveness and satisfactorily obtain a vibration suppressing effect, by selecting the filter means having the characteristic of small phase delay. JP-H05-319056A discloses an arrangement with phase delaying means and phase advancing means, one of which is selected depending on a frequency of a sprung portion. Specifically, the phase advancing means is selected when the frequency is not lower than a predetermined value, and the phase delaying means is selected when the frequency is lower than the predetermined value, whereby a ride comfort is improved by this arrangement. JP-H07-89321A discloses an arrangement for controlling, based on absolute velocities of respective sprung and unsprung portions, a vertical force generator that is disposed between the sprung and unsprung portions in parallel with a suspension spring and a shock absorber. Specifically, a gain used for the control based on the velocity of the sprung portion and a gain used for the control based on the velocity of the unsprung portion are determined by taking account of a load received by the suspension spring and the shock absorber. Each of JP-H07-32838A, JP-H05-201224A and JP-H03-16281B2 discloses an arrangement for controlling damping characteristics based on, for example, vibration of the sprung portion.

DISCLOSURE OF INVENTION

Object to be Solved by the Invention

The present invention was made in the light of the background art discussed above. It is therefore an object of the invention to provide a suspension system which is configured to process vibration obtained by a vibration obtaining device in a manner different from those disclosed in JP-H08-258529A and JP-1105-319056A whereby the vibration is satisfactorily suppressed irrespective of whether the vibration has high frequency or low frequency. This object may be achieved according to a principle of the invention which is described below.

The principle of the invention provides a suspension system including a suspension system comprising: (a) a vibration obtaining device configured to obtain vertical vibration of each of at least one of a sprung portion and an unsprung portion of a vehicle; (b) a processing device configured to subject the obtained vibration to a phase advance processing, and having a plurality of characteristics different from each other with respect to a degree by which a phase of the obtained vibration is advanced; (c) a characteristic selector configured to select one of the plurality of characteristics, based on frequency of the obtained vibration of each of at least one of the sprung and unsprung portions, whereby the obtained vibration is subjected to the phase advance processing that is performed in accordance with the selected one of the plurality of characteristics of the processing device; and (d) a suspension controller configured to control a suspension disposed between the sprung and unsprung portions, based on the vibration subjected to the phase advance processing.

In the present suspension system, the vertical vibration of each of the at least one of the sprung and unsprung portions of the vehicle is obtained, the obtained vibration is subjected to the phase advance processing performed by the processing device, and the suspension is controlled based on the processed vibration. In general, the suspension initiates working with delay relative to actual vibration due to factors such as response delay of an actuator included in the suspension. Particularly, when the response delay time of the actuator is long, there is a case where it is difficult to satisfactorily suppress the vibration. In such a case, it might be possible to reduce influence of the response delay, by controlling the actuator based on the processed vibration that has been subjected to the phase advance processing. However, for example, where the phase of the vibration is advanced by a degree suitable for suppressing vibration having a frequency equal to or close to a sprung-portion resonance frequency, the vibration could be satisfactorily suppressed if the vibration has the frequency equal to or close to the sprung-portion resonance frequency, but could not be satisfactorily suppressed if the vibration has the frequency equal to or close to an unsprung-portion resonance frequency. On the contrary, where the phase of the vibration is advanced by a degree suitable for suppressing vibration having the frequency equal to or close to the unsprung-portion resonance frequency, the vibration could not be satisfactorily suppressed if the vibration has the frequency equal to or close to the unsprung-portion resonance frequency. In view of such a problem, the processing device included in the present suspension system is arranged to have the plurality of characteristics different from each other with respect to the degree by which the phase of the obtained vertical vibration is advanced, so that one of the plurality of characteristics is selected based on the frequency of the obtained vertical vibration. Consequently, irrespective of whether the frequency of the vibration is close to the sprung-portion resonance frequency or unsprung-portion resonance frequency, the vibration can be satisfactorily suppressed whereby a ride comfort can be improved.

On the other hand, either of the suspension systems disclosed in JP-H08-258529A and JP-H05-319056A does not include a plurality of phase advance filters for advancing the phase of the vibration by respective degrees different from each other and accordingly does not has an arrangement in which one of such a plurality of phase advance filters having different characteristics is selected. In this respect, the suspension systems disclosed in these publications of Japanese Patent Applications are different from the suspension system according to the present invention.

The vibration obtaining device may include only a single sensor or a plurality of sensors. Where the vibration obtaining device includes only a single sensor, the vibration obtaining device may have (i) an arrangement in which a value detected by the single sensor is obtained as the vibration of each of the at least one of the sprung and unsprung portions (hereinafter referred to as "vibration caused in the vehicle", where appropriate), (ii) an arrangement in which the value detected by the single sensor is subjected to processing (such as elimination of noise and elimination of vibration component whose frequency is not higher than a cut-off frequency) and then the processed value is obtained as the vibration caused in the vehicle, (iii) an arrangement in which a differential or integral of the detected value is obtained as the vibration caused in the vehicle, or (iv) an arrangement in which the value obtained as a result of combination of at least two of the above-described processing and calculations (e.g., differentiation and integration) is obtained as the vibration caused in the vehicle. Where the vibration obtaining device includes a plurality of sensors, the vibration obtaining device may have (i) an arrangement in which a value obtained through at least one calculation (that is made based on values detected by the plurality of sensors) is obtained as the vibration caused in the vehicle, or (ii) an arrangement in which the values detected by the sensors or the value obtained through the above-described at least one calculation is subjected to the above-described processing and then the processed value is obtained as the vibration caused in the vehicle. More specifically described, the vibration obtaining device may have (i) an arrangement in which a value detected by a sprung-portion acceleration sensor is subjected to the above-described processing and then the processed value is obtained as an acceleration of the sprung portion of the vehicle, (ii) an arrangement in which an absolute velocity of the sprung portion is obtained by integrating the acceleration of the sprung portion, (iii) an arrangement in which a value (corresponding to a stroke of each of the sprung and unsprung portions relative to each other) is detected by a vertical stroke sensor, and then an amount of displacement of the unsprung portion is obtained by subtracting the value detected by the vertical stroke sensor from a double integral of the value detected by the sprung-portion acceleration sensor. It is noted: that the term "amount of displacement" will be simply referred to as "displacement" where appropriate in the present description.

The frequency of the vibration is obtained by a frequency obtaining device. The frequency obtaining device may be configured to obtain either frequency of the vibration of the sprung portion or frequency of the vibration of the unsprung portion. Further, the frequency obtaining device may be configured to obtain the vibration frequency based on, for example, change of the amount of displacement or absolute velocity of the sprung portion (or the unsprung portion), or may be configured to obtain the vibration frequency by using at least one filter (e.g., band-pass filter). For example, the frequency can be obtained based on the number of times at which the amount of displacement of the sprung or unsprung portion becomes 0 (zero), namely, the sprung or unsprung portion is positioned in its reference position within a predetermined length of time, or based on the number of times at which the absolute velocity becomes 0 (zero), namely, an amount of displacement of the sprung or unsprung portion from its reference position is maximized within a predetermined length of time. Further, it is possible to use a band-pass filter that passes vibration components having frequencies within a predetermined range, so as to obtain outputs of the filter as vibration components having frequencies within the predetermined range.

The suspension is controlled based on, for example, the vibration of the sprung or unsprung portion or vibrations of the sprung and unsprung portions. The processing device is configured to subject an input signal (i.e., vibration obtained by the vibration obtaining device) to the phase advance processing, and has the plurality of characteristics different from each other with respect to the degree by which the phase of the input signal is advanced. The processing device may include a plurality of processing portions having respective characteristics different from each other, or may include a single processing portion having a plurality of characteristics different from each other. The processing device may include at least one filter having a differentiating element. The at least one filter of the processing device may consist of a plurality of filters having respective characteristics different from each other, or may consist of a single filter having a plurality of characteristics different from each other so that the input signal can be processed by a selected one or ones of the different characteristics. Where each of the at least one filter is a digital filter, for example, the characteristic of the digital filter can be changed by changing at least one coefficient used in calculation performed by the filter. Further, the characteristic may be changed either in a continuous or intermittent manner.

Where the processing device includes the plurality of processing portions, the characteristic selector selects one of the processing portions, so that one of the characteristics is selected by selecting one of the processing portions. Where the processing device includes the single processing portion, the characteristic selector selects one of the plurality of characteristics of the processing portion. Where the processing device includes the digital filter, one of the characteristics is selected by selecting or determining the at least one coefficient. Further, where the suspension is controller based on vibration of the sprung portion, one of the characteristics may be selected based on frequency of the vibration of the sprung portion. Where the suspension is controlled based on vibration of the unsprung portion, one of the characteristics may be selected based on frequency of the vibration of the unsprung portion. However, the characteristic may be selected based on the frequency of the vibration of either the sprung or unsprung portion, irrespective of whether the suspension is controlled based on the vibration of the sprung or unsprung portion. Since there is a certain relationship between the vibration of the sprung portion and the vibration of the unsprung portion, it is possible to obtain the frequency of vibration of one of the sprung and unsprung portions based on the frequency of vibration of the other of the sprung and unsprung portions.

MODES OF THE INVENTION

There will be described various modes of the invention deemed to contain claimable features for which protection is sought. Each of these modes of the invention is numbered like the appended claims and depends from the other mode or modes, where appropriate, for easier understanding of the technical features disclosed in the present specification. It is to be understood that the present invention is not limited to the technical features or any combinations thereof which will be described, and shall be construed in the light of the following descriptions of the various modes and preferred embodiments of the invention. It is to be further understood that a plurality of elements or features included in any one of the following modes of the invention are not necessarily provided all together, and that the invention may be embodied with selected at least one of the elements or features described with respect to the same mode. It is to be still further understood that a plurality of elements or features included in any one of the following modes of the invention may be combined with at least one additional element or feature in the light of the following descriptions of the various modes and the preferred embodiments of the invention, and that the invention may be embodied with such a possible combination with respect to the same mode.

(1) A suspension system including: (a) a vibration obtaining device configured to obtain vertical vibration of each of at least one of a sprung portion and an unsprung portion of a vehicle; (b) a processing device configured to subject the obtained vibration to a phase advance processing, and having a plurality of characteristics different from each other with respect to a degree by which a phase of the obtained vibration is advanced; (c) a characteristic selector configured to select one of the plurality of characteristics, based on frequency of the obtained vibration of each of at least one of the sprung and unsprung portions, whereby the obtained vibration is subjected to the phase advance processing that is performed in accordance with the selected one of the plurality of characteristics of the processing device; and (d) a suspension controller configured to control a suspension disposed between the sprung and unsprung portions, based on the vibration subjected to the phase advance processing.

(2) The suspension system according to mode (1), wherein the vibration obtaining device includes an unsprung-portion vibration obtaining portion configured to obtain the vibration of the unsprung portion, wherein the processing device has first and second characteristics as the plurality of characteristics, such that the phase of the obtained vibration is advanced by a larger degree when the phase advance processing is performed in accordance with the second characteristic, than when the phase advance processing is performed in accordance with the first characteristic, and where the characteristic selector includes a frequency-basis selecting portion configured to select the first characteristic when the frequency of the obtained vibration of the unsprung portion is lower than a predetermined threshold value, and to select the second characteristic when the frequency of the obtained vibration of the unsprung portion is not lower than the predetermined threshold value, such that the obtained vibration of the unsprung portion is subjected to the phase advance processing that is performed in accordance with the first characteristic when the frequency of the obtained vibration of the unsprung portion is lower than the predetermined threshold value, and such that the obtained vibration of the sprung portion is subjected to the phase advance processing that is performed in accordance with the second characteristic when the frequency of the obtained vibration of the unsprung portion is not lower than the predetermined threshold value.

In the suspension system according to this mode (2), one of the first and second characteristics of the processing device is selected based on the frequency of the vibration of the unsprung portion. In each of the suspension systems disclosed in JP-1108-258529A and JP-H05-319056A, on the other hand, the characteristic is selected based on the frequency of the vibration of the sprung portion.

(3) The suspension system according to mode (2), wherein the suspension controller includes: (d-1) a first unsprung-portion-vibration-basis controlling portion configured, when the frequency of the obtained vibration of the unsprung portion is lower than the predetermined threshold value, to control the suspension based on the vibration of the unsprung portion that has been subjected to the phase advance processing performed in accordance with the first characteristic of the processing device; and (d-2) a second unsprung-portion-vibration-basis controlling portion configured, when the frequency of the obtained vibration of the unsprung portion is not lower than the predetermined threshold value, to control the suspension based on the vibration of the unsprung portion that has been subjected to the phase advance processing performed in accordance with the second characteristic of the processing device.

When the frequency of the vibration of the unsprung portion is high, the second characteristic is selected so that the suspension is controlled based on the vibration that has been subjected to the phase advance processing in accordance with the second characteristic in which the phase of the vibration is advanced by a large degree. Consequently, the vibration of high frequency can be satisfactorily suppressed by the thus controlled suspension. When the frequency of the vibration of the unsprung portion is low, the first characteristic is selected so that the suspension is controlled based on the vibration that has been subjected to the phase advance processing in accordance with the first characteristic in which the phase of the vibration is advanced by a small degree. Consequently, the vibration of low frequency can be satisfactorily suppressed by the thus controlled suspension. Thus, the vibration can be satisfactorily suppressed irrespective of whether the vibration frequency is high or low.

(4) The suspension system according to mode (2) or (3), wherein the vibration obtaining device includes a sprung-portion vibration obtaining portion configured to obtain the vertical vibration of the sprung portion, wherein the processing device has a third characteristic as one of the plurality of characteristics, such that the phase of the obtained vibration is advanced by a smaller degree when the phase advance processing is performed in accordance with the third characteristic, than when the phase advance processing is performed in accordance with the second characteristic, and wherein the suspension controller includes an sprung-portion-vibration-basis controlling portion configured to control the suspension based on the vibration of the sprung portion that has been subjected to the phase advance processing performed in accordance with the third characteristic of the processing device.

It is common that the sprung-portion resonance frequency is lower than the unsprung-portion resonance frequency. Therefore, when the suspension is controlled to suppress the vibration of the sprung portion, the third characteristic is selected so that the suspension is controlled based on the vibration that has been subjected to the phase advance processing in accordance with the third characteristic in which the phase of the vibration is advanced by a small degree. The third characteristic, which causes the phase of the obtained vibration to be advanced by a smaller degree than the second characteristic, may be the same to or different from the first characteristic with respect to a degree by which the phase is advanced.

(5) The suspension system according to mode (4), wherein the suspension controller includes: (d-1) a first unsprung-portion-vibration-basis controlling portion configured, when the frequency of the obtained vibration of the unsprung portion is lower than the predetermined threshold value, to control the suspension based on the vibration of the unsprung portion that has been subjected to the phase advance processing performed in accordance with the first characteristic of the processing device; and (d-2) a second unsprung-portion-vibration-basis controlling portion configured, when the frequency of the obtained vibration of the unsprung portion is not lower than the predetermined threshold value, to control the suspension based on the vibration of the unsprung portion that has been subjected to the phase advance processing performed in accordance with the second characteristic of the processing device, the suspension system including (e) a frequency-basis controlling-portion selector including at least one of (e-1) a first selecting portion configured, when the frequency of the obtained vibration of the unsprung portion is lower than the predetermined threshold value, to select the sprung-portion-vibration-basis controlling portion and the first unsprung-portion-vibration-basis controlling portion and (e-2) a second selecting portion configured, when the frequency of the obtained vibration of the unsprung portion is not lower than the predetermined threshold value, to select the second unsprung-portion-vibration-basis controlling portion, such that the suspension is controlled by cooperation of the sprung-portion-vibration-basis controlling portion and the first unsprung-portion-vibration-basis controlling portion when the frequency of the obtained vibration of the unsprung portion is lower than the predetermined threshold value, and such that the suspension is controlled by the second unsprung-portion-vibration-basis controlling portion when the frequency of the obtained vibration of the unsprung portion is not lower than the predetermined threshold value.

Where the vibration of the sprung portion is subjected to the phase advance processing in accordance with the third characteristic, irrespective of a value of the frequency of the vibration of the sprung portion, the vibration of the sprung portion is difficult to be suppressed by the sprung-portion-vibration-basis controlling portion when the vibration of the sprung portion has a high frequency. In the suspension system according to this mode (5), the vibration of the sprung portion having the high frequency can be suppressed by suppressing the vibration of the unsprung portion having a high frequency through the second unsprung-portion-vibration-basis controlling portion of the suspension controller. Further, in the suspension system according to this mode (5), when the frequency of the obtained vibration of the sprung portion is lower than the predetermined threshold value, the sprung-portion-vibration-basis controlling portion and the first unsprung-portion-vibration-basis controlling portion are both selected, so that the vibration of the sprung portion is suppressed through the sprung-portion-vibration-basis controlling portion while the vibration of the unsprung portion is suppressed through the first unsprung-portion-vibration-basis controlling portion, whereby a ride comfort of the vehicle can be improved. Even if the vibration of the sprung portion could not be sufficiently suppressed through the sprung-portion-vibration-basis controlling portion, the vibration of the sprung portion could be satisfactorily suppressed as long as the vibration of the unsprung portion is suppressed through the first unsprung-portion-vibration-basis controlling portion. It is noted that, when the frequency of the obtained vibration of the sprung portion is not lower than the predetermined threshold value, one of the second unsprung-portion-vibration-basis controlling portion and the sprung-portion-vibration-basis controlling portion may be selected, because the sprung-portion-vibration-basis controlling portion could be effective, depending on the predetermined threshold value.

(6) The suspension system according to mode (4) or (5), wherein the suspension controller includes: (d-1) a first unsprung-portion-vibration-basis controlling portion configured to control the suspension based on the vibration of the unsprung portion that has been subjected to the phase advance processing performed in accordance with the first characteristic of the processing device; and (d-2) a second unsprung-portion-vibration-basis controlling portion configured to control the suspension based on the vibration of the unsprung portion that has been subjected to the phase advance processing performed in accordance with the second characteristic of the processing device, the suspension system including (f) a resonance-frequency-basis controlling-portion selector including at least one of (f-1) a first selecting portion configured, when the frequency of the obtained vibration of the unsprung portion is in a first frequency range including a resonance frequency of the sprung portion, to select the sprung-portion-vibration-basis controlling portion and the first unsprung-portion-vibration-basis controlling portion and (f-2) a second selecting portion configured, when the frequency of the obtained vibration of the unsprung portion is in a second frequency range including a resonance frequency of the unsprung portion, to select the second unsprung-portion-vibration-basis controlling portion, such that the suspension is controlled by cooperation of the sprung-portion-vibration-basis controlling portion and the first unsprung-portion-vibration-basis controlling portion when the frequency of the obtained vibration of the unsprung portion is in the first frequency range, and such that the suspension is controlled by the second unsprung-portion-vibration-basis controlling portion when the frequency of the obtained vibration of the unsprung portion is in the second frequency range.

It is preferable that the first characteristic is adapted to enable the processing device to output the vibration (signal) processed suitably for suppressing the vibration whose frequency is in the first frequency range including the sprung-portion resonance frequency, and that the second characteristic is adapted to enable the processing device to output the vibration (signal) processed suitably for suppressing the vibration whose frequency is in the second frequency range including the unsprung-portion resonance frequency.

According to this preferable arrangement, irrespective of whether the frequency of the vibration is in the first or second range, the vibration can be satisfactorily suppressed by selecting one of the first and second characteristics, whereby deterioration of the ride comfort can be restrained. The sprung-portion resonance frequency is a value dependent on specification of the vehicle such as weight of the sprung portion, and is changed with change in weight of luggage loaded on the vehicle and/or weight of passenger riding on the vehicle. It is therefore preferable that the above-described first frequency range is a range in which the sprung-portion resonance frequency lies substantially at a center of the range in a standard loading state, so that the vibration of the sprung portion can be satisfactorily suppressed even in the event of change in the weight of luggage and/or the weight of passenger.

(7) The suspension system according to any one of modes (4)-(6), wherein the suspension controller includes: (d-1) a first unsprung-portion-vibration-basis controlling portion configured to control the suspension based on the vibration of the unsprung portion that has been subjected to the phase advance processing performed in accordance with the first characteristic of the processing device; and (d-2) a second unsprung-portion-vibration-basis controlling portion configured to control the suspension based on the vibration of the unsprung portion that has been subjected to the phase advance processing performed in accordance with the second characteristic of the processing device, wherein the sprung-portion-vibration-basis controlling portion includes a sprung-portion-vibration-directed-gain-basis controlling portion configured to control the suspension based on a sprung-portion-vibration-directed gain, wherein the first unsprung-portion-vibration-basis controlling portion includes an unsprung-portion-vibration-directed-gain-basis controlling portion configured to control the suspension based on an unsprung-portion-vibration-directed gain, and wherein the unsprung-portion-vibration-directed gain is larger than the sprung-portion-vibration-directed gain when the first unsprung-portion-vibration-basis controlling portion cooperates with the sprung-portion-vibration-basis controlling portion to control the suspension.

When the suspension is controlled by cooperation of the sprung-portion-vibration-basis controlling portion and the first unsprung-portion-vibration-basis controlling portion, the gain used in the first unsprung-portion-vibration-basis controlling portion is larger than the gain used in the sprung-portion-vibration-basis controlling portion. An experiment or simulation conducted by the present inventors reveled that, when the suspension is controlled by cooperation of the sprung-portion-vibration-basis controlling portion and unsprung-portion-vibration-basis controlling portion, a vibration suppressing effect can be obtained more satisfactorily with the arrangement in which the gain used in the unsprung-portion-vibration-basis controlling portion is larger than the gain used in the spring-portion-vibration-basis controlling portion.

It is preferable that the sprung-portion-vibration-directed gain is a value selected from a range of 0.1 to 1.5, and that the unsprung-portion-vibration-directed gain is a value selected from a range of 0.3 to 1.5 and larger than the value of the sprung-portion-vibration-directed gain.

According to this preferable arrangement, the sprung-portion-vibration-directed gain is preferably not larger than 1.2, more preferably not larger than 1.0, still more preferably not larger than 0.8, and is preferably not smaller than 0.2, more preferably not smaller than 0.4. The unsprung-portion-vibration-directed gain is preferably not larger than 1.3, more preferably not larger than 1.1, still more preferably not larger than 0.9, and is preferably not smaller than 0.3, more preferably not smaller than 0.5. Where each of the values of the sprung-portion-vibration-directed and unsprung-portion-vibration-directed gains is smaller than 1.0, an output of the actuator can be made smaller and a consumed energy can be made smaller, than where each of the values of the sprung-portion-vibration-directed and unsprung-portion-vibration-directed gains is not smaller than 1.0. It is noted that the value of each of the gains may be either a predetermined fixed value or a variable value that is variable depending on state of the vibration and/or state of running of the vehicle.

(8) The suspension system according to any one of modes (1)-(7), wherein the vibration obtaining device includes an unsprung-portion vibration predicting portion configured to predict, based on at least one value detected by at least one sensor which is provided in the vehicle and which is configured to detect a detected portion, the vertical vibration of a wheel holding portion of the unsprung portion which holds a wheel of the vehicle and which is located on a rear side of the detected portion, and wherein the suspension controller includes a preview controlling portion configured to control, based on the predicted vibration of the wheel holding portion of the unsprung portion, the suspension that is provided for the wheel.

(9) The suspension system according to mode (8), wherein the suspension controller includes: (d-1) a first unsprung-portion-vibration-basis controlling portion configured to control the suspension based on the vibration of the unsprung portion that has been subjected to the phase advance processing performed in accordance with the first characteristic of the processing device; and (d-2) a second unsprung-portion-vibration-basis controlling portion configured to control the suspension based on the vibration of the unsprung portion that has been subjected to the phase advance processing performed in accordance with the second characteristic of the processing device, the suspension system including: (g) a preview-control effectiveness judger configured to judge whether the suspension is effectively controllable by the preview controlling portion; and (h) an effectiveness-basis controlling-portion selector which is configured, when it is judged by the judger that the suspension is effectively controllable by the preview controlling portion, to select the preview controlling portion and the sprung-portion-vibration-basis controlling portion, and which is configured, when the suspension is not effectively controllable by the preview controlling portion, to select ($\alpha$) the sprung-portion-vibration-basis controlling portion and/or ($\beta$) an unsprung-portion-vibration-basis controlling portion that is provided by one of the first and second unsprung-portion-vibration-basis controlling portions.

Where the at least one sensor provided in the vehicle is at least one road sensor configured to detect conditions (e.g., projections and recesses) of the detected portion in the form of a portion of a road surface, a preview control can be effectively performed when the wheel (for which the controlled suspension is provided) passes over the detected portion of the road surface which is detected by the road sensor. Where the at least one sensor is at least one sensor configured to detect vertical vibration of a front-wheel side portion of the vehicle, the preview control can be effectively performed when a rear wheel as the wheel (for which the controlled suspension is provided) passes over a portion of the road surface which has provided the front-wheel side portion with the detected vertical vibration, namely, when substantially the same vibration as the detected vibration of the front-wheel side portion is caused in a rear-wheel side portion of the vehicle. When the vehicle is being turned, it is common that path of the detected portion and path of the wheel (for which the controlled suspension is provided) are different from each other so that the preview control cannot be necessarily performed satisfactorily. Further, when the vehicle is running at a considerably high speed, a control command value cannot be necessarily prepared. In the present embodiment, when the vehicle is being turned and/or the vehicle is running at a speed higher than a predetermined value, it is judged that the preview control is not effectively performable, whereby the preview control is inhibited from being carried out. In the suspension system according to this mode (11), when the preview control is not carried out, the suspension is controlled by (i) the sprung-portion-vibration-basis controlling portion, (ii) the unsprung-portion-vibration-basis controlling portion, or (iii) the sprung-portion-vibration-basis controlling portion and unsprung-portion-vibration-basis controlling portion. In any one of these cases, the vibration can be satisfactorily performed although the preview control is not carried out.

(10) The suspension system according to mode (8) or (9), wherein the unsprung-portion vibration predicting portion includes a phase delaying portion that is configured to delay the phase of the predicted vibration of the wheel holding portion of the unsprung portion, by an amount corresponding to a length of time that is dependent on a running speed of the vehicle and a response delay time by which initiation of working of the suspension in accordance with a control command value is to be retarded after output of the control command value supplied to the suspension.

(11) The suspension system according to any one of modes (1)-(10), wherein the suspension includes a vertical force generator which is disposed between the sprung and unsprung portions and which is configured to generate a vertical force, and wherein the suspension controller includes a vertical-force-generator controlling portion configured to control the vertical force by electrically controlling the vertical force generator.

The vertical force generator is disposed between the sprung and unsprung portions, and is configured to generate the vertical force. The vertical force is a force acting in a direction containing a component of a vertical direction of the vehicle. Thus, the vertical force does not have to act precisely in the vertical direction, but may act in a direction somewhat inclined with respect to the vertical direction. The acting direction of the vertical force generated by the vertical force generator is dependent on, for example, construction for connection of the unsprung portion with the vehicle body and wheel and construction for connection of the vertical force generator with the unsprung portion. Where the unsprung portion is pivotable in the vertical direction and is unmovable (unpivotable) in the longitudinal direction and lateral direction of the vehicle, the generated force may be considered to act in the vertical direction. The vertical force may serve also as a damping force or an elastic force, as described below.

(12) The suspension system according to mode (11), wherein the vertical force generator includes a damping force generator configured to generate a damping force, wherein the vibration obtaining device is configured to obtain an absolute vertical velocity of the sprung portion and a relative vertical velocity of the sprung and unsprung portions, wherein the vertical-force-generator controlling portion includes a target-clamping-force determining portion and a damping-force controlling portion, wherein the target-damping-force determining portion is configured to determine a target damping force based on at least one of the absolute vertical velocity of the sprung portion and the relative vertical velocity of the sprung and unsprung portions, and wherein the damping-force controlling portion is configured to control the damping force generator such that the damping force generator outputs the target damping force determined by the target-damping-force determining portion.

In the suspension system according to this mode (12), the damping force is generated by controlling the vertical force generator, and the vertical vibration is suppressed by the generated damping force. An amount of the generated damping force may be an amount corresponding to the absolute velocity of the sprung portion or an amount corresponding to the relative velocity of the sprung and unsprung portions. A damping coefficient can be obtained based on the absolute velocity of the sprung portion and/or the relative velocity of the sprung and unsprung portions. It is noted that the amount of the damping force may be an amount corresponding to the absolute velocity of the unsprung portion, too. In this case, the damping coefficient may be a constant value.

(13) The suspension system according to mode (11) or (12), wherein the vertical force generator includes an elastic force generator configured to generate an elastic force, wherein the vibration obtaining device is configured to obtain an amount of vertical displacement of the unsprung portion, based on an amount of vertical displacement of the sprung portion and an amount of relative vertical displacement of the sprung and unsprung portions, wherein the vertical-force-generator controlling portion includes a target-elastic-force determining portion and an elastic-force controlling portion, wherein the target-elastic-force determining portion is configured to determine a target elastic force based on the amount of the vertical displacement of the unsprung portion, and wherein the elastic-force controlling portion is configured to control the elastic force generator such that the elastic force generator outputs the target elastic force determined by the target-elastic-force determining portion.

In the suspension system according to this mode (13), the elastic force is generated by controlling the vertical force generator, so as to suppress the vertical vibration of the wheel or the wheel holding portion of the unsprung portion which holds the wheel.

(14) The suspension system according to any one of modes (11)-(13), wherein the vertical force generator includes an elastic member having opposite end portions such that one of the opposite end portions is connected to the sprung portion while the other of the opposite end portions is connected to the unsprung portion, wherein the vertical force generator includes a drive source configured to elastically deform the elastic member against a restoring force of the elastic member, and wherein the vertical-force-generator controlling portion includes an elastic-deformation-amount controlling portion configured to control an amount of elastic deformation of the elastic member by controlling the drive source, so as to control the vertical force.

(15) The suspension system according to mode (14), wherein the elastic member is a generally L-shaped bar including a laterally extending portion extending in a lateral direction of the vehicle and a non-parallel portion extending in a direction that is not parallel with the lateral direction, and wherein the drive source includes an electric motor configured to rotate one of the laterally extending and non-parallel portions about an axis thereof, so as to apply a torsional moment to the one of the laterally extending and non-parallel portions.

(16) The suspension system according to mode (14) or (15), wherein the elastic member is a rod extending in a lateral direction of the vehicle or in, a direction that is not parallel with the lateral direction, and wherein the drive source includes an electric motor configured to apply a bending moment to the rod.

The elastic member may be provided by either a member having a L shape as seen in the vertical direction or a member extending straight as seen in the vertical direction. In other words, the elastic member may have a vertically curved shape.

(17) The suspension system according to any one of modes (11)-(16), wherein the vertical force generator includes a first elastic member disposed in parallel with a suspension spring that serves as a second elastic member, and wherein the suspension spring as well as the first elastic member is disposed between the sprung portion and the unsprung portion.

In the suspension system according to this mode (17), the suspension spring as the second elastic member, in addition to the elastic member of the vertical force generator as the first elastic member, is disposed between the sprung and unsprung portions. The first elastic member included in the vertical force generator is elastically deformed by the drive source, whereby the vertical force is generated. Meanwhile, the suspension spring as the second elastic member is elastically deformed by, for example, a load applied to the wheel, rather than by a drive source. The load applied to the wheel is received by the first elastic member (included in the vertical force generator) and the second elastic member (provided by the suspension spring). However, in a state in which the drive source is not being activated so that the elastic member is not elastically deformed, the load is received by the second elastic member since substantially no force is applied to the first elastic member. This state is a reference state of the drive source of the vertical force generator. In the reference state, a distance between the sprung and unsprung portions is dependent on the load applied to the wheel, and is made smaller when the applied load is large than when the load is small.

For example, when an electric motor of the drive source is rotated in a certain direction from the reference state, the distance between the sprung and unsprung portions is increased. In this instance, the elastic force of the first elastic member (included in the vertical force generator) and the elastic force of the second elastic member (provided by the suspension spring) act in the same direction. When the elastic force of the second elastic member is reduced as a result of increase in the distance between the sprung and unsprung portions, the elastic force of the first elastic member is increased, so that a sum of the elastic forces of the first and second elastic members is held in an amount corresponding to the load.

When the electric motor is rotated in a direction opposite to the above-described certain direction from the reference state, the distance between the sprung and unsprung portions is reduced. In this instance, the elastic force of the first elastic member and the elastic force of the second elastic member act in respective directions that are opposite to each other. When the elastic force of the second elastic member is increased as a result of reduction in the distance between the sprung and unsprung portions, the elastic force of the first elastic member (acting in the direction opposite to the direction of the elastic force of the second elastic member) is increased.

Where the elastic member is the L-shaped bar, one (hereinafter referred to as "arm portion") of the laterally extending and non-parallel portions is pivoted by rotation of the other (hereinafter referred to as "shaft portion") of the laterally extending and non-parallel portions about its axis, whereby the distance between the sprung and unsprung portions is changed. Further, upon twisting deformation or torsion of the shaft portion, a torsional moment (that is a torque applied by the electric motor) applied to the shaft potion and a bending moment applied to the arm portion become equal to each other, so that the vertical force whose amount is dependent on the equalized moments is applied to the unsprung portion.

Where the elastic member is the straight rod, a torque and a bending moment applied to the rod by the electric motor become equal to each other, so that the vertical force whose amount is dependent on the equalized torque and moment is applied to the unsprung portion.

Irrespective of whether the elastic member is the L-shaped bar or the straight rod, the vertical force generator generates the vertical force whose amount is dependent on the equalized torque and moment to the elastic member (provided that the torsional stress and the bending strength concurrently reach an allowable stress).

Where the elastic member is the L-shaped bar, the arm portion is pivoted by rotation of the shaft portion about its axis. Where the elastic member is the straight rod, the straight rod is rotated directly by the electric motor. Therefore, the arrangement with the elastic member provided by the L-shaped bar is advantageous over the arrangement with the elastic member provided by the straight rod, since the drive source can be provided in a portion of the vehicle body (i.e., sprung portion) which is more distant from the wheel in the former arrangement than in the latter arrangement.

BRIEF DESCRIPTION OF DRAWINGS

The above and other objects, features, advantages and technical and industrial significance of the present invention will be better understood by reading the following detailed description of presently preferred embodiments of the invention, when considered in connection with the accompanying drawings, in which:

FIG. 10 is a table showing operational states of respective switching elements of the inverter in each operational mode of the electric motor;

BEST MODE FOR CARRYING OUT THE INVENTION

There will be described embodiments of the present invention, by reference to the accompanying drawings. It is to be understood that the present invention is not limited to the following embodiments, and may be otherwise embodied with various changes and modifications, such as those described in the foregoing "MODES OF THE INVENTION", which may occur to those skilled in the art.

Figure 1A:
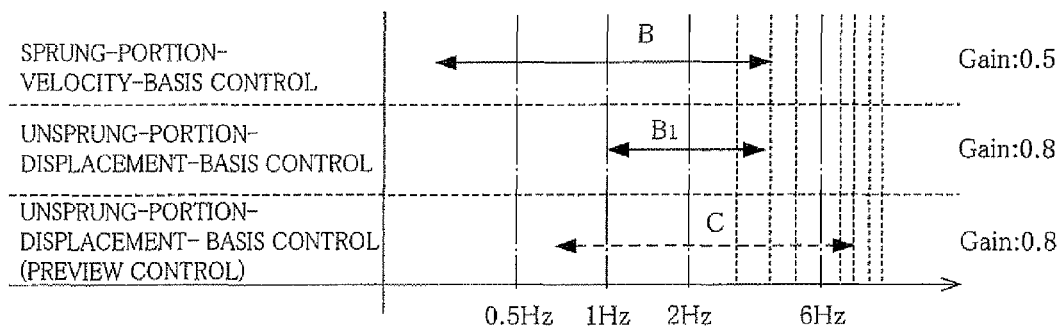
FIGS. 1A and 1B are views showing frequency ranges in control of a suspension performed in a suspension system that is constructed according to an embodiment of the invention.
Figure 1B:
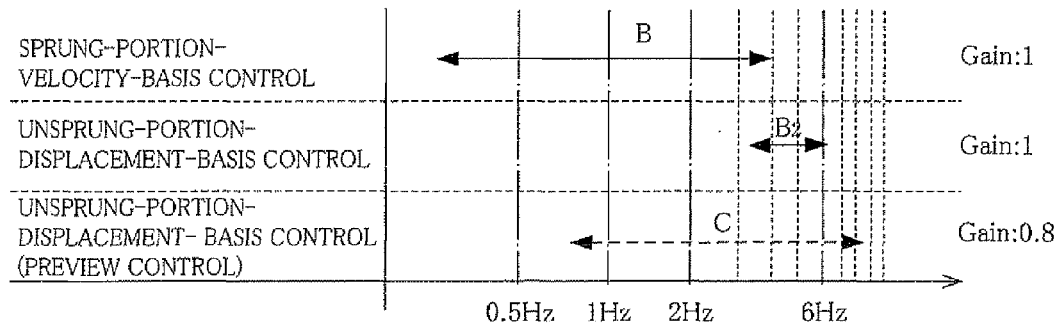
Figure 2:
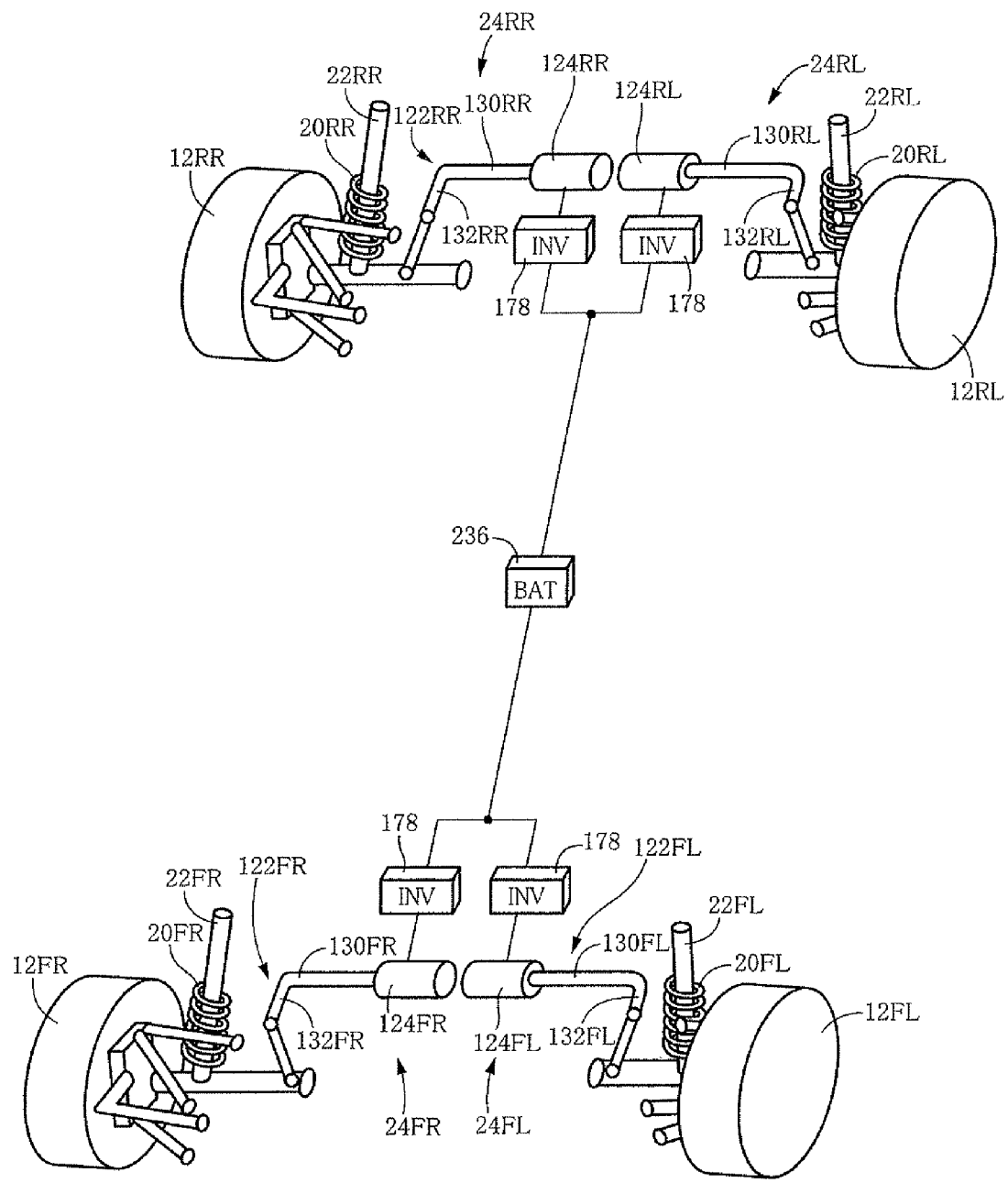
FIG. 2 is a view conceptually showing an entirety of the suspension system.
Figure 3:
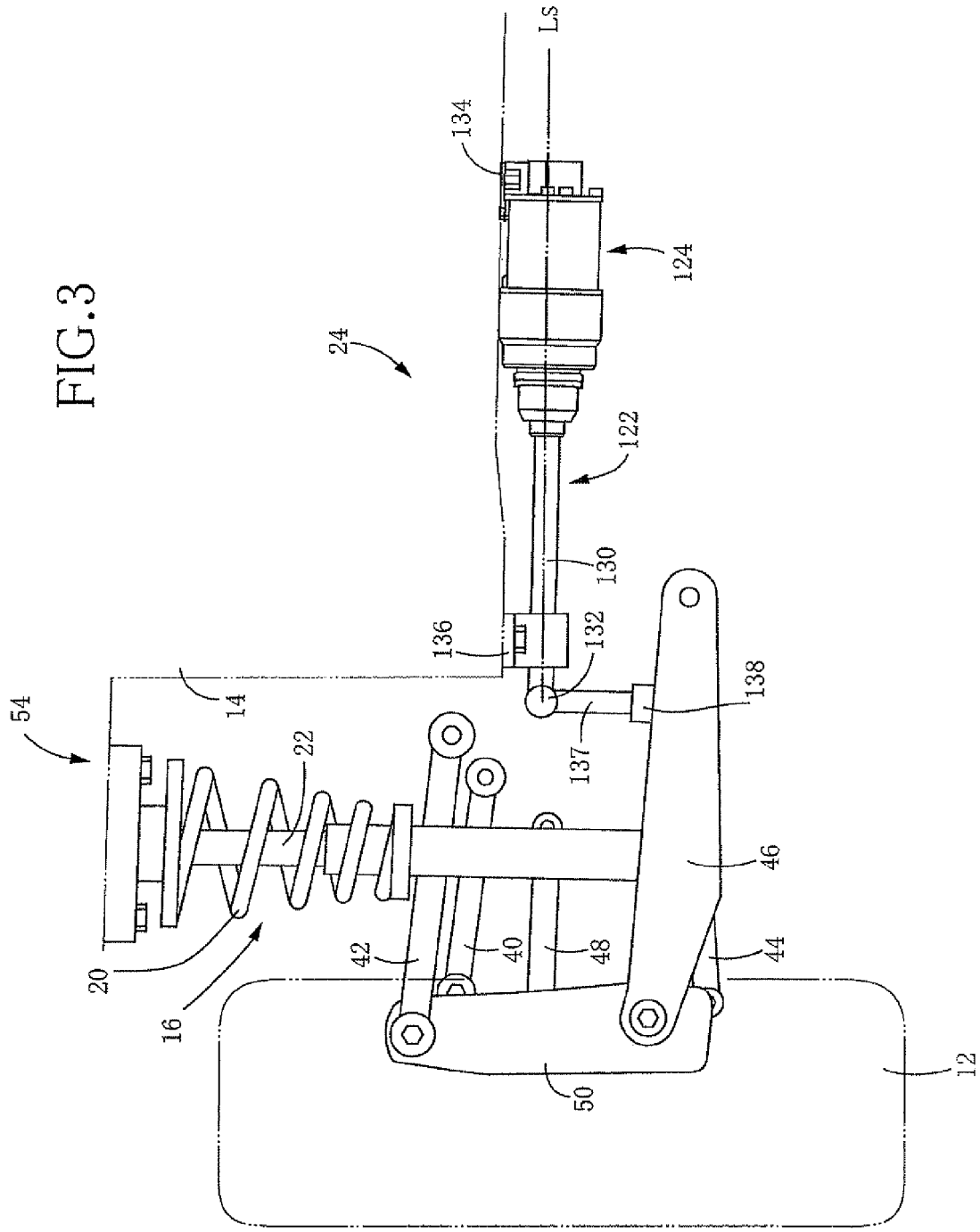
FIG. 3 is a side view of a vertical force generator included in the suspension system.

Referring to FIGS. 1 to 26, there will be described a suspension system which is constructed according to an embodiment of the invention and which includes a suspension controller. As shown in FIGS. 2 and 3, a suspension 16 is provided between a vehicle body 14 as a sprung portion of the vehicle and each of front right, front left, rear right and rear left wheels 12FR, 12FL, 12RR, 12RL of the vehicle. The suspension 16 includes a coil spring 20 as a suspension spring, a shock absorber 22 and a vertical force generator 24. In the following description, each of the wheel 12, coil spring 20, shock absorber 22 and vertical force generator 24 will be referred together with, as a suffix, one of reference signs FR, FL, RR, RL indicative of the respective front right, front left, rear right and rear left wheels, where it should be clarified which one of the four wheels the referred coil spring 20, shock absorber 22 or vertical force generator 24 corresponds to. Further, each of the wheel 12, coil spring 20, shock absorber 22 and vertical force generator 24 is referred together with, as another suffix, reference sign ij indicative of a certain one of the front right, front left, rear right and rear left wheels, where it should be clarified that the referred coil spring 20, shock absorber 22 or vertical force generator 24 corresponds to the certain one of the wheels.

As shown in FIG. 3, the suspension 16 is a multi-link suspension, and is equipped with an arm assembly that includes a total of five suspension arms, i.e., a first upper arm 40, a second upper arm 42, a first lower arm 44, a second lower arm 46 and a toe control arm 48. Each of the five suspension arms 40, 42, 44, 46, 48 is connected at one of its longitudinal end portions to the vehicle body 14, pivotably relative to the vehicle body 14, and is connected at the other longitudinal end portion to an axle carrier 50 by which the wheel 12 is relatively rotatably held. Owing to its connection with the five suspension arms 40, 42, 44, 46, 48, the axle carrier 50 is vertically displaceable relative to the vehicle body 14 along a predetermined locus.

Figure 4:
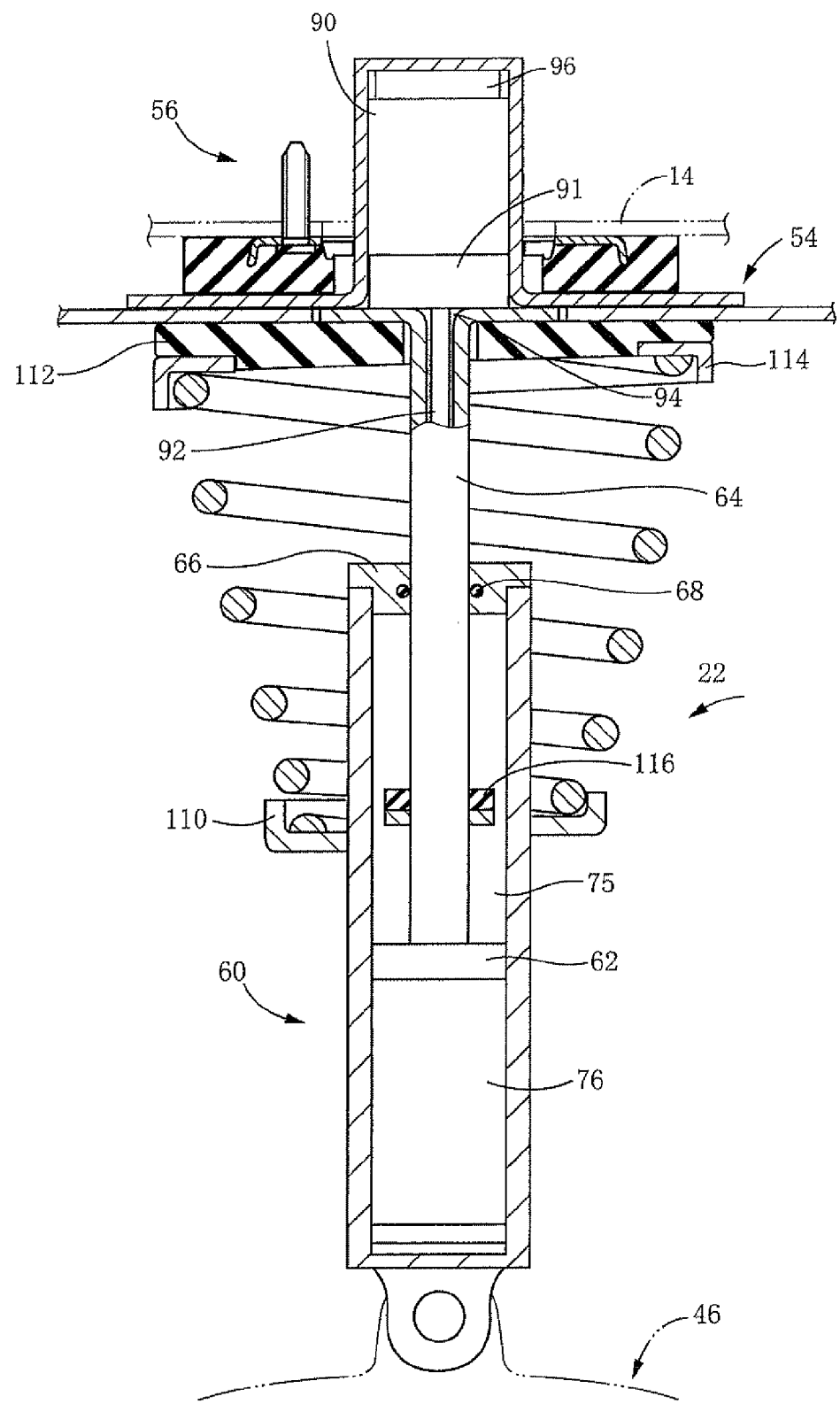
FIG. 4 is a cross sectional view of a shock absorber included in the suspension system, wherein flow of a working fluid upon downward movement of a piston is shown in a right side of an axis of the shock absorber while flow of the working fluid upon upward displacement of the piston is shown in a left side of the axis of the shock absorber.
Figure 5:
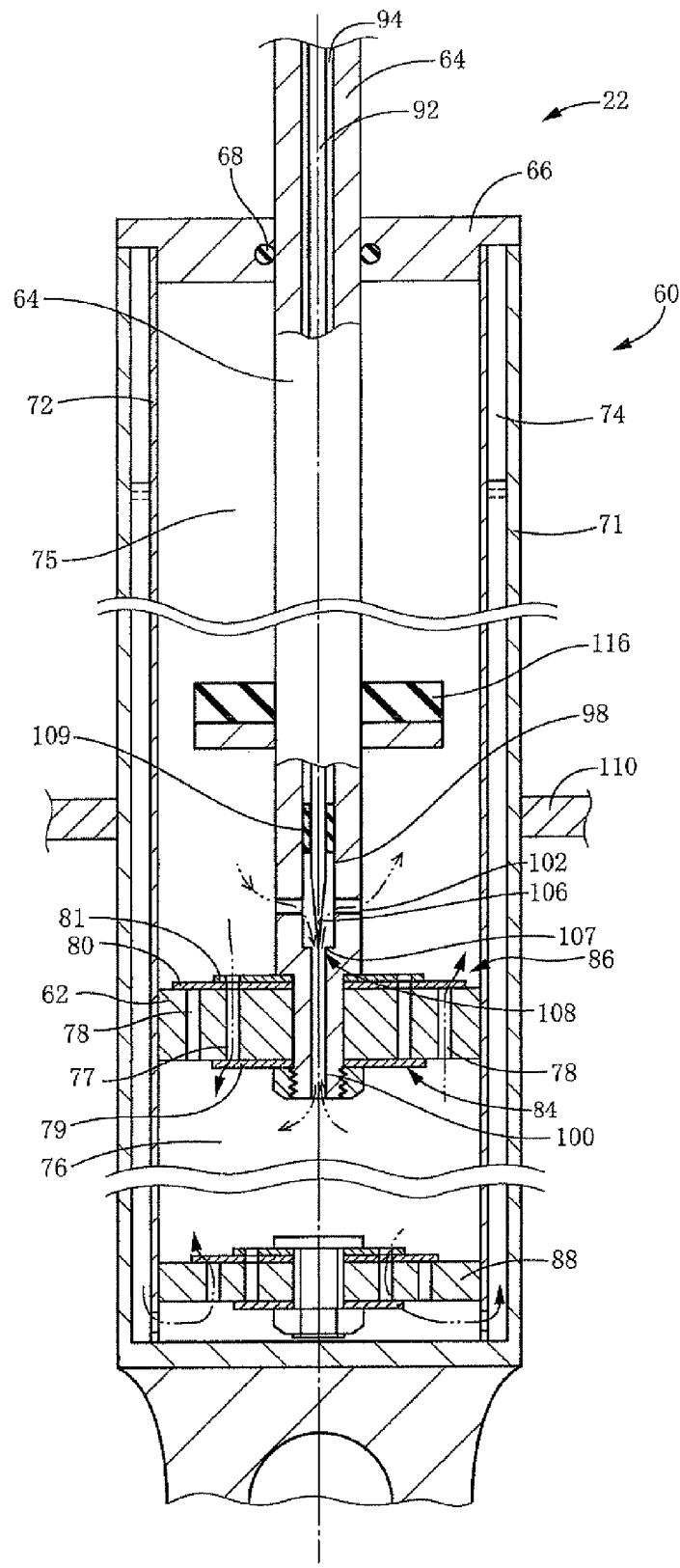
FIG. 5 is a cross sectional view of a part of the shock absorber.

As shown in FIG. 4, the shock absorber 22 is disposed between the vehicle body 14 as the sprung portion and the second lower arm 46 as a part (i.e., wheel holding portion) of an unsprung portion of the vehicle, such that, in principle, the shock absorber 22 is vertically unmovable relative to the vehicle body 14 and the second lower arm 46, and is rockable relative to the vehicle body 14 and the second lower arm 46. The shock absorber 22 includes a damping-characteristic controlling device 56 by which a damping characteristic of the shock absorber 22 is continuously controllable. The shock absorber 22 includes a housing 60 and a piston 62. The housing 60 is connected to the second lower arm 46, while the piston 62 has a piston rod 64 that is connected through a mount portion 54 of the vehicle body 14. A seal 68 is disposed in a groove formed in an inner circumferential surface of a cap portion 66 of the housing 60. The piston rod 64 is in slidable contact at its intermediate portion with the seal 68 and the inner circumferential surface of the cap portion 66. As shown in FIG. 5, the housing 60 includes an outer cylinder 71 and an inner cylinder 72 such that a buffer chamber 74 is defined between the outer and inner cylinders 71, 72. The piston 62 is fluid-tightly and slidably fitted in an inner circumferential surface of the inner cylinder 72, and an inside space of the inner cylinder 72 is divided by the piston 62 into an upper chamber 75 and a lower chamber 76.

The piston 62 has a plurality of communication passages 77, 78 which allow communication between the upper and lower chambers 75, 76 therethrough. FIG. 5 illustrates two of the communication passages 77 and two of the communication passages 78. The communication passages 77 are arranged on a circle while the communication passages 78 are arranged on another circle, such that the two circles are coaxial with each other. A lower valve plate 79 is disposed on a lower surface of the piston 62, and is gripped between the lower surface of the piston 62 and a nut that is in thread engagement with the piston rod 64. First and second upper valve plates 80, 81 are disposed on an upper surface of the piston 62, and are gripped between the upper surface of the piston 62 and a shoulder portion of the piston rod 64. The lower valve plate 79 does not cover openings of the respective communication passages 78 that are located on a radially outer side of the communication passages 77, but has a size enabling the valve plate 79 to cover openings of the respective communication passages 77 that are located on a radially inner side of the communication passages 78. When a difference between a fluid pressure in the upper chamber 75 and a fluid pressure in the lower chamber 76 is increased to a predetermined value, namely, when a force acting on the lower valve plate 79 is increased to a valve opening value, the lower valve plate 79 is deflected thereby allowing flow of a working fluid from the upper chamber 75 to the lower chamber 76. The lower valve plate 79 cooperates with the openings of the respective communication passages 77, so as to constitute at least a part of a leaf valve 84. The first and second upper valve plates 80, 81 are vertically superposed on each other. The openings of the respective communication passages 78 are closed by the first upper valve plate 80, while the openings of the respective communication passages 77 are not covered by the first and second upper valve plates 80, 81 due to openings formed through portions of the valve plates 80, 81 which are aligned with the openings of the respective communication passages 78. When a difference between the fluid pressure in the lower chamber 76 and the fluid pressure in the upper chamber 75 is increased to a predetermined value, namely, when a force acting on the first upper valve 80 is increased to a valve opening value, the first upper valve plate 80 is deflected thereby allowing flow of the working fluid from the lower chamber 76 to the upper chamber 75. The first and second upper valve plates 80, 81 cooperate with the openings of the respective communication passages 78, so as to constitute at least a part of a leaf valve 86. Between the lower chamber 76 and the buffer chamber 74, there is provided a base valve body 88 that is equipped with leaf valves.

As shown in FIG. 4, the damping-characteristic controlling device 56 includes an electric motor 90, a motion converter 91 configured to convert a rotary motion of the electric motor 80 into a linear motion, and an adjusting rod 92 disposed in a through-hole 94, which is formed in the piston rod 64 and extends in an axial direction of the piston rod 64. The adjusting rod 92 is connected at its upper end portion to an output member of the motion converter 91, and is linearly moved relative to the piston rod 64 by rotation of the electric motor 90. A rotational angle of the electric motor 90 is detected by a rotational angle sensor 96. As shown in FIG. 5, the through-hole 94 is a stepped hole, and has a large diameter portion 98 and a small diameter portion 100 that are provided by its upper and lower portions, respectively. The small diameter portion 100 is held in communication with the lower chamber 76, while the large diameter portion 98 is held in communication with the upper chamber 75 through communication passages 102. The upper and lower chambers 75, 76 are held in communication with each other via the through-hole 94 and the communication passages 102.

Meanwhile, an intermediate portion of the adjusting rod 92 has an outside diameter that is smaller than an inside diameter of the large diameter portion 98 of the through-hole 94 and is larger than an inside diameter of the small diameter portion 100 of the through-hole 94. A lower end portion 106 of the adjusting rod 92 has an outside diameter that is gradually reduced as the lower end portion 106 extends downwardly. The lower end portion 106 of the adjusting rod 92 may be provided by, for example, a tapered portion. The adjusting rod 92 is positioned relative to the piston rod 64 such that the intermediate portion is positioned in the large diameter portion 98 of the through-hole 94 while the lower end portion 106 of the adjusting rod 92 is positioned in the vicinity of a stepped portion between the large diameter portion 98 and small diameter portion 100. The lower end portion 106 of the adjusting rod 92 has an outer circumferential surface that cooperates with a radially inner end 107 of the stepped portion to define therebetween an annular clearance. An area of the annular clearance is continuously changed with change of a position of the adjusting rod 92 relative to the piston rod 64. The relative position of the adjusting rod 92 can be detected through the rotational angle of the electric motor 90. That is, an opening area of a variable restrictor (flow control valve) 108 is controlled by controlling the electric motor 90, so that the lower end portion 106 of the adjusting rod 92 and an inner circumferential surface of the through-hole 94 (including the above-described radially inner end 107) constitute at least a part of the variable restrictor (flow control valve) 108. A seal member 109 is provided on an upper side of a portion of the through-hole 94 at which the through-hole 94 is connected to the communication passages 102, such that a fluid tightness between the inner circumferential surface of the through-hole 94 and the outer circumferential surface of the adjusting rod 92 is established by the seal member 109.

The fluid pressure in the lower chamber 76 is increased, for example, when the vehicle body 14 and the second lower arm 46 (i.e., the wheel 12) are forced to be displaced toward each other, namely, when the piston 62 is forced to be downwardly displaced relative to the housing 60. When the fluid pressure in the lower chamber 76 is increased, a part of the working fluid in the lower chamber 76 flows into the upper chamber 75 via the variable restrictor 108 of the through-hole 94. When the force acting on the upper valve plates 80, 81 based on the fluid pressure difference becomes equal to or larger than the valve opening value, the leaf valve 86 is switched into its open state whereby the working fluid is made to flow into the upper chamber 75 via the communication passages 78. Further, a part of the working fluid in the lower chamber 76 flows into the buffer chamber 74 via the leaf valve of the base valve body 88. The damping characteristic of the shock absorber 22 is principally dependent on the opening area of the variable restrictor 108. A resistance, which acts on the working fluid flowing through the variable restrictor 108, is increased with reduction of the opening area of the variable restrictor 108, as long as a flow rate of the working fluid is not changed. In the present embodiment, the opening area of the variable restrictor 108 is controlled by controlling the electric motor 90 such that a desired value of damping coefficient is established in an entirety of the shock absorber 22.

The fluid pressure in the upper chamber 75 is increased, for example, when the vehicle body 14 and the second lower arm 46 (i.e., wheel 12) are forced to be displaced away from each other, namely, when the piston 62 is forced to be upwardly displaced relative to the housing 60. When the fluid pressure in the upper chamber 75 is increased, a part of the working fluid in the upper chamber 75 flows into the lower chamber 76 via the variable restrictor 108 of the through-hole 94. When the force acting on the lower valve plate 79 becomes equal to or larger than the valve opening value, the leaf valve 84 is switched into its open state whereby the working fluid is made to flow into the lower chamber 76 via the communication passages 77. Further, a part of the working fluid in the buffer chamber 74 flows into the lower chamber 76 via the leaf valve of the base valve body 88. The damping characteristic is controlled by controlling the opening area of the variable restrictor 108. The damping force is changed by controlling the damping characteristic (damping coefficient) as long as a rate of displacement of the piston 62 or a rate of flow of the working fluid through the variable restrictor 108 is not changed. In this sense, the control of the damping characteristic can be considered to be the same as the control of the damping force.

As shown in FIG. 4, the coil spring 20 is interposed between a lower retainer 110 and an upper retainer 114. The lower retainer 110 is mounted on an intermediate portion of the housing 60 of the shock absorber 22, while the upper retainer 114 is attached to the mount portion 54 through a rubber vibration isolator 112. The housing 60 is supported by the second lower arm 46 while the piston rod 64 is attached through the mount portion 54 to the vehicle body 14, so that the coil spring 20 is disposed in parallel with the shock absorber 22 between the vehicle body 14 and the second lower arm 46. An annular elastic member 116 is mounted on a portion of the piston rod 64, which is located inside the housing 60. The elastic member 116 is to be brought into contact at its upper surface with a lower surface of the cap portion 66 of the housing 60, for thereby limiting displacement of the vehicle body 14 relative to the wheel 12 in a rebound direction, i.e., in a direction that increases a vertical distance between the wheel 12 and the vehicle body 14. Further, the cap portion 66 of the housing 60 is to be brought into contact at its upper surface with a lower surface of the rubber vibration isolator 112, for thereby limiting displacement of the vehicle body 14 relative to the wheel 12 in a bound direction, i.e., in a direction that reduces the vertical distance between the wheel 12 and the vehicle body 14. The elastic member 116 constitutes or the elastic member 116 cooperates with the lower surface of the cap portion 66 to constitute a stopper for limiting the displacement in the rebound direction. The rubber vibration isolator 112 constitutes or the rubber vibration isolator 112 cooperates with the upper surface of the cap portion 66 to constitute a stopper for limiting the displacement in the bound direction.

Figure 6:
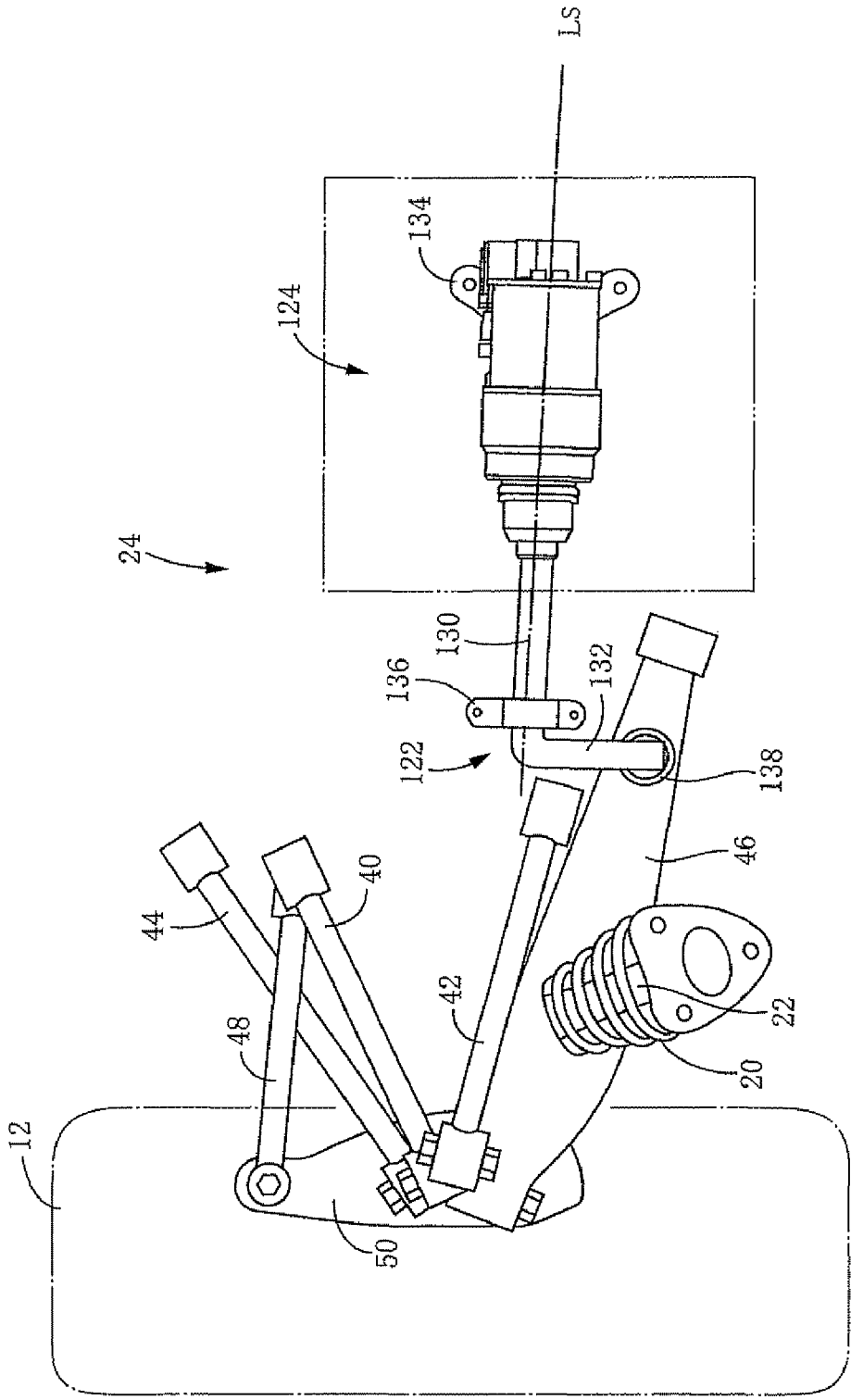
FIG. 6 is a plan view of the vertical force generator included in the suspension.

As shown in FIGS. 3 and 6, the vertical force generator 24 includes an elastic member in the form of a L-shaped bar 122 having a generally L shape as seen in its plan view and a drive source in the form of an actuator 124 configured to rotate the L-shaped bar 122 about an axis Ls. The L-shape bar 122 includes a laterally extending portion in the form of a shaft portion 130 which extends substantially in a width or lateral direction of the vehicle, and a non-parallel portion in the form of an arm portion 132 which is contiguous to the shaft portion 130 and which extends in a direction not parallel to the shaft portion 130, e.g., substantially in a rearward direction of the vehicle. The L-shaped bar 122 is formed of a single bar that is, for example, suitably bent, so that a force can be integrally transmitted through the bar 122. The actuator 124 is attached at its attached portion 134 to the vehicle body 14. The shaft portion 130 of the L-shaped bar 122 is connected, at one of its opposite end portions which is remote from the arm portion 132, to the actuator 124, whereby the L-shaped bar 122 is held by the vehicle body 14. The shaft portion 130 is held, at the other end portion which is close to the arm portion 132, by a retainer 136 that is fixed to the vehicle body 14, such that the shaft portion 130 is rotatable about the axis Ls. Meanwhile, the arm portion 132 is connected, at one of its opposite end portions which is remote from the shaft portion 130, to the second lower arm 46 via a link rod 137. A link-rod connection portion 138 is provided on the second lower arm 46, so that the link rod 137 is rockably connected at its opposite end portions to the link-rod connecting portion 138 and the arm portion 132 of the L-shaped bar 122, respectively.

Figure 7:
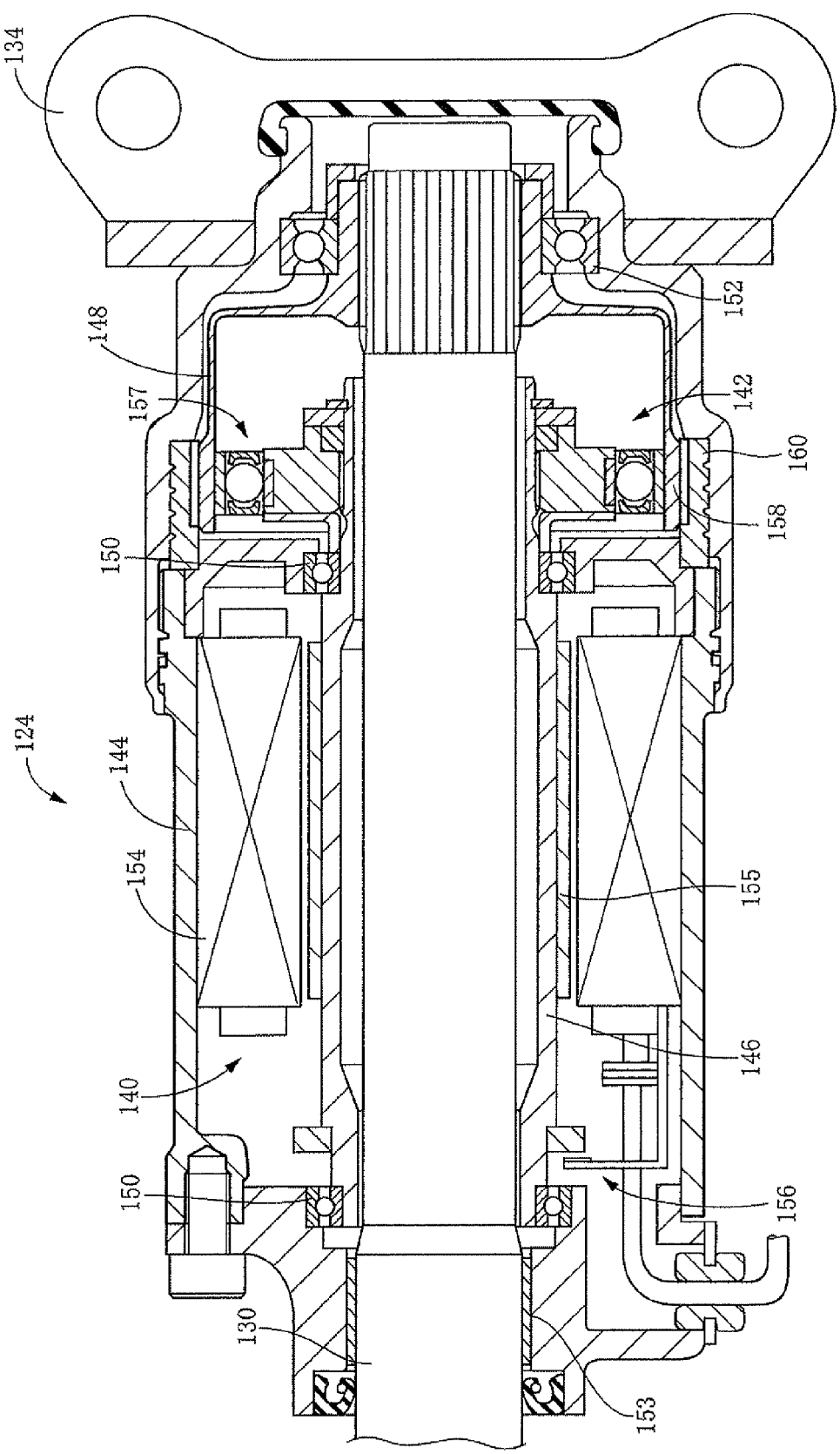
FIG. 7 is a cross sectional view of an actuator of the vertical force generator.

As shown in FIG. 7, the actuator 124 of the vertical force generator 24 includes an electric motor 140 and a speed reducer 142. The shaft portion 130 of the L-shaped bar 122 is connected to an output shaft 146 of the electric motor 140 via an output shaft 148 of the speed reducer 142, so that the rotation of the electric motor 140 is transmitted to the shaft portion 130 while a speed of the rotation is reduced. The electric motor 140 and the speed reducer 142 are arranged in series with each other within a housing 144. The output shaft 146 of the electric motor 140 and the output shaft 148 of the speed reducer 142 are held by the housing 144 via respective bearings 150, 152, so as to be rotatable relative to the housing 144. The shaft portion 130 is introduced in the output shafts 146, 148 each provided by a hollow member, and is held by the housing 144 through a bearing bushing 153 so as to be rotatable relative to the housing 144. The electric motor 140 is provided by a three-phase DC brushless motor, and includes, in addition to the output shaft 146, a plurality of coils 154 that are disposed on an inner surface of the housing 144 and a plurality of permanent magnets 155 disposed on or embedded in an outer circumferential surface of the output shaft 146. A rotational angle sensor 156 is provided in the housing 144, so as to detect a rotational angle of the output shaft 146, i.e., a rotational angle (angular position) of the electric motor 140. The speed reducer 142 is provided by a harmonic gear set, and includes a wave generator 157, a flexible gear (flexspline) 158 and a ring gear (circular spline) 160. The wave generator 157 includes an elliptic cam and a ball bearing fitted on an outer circumferential surface of the elliptic cam, and is fixed to an end portion of the motor output shaft 146. The flexible gear 158 is provided by a cup-shaped member having a circumferential wall portion that is elastically deformable, and a plurality of teeth (e.g., a total of 400 teeth in the present embodiment) formed on its outer circumferential surface. The shaft portion 130 of the L-shaped bar 122 is fitted in a hole that is formed through a bottom wall portion of the cup-shaped flexible gear 156, so as to be rotatable together with the flexible gear 156. The ring gear 160 is provided by a generally ring-shaped member fixed to the housing 144, and has a plurality of teeth (e.g., a total of 402 teeth in the present embodiment) formed on its inner circumferential surface. The flexible gear 158 is fitted at its circumferential wall portion on the wave generator 157, and is elastically deformed to have an elliptic shape. The flexible gear 158 meshes, at two portions thereof that lie substantially on a long axis of the elliptic shape, with the ring gear 160, while not meshing at the other portions thereof with the ring gear 160.

In the speed reducer 142 constructed as described above, while the wave generator 157 is rotated by one rotation (by 360°), namely, while the output shaft 146 of the electric motor 140 is rotated by one rotation, the flexible gear 158 and the ring gear 160 are rotated relative to each other by an amount corresponding to two teeth, i.e., a difference therebetween with respect to the number of teeth, so that the speed reducer 142 has a speed reduction ratio of 1/200. In the present embodiment, the output shaft 148 of the speed reducer 142 is constituted by a portion of the flexible gear 158 which is rotatable together with the shaft portion 130 of the L-shaped bar 122. Since the speed reduction ratio of the speed reducer 142 (i.e., a ratio of an actuation amount of the actuator 124 to a motion amount of the electric motor 140) is 1/200, which is relatively low, a rotational speed of the output shaft 148 of the speed reducer 142 is considerably low relative to a rotational speed of the electric motor 140, thereby resulting in a large length of response delay time of the actuator 124, i.e., a large length of time from output of a control command value until initiation of application of torque to the shaft portion 130.

There will be described an efficiency of the actuator 124, which is categorized into a positive efficiency and a negative efficiency. The positive efficiency $\eta_P$ corresponds to a parameter representing an amount of the motor force minimally required to cause the shaft portion 130 of the L-shaped bar 122 to be rotated against an external force acting on the actuator 124. More specifically, the positive efficiency $\eta_P$ is defined as a ratio of an amount of the external force, to the amount of the motor force minimally required to cause the rotation of the shaft portion 130. On the other hand, the negative efficiency $\eta_N$ corresponds to a parameter representing an amount of the motor force minimally required to inhibit the rotation of the actuator 124 that could be caused by the external force acting on the actuator 124. More specifically, the negative efficiency $\eta_N$ is defined as a ratio of the amount of the motor force minimally required to inhibit the rotation of the actuator 124 caused by the external force, to an amount of the external force. The positive efficiency $\eta_P$ and the negative efficiency $\eta_N$ can be expressed by respective expressions as follows:

Positive efficiency $\eta_P = Fa/Fm$

Negative efficiency $\eta_N = Fm/Fa$

In the above expressions, "Fa" represents an actuator force, i.e., the external force applied to the actuator 124, and can be considered as an actuator torque. Meanwhile, "Fm" represents the motor force generated by the motor 140, and can be considered as a motor torque.

For producing the same amount of the actuator force Fa, the motor force amount $Fm_P$ of the motor 140 required under the positive efficiency characteristic is different from the motor force amount $Fm_N$ of the motor 70 required under the negative efficiency characteristic ($Fm_P > Fm_N$). Further, a positive/negative efficiency product $\eta_P * \eta_N$, which is defined as a product of the positive efficiency $\eta_P$ and the negative efficiency $\eta_N$, can be considered as a ratio ($Fm_N/Fm_P$) of an amount of the motor force minimally required to inhibit an actuation of the actuator caused by a certain amount of the external force, to an amount of the motor force minimally required to cause the actuation of the actuator against the certain amount of the external force. Therefore, a low value of the positive/negative efficiency product $\eta_P * \eta_N$ indicates that a low ratio of the motor force amount $Fm_N$ required under the negative efficiency characteristic to the motor force amount $Fm_P$ required under the positive efficiency characteristic. That is, a low value of the positive/negative efficiency product $\eta_P * \eta_N$ indicates that the actuator is hard to be actuated by the external force. In the present embodiment in which the positive/negative efficiency product $\eta_P * \eta_N$ is low, there is a technical advantage that a force applied to the L-shaped bar 122 can be held even by supply of a small amount of electric current to the motor 140.

As described above, between the second lower arm 46 as a part of the unsprung portion and the vehicle body 14 as the sprung portion, the coil spring 20, shock absorber 22 and L-shaped bar 122 as the elastic member are disposed in parallel with each other. Therefore, a load applied to the wheel 12 is received by cooperation of the coil spring 20, shock absorber 22 and L-shaped bar 122. However, in a state in which the electric current is not being supplied to the electric motor 140, the load is received by the coil spring 20 and the shock absorber 22, since no force is not being applied to the L-shaped bar 122 without the electric current being supplied to the motor 140. In the present embodiment, the electric motor 140 is in a reference angular position (the actuator 124 is placed in a reference state) in this state. Since the load is received mainly by the coil spring 20 in this state, it will be described that the load is received by the coli spring 20 in the following description.

When the electric motor 140 is driven from the reference angular position, a torque is applied to the shaft portion 130 of the L-shaped bar 122, and the arm portion of the L-shaped bar 122 is pivoted whereby the shaft portion 130 is twisted. It is noted that there is a one-to-one relationship between the rotational angle of the electric motor 140 and the rotational angle of the actuator 124. It is further noted that the control command value represents a deviation of an actual rotational angle of the motor 140 from a target rotational angle of the motor 140.

Figure 8A:
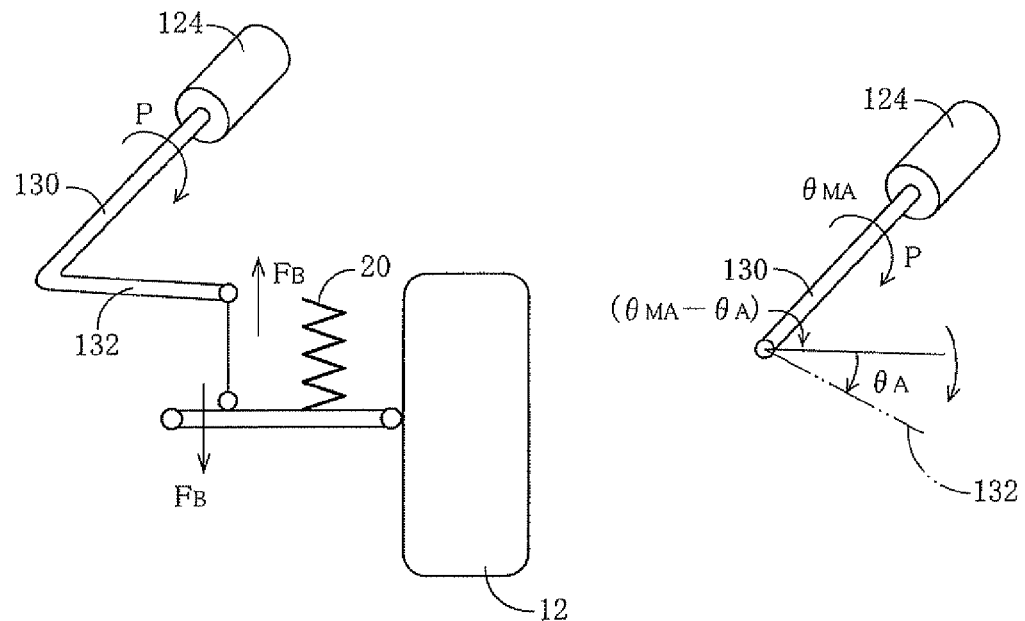
FIGS. 8A and 8B are views showing activation of the vertical force generator.

As shown in FIG. 8A, when the actuator 124 is rotated by an angle $\theta_{MA}$ in a direction P, the arm portion 132 is pivoted by an angle $\theta_A$ in the direction P whereby a vertical distance between the sprung and unsprung portions is increased. That is, when the arm portion 132 is pivoted by the pivot angle $\theta_A$ in the direction P, the vertical distance between the sprung and unsprung portions is increased by an amount corresponding to the angle $\theta_A$ (sin $\theta_A$), and an elastic force generated by the coil spring 20 is reduced by an amount corresponding to the increase of the vertical distance. In this instance, the shaft portion 130 is twisted by an angle ($\theta_{MA}-\theta_A$) that is obtained by subtracting the pivot angle $\theta_A$ of the arm portion 132 from the rotational angle $\theta_{MA}$ of the actuator 124. Since a torsional moment $T_M$ (i.e., a torque applied by the actuator 124) applied to the shaft portion 130 is equal to a bending moment acting on the arm portion 132, the torsional moment $T_M$ can be expressed by the following expression:

$$T_M = F_B \cdot L \quad (1)$$

In the above expression, "L" represents a length of the arm portion 132, and "$F_B$" represents a force applied to the arm portion 132, i.e., a reaction force against a force applied to the second lower arm 46, so that "$F_B \cdot L$" represents the bending moment acting on the arm portion 132. The force applied to the second lower arm 46 is a downward force that acts in a direction containing a component of a downward direction. Meanwhile, the torsional moment $T_M$ of the shaft portion 130 is expressed by the following expression:

$$T_M = G_S \cdot I_P \cdot (\theta_{MA} - \theta_A) \quad (2)$$

In the above expression, "$G_S$" represents a shearing modulus, and "$I_P$" represents polar moment of inertia of area. From the above expressions (1), (2), there is established the following expression:

$$F_B = G_S \cdot I_P \cdot (\theta_{MA} - \theta_A)/L \quad (3)$$

The expression (3) indicates that the force $F_B$ applied to the second lower arm 46 (corresponding to a vertical force and a force applied to the arm portion 132) is proportional in amount to the twisted angle ($\theta_{MA} - \theta_A$). Further, there is a predetermined relationship between the rotational angle $\theta_{MA}$ of the actuator 124 and the pivot angle $\theta_A$ of the arm portion 132 (i.e., amount of change of a vehicle height).

As described above, the amount of change of the distance between the sprung and unsprung portions and the force $F_B$ applied to the second lower arm 46 are determined by determining the rotational angle $\theta_{MA}$ of the actuator 124 (or the electric motor 140). In the present embodiment, the rotational angle $\theta_M$ of the electric motor 140 is controlled such that the vertical force applied to the second lower arm 46 by the L-shaped bar 122 becomes equal to a desired amount. It is not necessary to take account of bending of the shaft portion 130, since the shaft portion 130 is held at its portion close to the arm portion 132 by the vehicle body 14, as described above. Further, in the present embodiment in which the elastic member is provided by the L-shaped bar 122, the actuator 124 can be provided in a portion of the vehicle body 14 which is more distant from the wheel 12, than in an arrangement in which the elastic member is provided by a straight rod. This is effective to increase a degree of freedom in designing a portion in the vicinity of the wheel 12.

Figure 8B:
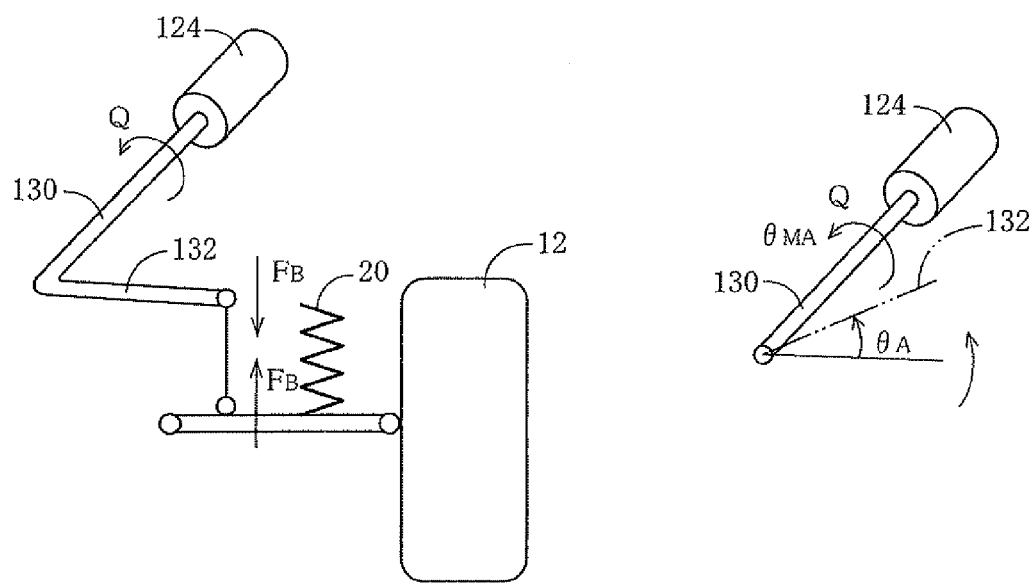

As shown in FIG. 8B, when the actuator 124 is rotated by the angle $\theta_{MA}$ in a direction Q, the arm portion 132 is pivoted by the angle $\theta_A$ in the direction Q whereby the vertical distance between the sprung and unsprung portions is reduced, so that the elastic force generated by the coil spring 20 is increased. The shaft portion 130 is twisted by the angle ($\theta_{MA} - \theta_A$) in the direction Q, and the vertical force applied to the second lower arm 46 acts in a direction that reduces the distance between the sprung and unsprung portions. Thus, the force applied to the second lower arm 46 by the L-shaped bar 122 acts in the direction that is opposite to a direction in which the force applied to the second lower arm 46 by the coil spring 20 acts. In this instance, too, the vertical force applied to the second lower arm 46 can be controlled by controlling the rotational angle $\theta_M$ of the electric motor 140. As is apparent from FIGS. 8A and 8B, the direction of the vertical force is dependent on the direction of rotation of the electric motor 140, and the amount of the vertical force and the distance between the sprung and unsprung portions (or the amount of change of the distance between the sprung and unsprung portions) are dependent on a value (hereinafter referred to as "absolute value" where appropriate) of the rotational angle $\theta_M$ of the electric motor 140. It is noted that, in FIGS. 8A and 8B, posture of the L-shaped bar 122 is illustrated in a manner that facilitates understanding of relationship among the rotation of the electric motor 140, pivot movement of the arm portion 132 and pivot movement of the second lower arm 46 so that the illustrated posture is different from a real posture of the L-shaped bar.

Figure 11:
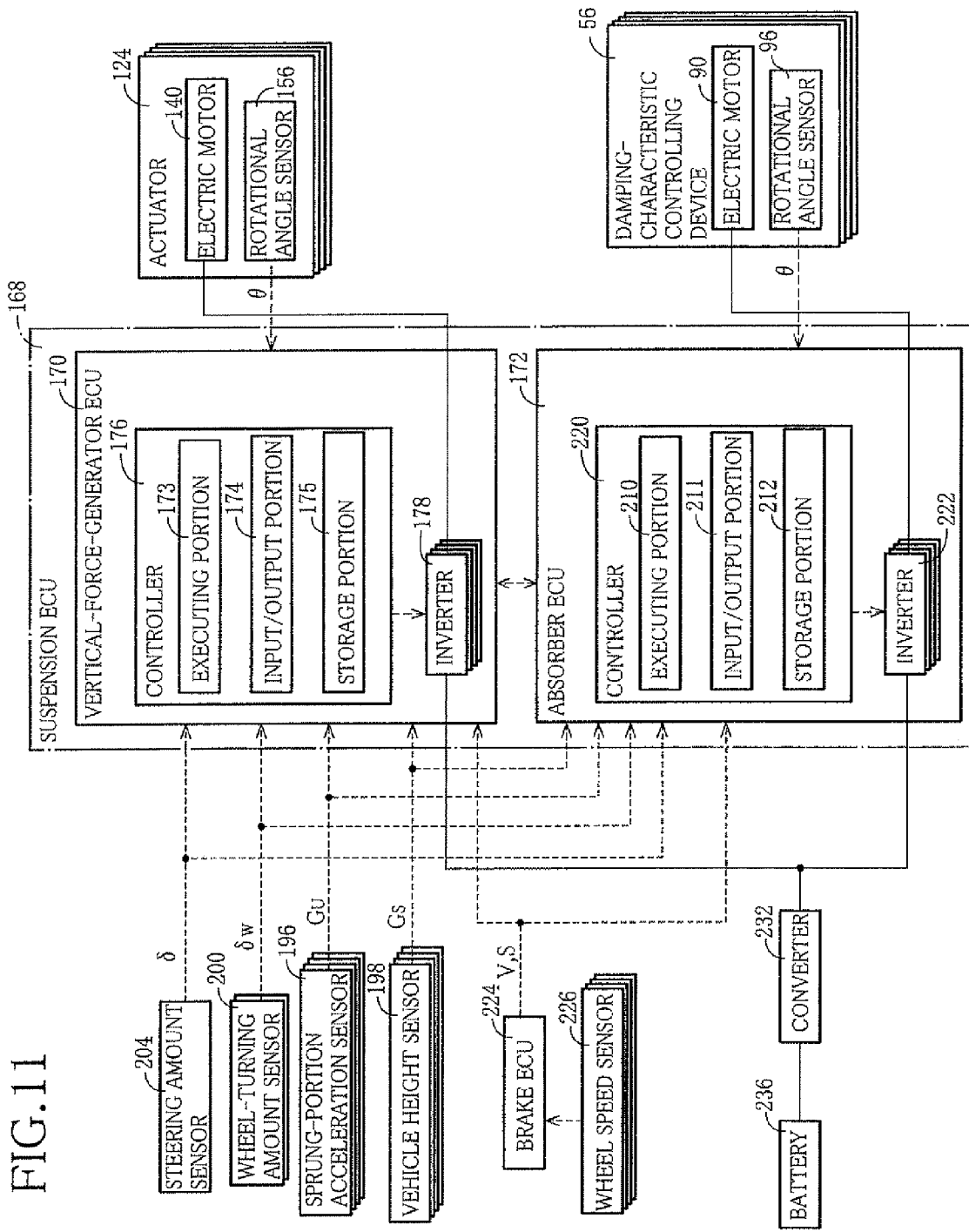
FIG. 11 is a block diagram showing various functional portions of a suspension control unit and other elements included in the suspension system.

In the present embodiment, at least the shock absorber 22 and the vertical force generator 24 are controlled by the suspension controller in the form of a suspension control unit 168 as shown in FIG. 11. The suspension control unit 168 includes a vertical-force-generator control unit (ECU) 170 and an absorber control unit (ECU) 172. The vertical-force-generator control unit 170 is configured to control the vertical force applied to the second lower arm 46 by the L-shaped bar 122. The absorber control unit 172 is configured to control the damping force generated by the shock absorber 22. The vertical-force-generator control unit 170 includes a controller 176 and inverters 178 as drive circuits. The controller 176 is constituted principally by a computer including an executing portion 173, an input/output portion 174 and a storage portion 175. To the input/output portion 174, there are connected the inverters 178, angular position sensors 156, sprung-portion acceleration sensors 196, vehicle height sensors 198, wheel-turning amount sensors 200 and an operating-amount sensor 204 that is configured to detect an operating amount of a steering operation member, i.e., a steering angle of a steering wheel (not shown). The wheel-turning amount sensors 200 are provided for respective front right and left wheels (steerable wheels) 12FR, 12FL, such that a turning amount of each of the front right and left wheels 12FR, 12FL is detected by a corresponding one of the wheel-turning amount sensors 200. The sprung-portion acceleration sensors 196 are provided for the respective mount portions 54 which correspond to the respective four wheels 144, such that a vertical acceleration of each of portions of the vehicle body 14 is detected by a corresponding one of the sprung-portion acceleration sensors 196. Each of the vehicle height sensors 198 is provided for detecting a vertical displacement of a corresponding one of the portions of the vehicle body 14 relative to a corresponding one of the second lower arms 46, i.e., the distance between the corresponding portion of the vehicle body 14 as the sprung portion and the corresponding one of the second lower arms 45 as the unsprung portion. The storage portion 175 stores therein, for example, a plurality of tables and programs.

Similarly, the absorber control unit 172 includes a controller 220 and inverters 222 as drive circuits. The controller 220 is constituted principally by a computer including an executing portion 210, an input/output portion 211 and a storage portion 212. To the input/output portion 211, there are connected the inverter 222, sprung-portion acceleration sensors 196, vehicle height sensors 198, wheel-turning amount sensors 200, operating-amount sensor 204 and angular position sensors 96. A brake control unit 224 also includes a controller constituted principally by a computer. To the brake control unit 224, there are connected wheel speed sensors 226 each configured to detect a rotational speed of a corresponding one of the wheels 12FR, 12FL, 12RR, 12RL, for thereby obtaining a running speed and a slipping state of the vehicle, based on detected values detected by the respective wheel speed sensors 226. The vertical-force-generator control unit 170, absorber control unit 172 and brake control unit 224 are connected to each other via CAN (Car Area Network), so that information obtained by the brake control unit 224 and representing the vehicle running speed and slipping states of the respective wheels 12FR, 12FL, 12RR, 12RL is supplied to the vertical-force-generator control unit 170 and absorber control unit 172.

In the present embodiment, the controller 176 of the vertical-force-generator control unit 170 and the controller 220 of the absorber control unit 172 are common to the four wheels 12 (four inverters 178 or inverters 222). However, the controllers 176, 220 may be provided for each wheel 12 (each inverter 178 or inverter 222).

Figure 9:
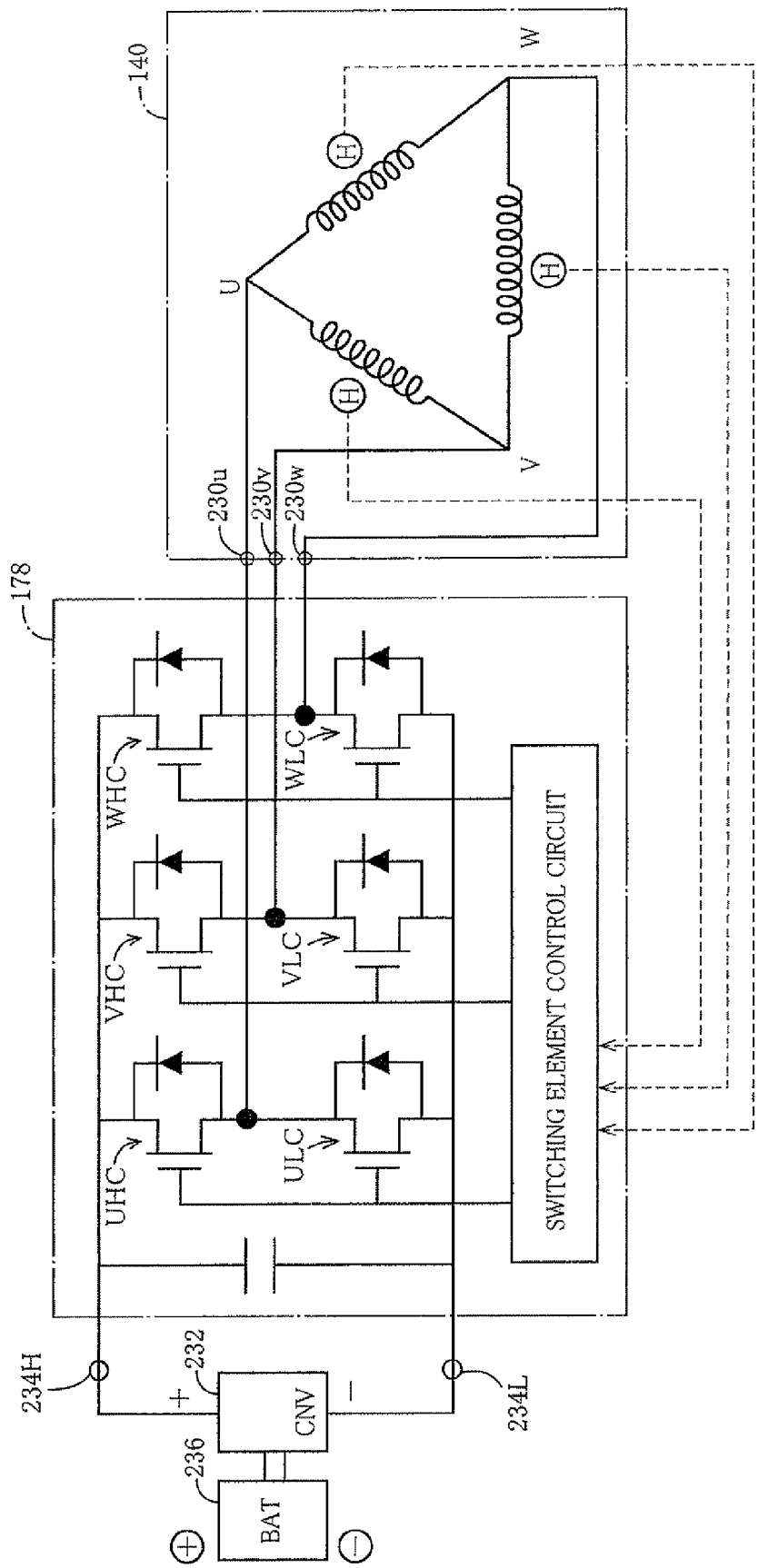
FIG. 9 is a circuit diagram of an inverter for controlling an electric motor of the actuator.

As shown in FIG. 9, the electric motor 140 is a three-phase delta-connected DC brushless motor, and has terminals 230u, 230v, 230w (hereinafter generally referred to as "terminals 230" where appropriate) that correspond to respective phases (U, V, W). The inverter 178 has a total of six switching elements UHC, ULC, VHC, VLC, WHC, WLC that are disposed between the electric motor 140 and a power source. The switching element UHC is disposed between a high-level voltage terminal 234H of the power source and the terminal 230u, such that the high-level voltage terminal 234H and the terminal 230u are selectively connected to and disconnected from each other by operation of the switching element UHC. The switching element ULC is disposed between a low-level voltage terminal 234L of the power source and the terminal 230u, such that the low-level voltage terminal 234L and the terminal 230u are selectively connected to and disconnected from each other by operation of the switching element ULC. The switching element VHC is disposed between the high-level voltage terminal 234H and the terminal 230v, such that the high-level voltage terminal 234H and the terminal 230v are selectively connected to and disconnected from each other by operation of the switching element VHC. The switching element VLC is disposed between the low-level voltage terminal 234L and the terminal 230v, such that the low-level voltage terminal 234L and the terminal 230v are selectively connected to and disconnected from each other by operation of the switching element VLC. The switching element WHC is disposed between the high-level voltage terminal 23411 and the terminal 230w, such that the high-level voltage terminal 234H and the terminal 230w are selectively connected to and disconnected from each other by operation of the switching element WHC. The switching element WLC is disposed between the low-level voltage terminal 234L and the terminal 230w, such that the low-level voltage terminal 234L and the terminal 230w are selectively connected to and disconnected from each other by operation of the switching element WLC. A switching element control circuit of the inverter 178 is operable to determine the angular position (electrical angle) of the electric motor 140 based on signals detected by respective three Hall elements $H_A$, $H_B$, $H_C$ (each indicated by reference "H" in FIG. 9) provided in the electric motor 140, and to control the switching elements UHC, ULC, VHC, VLC, WHC, WLC such that each switching element is placed in one of ON and OFF states that is selected based on the determined angular position of the electric motor 140. It is noted that the inverter 178 is connected to a battery 236 via a converter 232 that is cooperates with the battery 236 to constitute the power source.

Since each of the electric motors 140 is driven by a constant voltage that is controlled by the converter 232, an amount of electric power supplied to each electric motor 140 is changed by changing an amount of electric current supplied to each electric motor 140. That is, the motor force generated by each electric motor 140 is dependent on the amount of the supplied electric current, which can be changed by a PWM (pulse width modulation) control performed by the corresponding inverter 178. In the PWM control, each inverter 178 suitably controls a duty ratio, i.e., a ratio of pulse ON time to a sum of the pulse ON time and pulse OFF time. The electric motor 140 is placed in a selected one of a plurality of operational modes, and the selected operational mode of the electric motor 140 is changed by controlling an operational state of the inverter 178. In the present embodiment, the plurality of operational modes of the electric motor 140 consists of a controlled-power supplying mode, a standby mode, a braking mode and a free mode. In the controlled-power supplying mode, the electric power is supplied to the electric motor 140 from the battery 236. In each of the standby mode, braking mode and free mode, the electric power is not supplied to the electric motor 140.

In this controlled-power supplying mode, the ON/OFF state of each of the switching elements UHC, ULC, VHC, VLC, WHC, WLC is changed based on the detected angular position of the electric motor 140 in a so-called 120° rectangular-wave drive system, as shown in FIGS. 9 and 10. In the present embodiment, only the three switching elements ULC, VLC, WLC (that are connected to the low-level voltage terminal 234L of the power source) are subjected to a duty-ratio control, and the amount of electric current supplied to the electric motor 140 is changed by changing the duty ratio. In FIG. 10, "1" indicates that the switching element in question is subjected to the duty-ratio control. It is noted that combination of selected operational states of the switching elements varies depending on which one of opposite directions the electric motor 140 is rotated in. In FIG. 10, one of the opposite directions is referred to as "CW DIRECTION" while the other of the opposite directions is referred to as "CCW DIRECTION", for convenience of the description. Thus, in the controlled-power supplying mode, the electric power supplied to the motor 140 is controlled whereby a direction and an amount of the torque are controlled.

In the standby mode, the electric power is not supplied from the battery 236 to the electric motor 140 even when the ON/OFF state of each switching element is changed. The ON/OFF state of each of the switching elements UHC, VHC, WHC (that are connected to the high-level voltage terminal 234H of the power source) is changed like in the controlled-power supplying mode. However, unlike in the controlled-power supplying mode, any one of the three switching elements ULC, VLC, WLC (that are connected to the low-level voltage terminal. 234L of the power source) is not subjected to the duty-ratio control. In other words, each of the three switching elements ULC, VLC, WLC is subjected to the duty-ratio control, such that the duty ratio is held 0 (zero). That is, each of the three switching elements ULC, VLC, WLC is practically held in the OFF state (open state) due to absence of pulse ON time, so that the electric power is not supplied to the electric motor 140 in this standby mode. In FIG. 10, "0*" indicates that the switching element in question is placed in the state with the duty ratio of 0 (zero). This standby mode does not relate to the embodiment of the invention and accordingly will not be described in detail.

The braking mode, in which the terminals 122u, 122v, 122w of the electric motor 70 are electrically connected to one another by predetermined ON/OFF states of the switching elements, can be considered as a kind of motor-terminals interconnecting mode. In this braking mode, three of the switching elements which are connected to the one of the high-level and low-level voltage terminals 234H, 234L are all held in the ON states while three of the switching elements which are connected to the other of the high-level and low-level voltage terminals 234H, 234L are all held in the OFF states. In the present embodiment, the switching elements UHC, VHC, WHC (that are connected to the high-level voltage terminal 234H of the power source) are all held in the ON states while the switching elements ULC, VLC, WLC (that are connected to the low-level voltage terminal 234L of the power source) are all held in the OFF states. Owing to the switching elements UHC, VHC, WHC held in the ON states, the electric motor 140 is placed in a state in which as if the phases of the electric motor 140 were short-circuited to one another. In this state, the rotation of the electric motor 140 is braked by the short circuit.

In the free mode, the switching elements UHC, VHC, WHC, ULC, VLC, WLC are all held in the OFF states so that the electric motor 140 is placed in a free state.

The activation of the electric motor 140 (actuator 124) is controlled by changing the ON/OFF state of each switching element of the inverter 178, as described above, whereby the vertical force $F_B$ applied to the second lower arm 46 as a part of the unsprung portion is controlled by the L-shaped bar 122. The direction of the vertical force $F_B$ is dependent on a direction in which the electric motor 140 has been rotated from its reference angular position. The amount of the vertical force $F_B$ is dependent on an amount of the rotation of the electric motor 140 from its reference angular position. Since there is a predetermined relationship between the rotational angle $\theta_M$ of the motor 140 and the vertical force $F_B$, as described above, it is possible to determine a target rotational angle $\theta_M^*$ (that represents both target rotational direction and amount) based on the predetermined relationship such that the vertical force $F_B$ acts in a desired direction by a desired amount.

$$\theta_M^* = f(F_B^*)$$

The electric current i, which is to be supplied to the electric motor 140, is in principle a value that makes it possible to obtain the target rotational angle $\theta_M^*$ of the motor 140. In the present embodiment, the motor 140 is controlled in a feed-forward manner, and the supplied electric current i* is determined based on the target rotational angle $\theta_M^*$.

$$i^* = g(\theta_M^*)$$

When an absolute value of the target vertical force $F_B^*$ is to be increased, the supplied electric current i* (having a sign indicative of positive or negative) corresponds to the control command value. The duty ratio for energizing the electric motor 140 is determined based on an amount (absolute value) of the supplied electric current i*. The sign of the supplied electric current i* represents a direction in which the motor 140 is to be rotated or a direction in which the torque of the motor 140 is to act. When the inverter 178 receives the control command value representing the duty ratio and the rotation direction, each of the switching elements is controlled in accordance with the control command value in the inverter 178. On the other hand, when the absolute value of the target value $F_B^*$ of the vertical force is to be held unchanged or reduced, there is outputted a control command value indicating switching of the operational state of the electric motor 140 into the braking mode or free mode, rather than the control command value indicating the supplied electric current i*.

In the present embodiment, in principle, the vertical force generator 24 is subjected to both of a damping force control and an elastic force control. The damping force, which may be referred also to as sprung-portion-velocity-basis control or control based on "skyhook damper theory", is performed based on an absolute vertical velocity $V_U$ (hereinafter referred to as sprung-portion absolute velocity) of the sprung portion (vehicle body) 14. The elastic force control, which may be referred also to as unsprung-portion-displacement-basis control or forced-input reduction control, is performed based on displacement $X_L$ (hereinafter referred to as unsprung-portion displacement) of the second lower arm (unsprung portion) 46. In other words, the target vertical force $F_B^*$ is defined as a sum of the damping force $F_S$ dependent on the sprung-portion absolute velocity $V_U$ and the elastic force $F_H$ dependent on the unsprung-portion displacement $X_L$. The vertical force generator 24 is controlled such that the vertical force generator 24 generates the target vertical force $F_B^*$.

$$F_B^* = F_S + F_H$$

The vertical force generator 24F provided for each front wheel 12F is subjected to the damping force control and the elastic force control, such that the damping force control is performed based on the sprung-portion absolute velocity in the form of the absolute velocity of the portion of the vehicle body 14 that corresponds to the same front wheel 12 Fj (that serves as both of a detected wheel and a controlled wheel), while the elastic force control is performed based on the unsprung-portion displacement in the form of the same front wheel 12Fj. That is, the vertical force generator 24F provided for each front wheel 12F is subjected to an ordinary control in which the detected wheel and the controlled wheel are provided by the same wheel. It is noted that the term "controlled wheel" is a wheel for which the controlled vertical force generator 24 (whose vertical force is to be controlled in the ordinary or preview control) is provided, and that the term "detected wheel" is a wheel whose vertical behavior is to be detected by the sensors 196, 198 in the ordinary or preview control.

The vertical force generator 24R provided for each rear wheel 12R is subjected to the damping force control and the elastic force control, such that, in principle, the damping force control is performed based on the sprung-portion absolute velocity in the form of the absolute velocity of the portion of the vehicle body 14 that corresponds to the same rear wheel 12 Rj, while the elastic force control is performed based on the unsprung-portion displacement in the form of the displacement of the second lower arm 46 that is provided for the front wheel 12Fj as the detected wheel. The preview control is a control that is performed based on the vertical behavior of the controlled wheel that is predicted based on the vertical behavior of the detected wheel located on a front side of the controlled wheel. In the present embodiment, the unsprung-portion-displacement-basis control is performed by carrying out the preview control. However, when the vertical vibration of the second lower arm 46 cannot be effectively suppressed by the preview control, the ordinary control is carried out. Thus, the vertical force generator 24R provided for each rear wheel 12R is subjected to the elastic force control that is performed by carrying out the preview or ordinary control. Hereinafter, such a control performed by carrying out the preview or ordinary control will be also referred to as the preview control.

In the sprung-portion-velocity-basis control that is a well-known control, the damping force is controlled to have an intermediate amount when a product of the sprung-portion absolute velocity $V_U$ and sprung/unsprung-portions relative velocity $V_S$ is a positive value, and is controlled to have a reduced amount when the product is a negative value. In the present embodiment, when the product of the sprung-portion absolute velocity $V_U$ and sprung/unsprung-portions relative velocity $V_S$ is a positive value ($V_U \cdot V_S > 0$), the damping coefficient $C^*$ is set to a predetermined intermediate value $C_{MID}$. When the product is a negative value ($V_U \cdot V_S < 0$), the damping coefficient $C^*$ is set to a small value $C_{MIN}$. Then, the damping force whose amount is dependent on the damping force $C^*$ and the sprung-portion absolute velocity $V_U$ is generated. The damping force is to act in a direction opposite to a direction of the sprung-portion absolute velocity $V_U$.

$$F_S = -G_S \cdot C^* \cdot V_U,$$

where "$G_S$" represents a gain that will be described below.

In the unsprung-portion-displacement-basis control, the vertical vibration of the sprung portion (i.e., vehicle body 14) is suppressed by suppressing the vibration of the unsprung portion (i.e., second lower arm 46). When the unsprung portion is displaced to be positioned on a lower side of its reference position (in which the second lower arm 46 is positioned when the electric motor 140 is in the above-described reference angular position), the elastic force generated by the coil spring 20 is reduced with increase of the distance between the sprung and unsprung portions. In this instance, when the load applied to the wheel is constant, the sprung portion is displaced downwardly whereby the vibration is caused. The reduction of the elastic force of the coil spring 20 is compensated by the elastic force generated by the vertical force generator 24, for thereby restraining displacement of the sprung portion that could be caused by the displacement of the unsprung portion. In the unsprung-portion-displacement-basis control, when the unsprung portion is displaced to be positioned on the lower side of its reference position, the target elastic force $F_H$ is to act in the downward direction. On the other hand, when the unsprung portion is displaced to be positioned on an upper side of its reference position, the target elastic force $F_H$ is to act in the upward direction. The elastic force generated by the coil spring 20 is increased with reduction of the distance between the sprung and unsprung portions. The increase of the elastic force of the coil spring 20 is offset by the elastic force acting in the opposite direction (i.e., direction opposite to a direction of the elastic force of the coil spring 20) and generated by the vertical force generator 24, for thereby restraining vertical vibration of the sprung portion that could be caused by vertical vibration of the unsprung portion.

$$F_H = G_H \cdot K \cdot X_L$$

In this expression, "K" represents a fixed value dependent on at least one of modulus of elasticity of the coil spring 20, spring constant of the L-shaped bar 122, share modulus and geometrical moment of inertia of the shaft portion 130 and flexural rigidity of the arm portion 132. "$G_H$" represents a gain that will be described below.

Figure 14A:
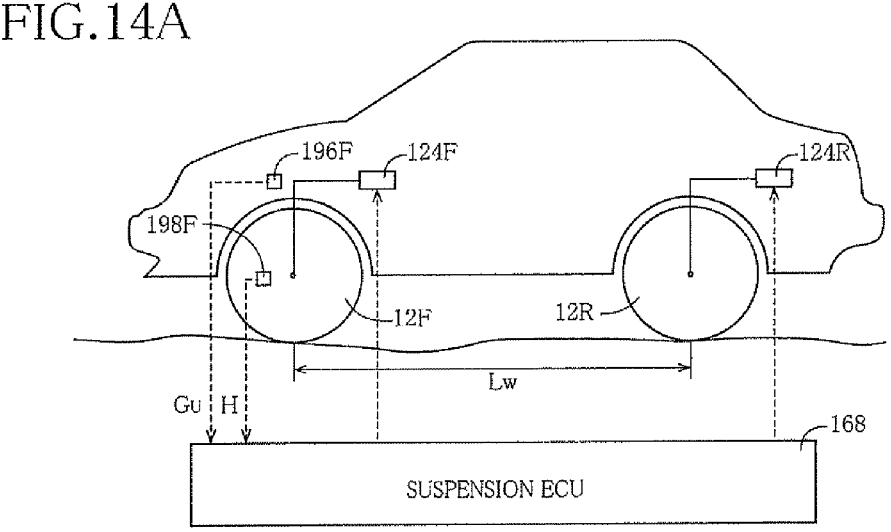
FIGS. 14A-14C are views for explaining a preview control carried out in the suspension system.
Figure 14B:
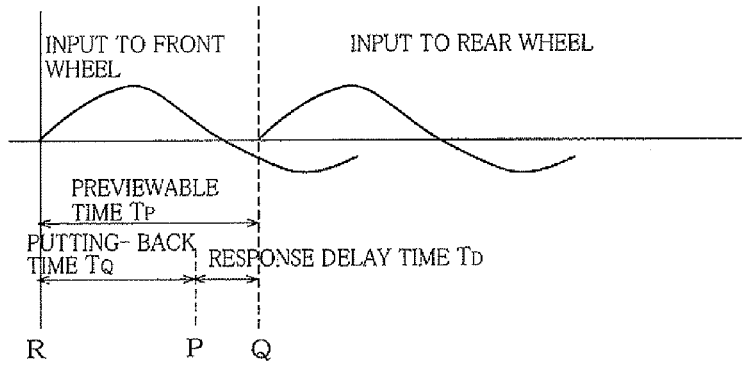
Figure 14C:
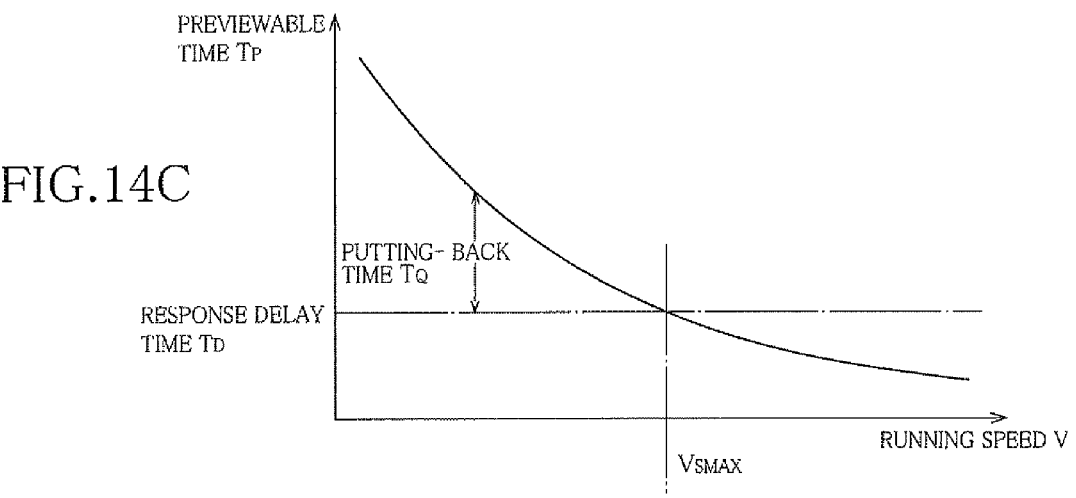

The preview control is a control carried out based on an assumption that, when each of the rear wheels 12RR, RL passes over a portion of a road surface over which a corresponding one of the front wheels 12FR, FL has passed, each of the rear wheels 12RR, RL receives the same input as the corresponding one of the front wheels 12FR, FL has received, and each of the second lower arms 46RR, RL provided for the respective rear wheels 12RR, RL has the same vertical behavior, upon elapse of a predetermined length of time, as a corresponding one of the second lower arms 46FR, FL provided for the respective front wheels 12FR, FL had, as shown in FIGS. 14A-14C. In the present embodiment, as shown in FIG. 14B, the unsprung-portion displacement $X_L$ is obtained based on values that are detected by the sensors 196, 198 on a point (current point) P of time, and a phase of the obtained unsprung-portion displacement $X_L$ is delayed by an amount corresponding to a putting-back time $T_Q$ in a phase delay processing. The target elastic force $F_H$, which is dependent on the thus processed unsprung-portion displacement $X_L$, is calculated and outputted immediately at the above-described point P of time. The vertical force generator 24R initiates working for establishing the target elastic force $F_H$ upon elapse of a response delay time $T_D$, i.e., at a point Q of time. The vertical behavior of the second lower arm 46R provided for each rear wheel 12R at the point Q of time is the same as the vertical behavior of the corresponding front wheel 12F at a point R of time, which is earlier than the point P of time by the putting-back time $T_Q$. Since the vertical force generator 24R is controlled suitably for the actual vertical behavior of the second lower arm 46R provided for each rear wheel 12R, the vibration of the second lower arm 46R can be satisfactorily suppressed.

The previewable time $T_P$ is obtained by dividing a wheel base $L_w$ of the vehicle by a running speed V of the vehicle, as expressed in the following expression:

$$T_P = L_W / V$$

The putting-back time $T_Q$ is a length of time that is obtained by subtracting the response delay time $T_D$ from the previewable time $T_P$, as expressed in the following expression:

$$T_Q = T_P - T_D$$

The previewable time $T_P$ is a length of time from a point of time at which the front wheel 12F passes over projections and recesses on a portion of the road surface until a point of time at which the rear wheel 12R passes over the projections and recesses on the same portion of the road surface. As shown in FIG. 14C, the previewable time $T_P$ is reduced with increase of the running speed V of the same vehicle (as long as the wheel base $L_W$ is unchanged). When the previewable time $T_P$ is not shorter than the response delay time $T_D$, namely, when the putting-back time $T_Q$ is not smaller than 0 (zero), the target elastic force $F_H$ can be prepared and the preview control can be effectively performed. On the other hand, when the previewable time $T_P$ becomes shorter than the response delay time $T_D$ as a result of increase of the running speed, the putting-back time $T_Q$ becomes a negative value so that the target elastic force $F_H$ cannot be prepared. It might be possible to prepare the target elastic force $F_H$ based on the detected values detected at the current point P of time and to output the control command value. However, in this case, initiation of working of the vertical force generator 24R provided for the rear wheel 12R is delayed relative to the actual vertical behavior of the rear wheel 12R, so that the vibration cannot be satisfactorily suppressed by the preview control. In the present embodiment, therefore, the preview control is not carried out when the actual running speed V becomes higher than a predetermined value $V_{SMAX}$ which makes the previewable time $T_P$ equal to the response delay time $T_D$, and which is determined in accordance with the following expression:

$$V_{SMAX} = L_W / T_D$$

Further, during cornering or turning of the vehicle, the vibration cannot be satisfactorily suppressed by the preview control, since a path of each front wheel 12F and that of the corresponding rear wheel 12R are different from each other. In the present embodiment, therefore, the preview control is not carried out when the operating amount of the steering operation member, i.e., a steering angle of a steering wheel (not shown), is larger than a predetermined value, which is a value that permits the vehicle to be regarded to run straight.

As described above, in the present embodiment, the preview control is in principle carried out, when the actual running speed V of the vehicle is not higher than the predetermined value $V_{SMAX}$ and the operating amount of the steering operation member is not larger than the predetermined value, namely, when it is considered that the preview control is effectively performable. However, when the actual running speed V of the vehicle is higher than the predetermined value $V_{SMAX}$ and/or the operating amount of the steering operation member is larger than the predetermined value, the preview control is not carried out.

Figure 15:
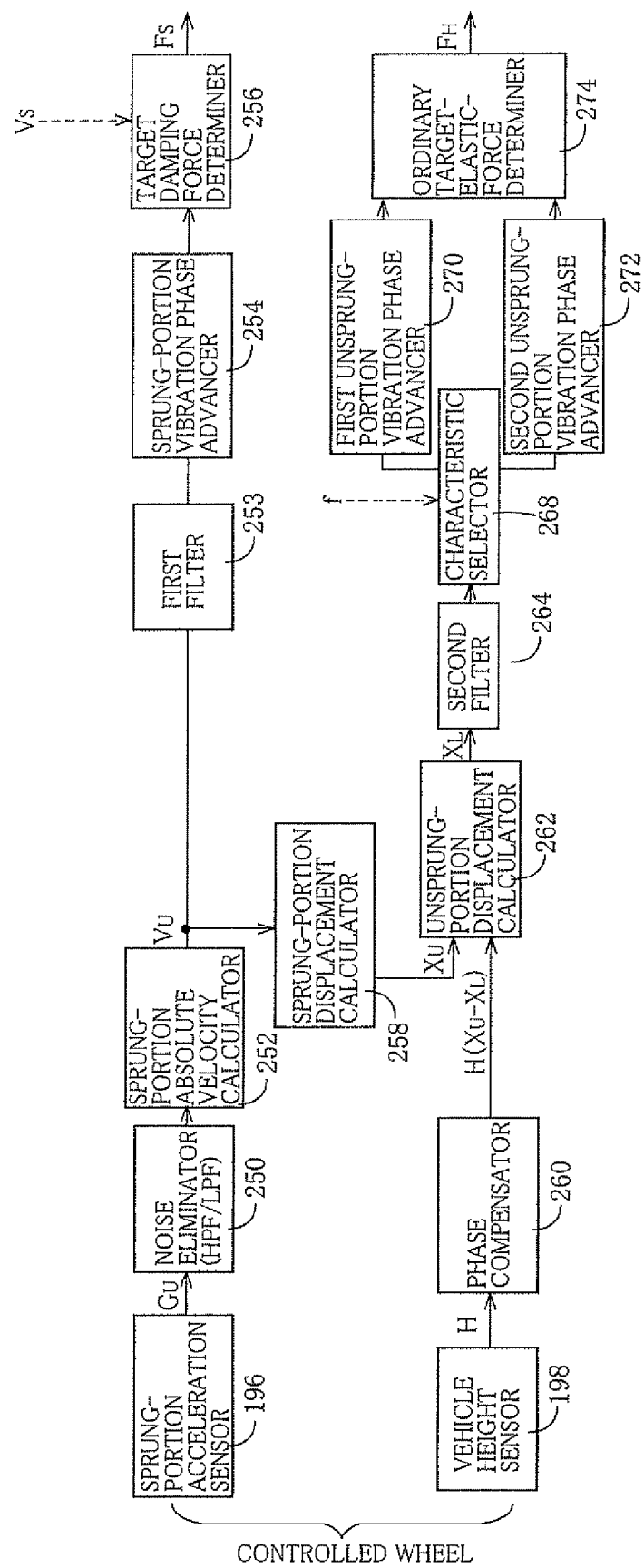
FIG. 15 is a block diagram showing a part of the suspension control unit.

When the ordinary control is carried out, the values detected by the sprung-portion acceleration sensor 196 and the vehicle height sensor 198 are subjected to a series of processings as shown in FIG. 15. The detected value $G_U$ detected by the sprung-portion acceleration sensor 196 (provided in the mount portion 54 that corresponds to the controlled wheel 12ij) is supplied to a noise eliminator 250. The noise eliminator 250 includes a low-pass filter (LPF) and a high-pass filter (HPF), so that vibration components (i.e., noises) whose frequencies are considerably high and components whose frequencies are lower than a cut-off frequency are eliminated from the detected value. The vibration (i.e., sprung-portion acceleration value $G_U$) thus processed by the noise eliminator 250 is supplied to a sprung-portion absolute velocity calculator 252. The sprung-portion acceleration value $G_U$ is integrated whereby the sprung-portion absolute velocity $V_U$ is obtained in the sprung-portion absolute velocity calculator 252. The sprung-portion absolute velocity $V_U$ is then supplied to a first filter 253. The first filter 253 includes a band-pass filter, so as to allow vibration components whose frequencies are within a predetermined frequency range B (see FIG. 12) to pass therethrough. The frequency range B is a range within which the sprung-portion-velocity-basis control is effectively performable. Thus, the vibration components whose frequencies are within the frequency range B are to be subjected to the sprung-portion-velocity-basis control, while the vibrations components whose frequencies are outside the frequency range B are not to be subjected to the sprung-portion-velocity-basis control. To this end, the first filter 253 eliminates the vibration components whose frequencies are outside the frequency range B, so that the vibrations components whose frequencies are outside the frequency range B are not subjected to the sprung-portion-velocity-basis control.

Figure 12:
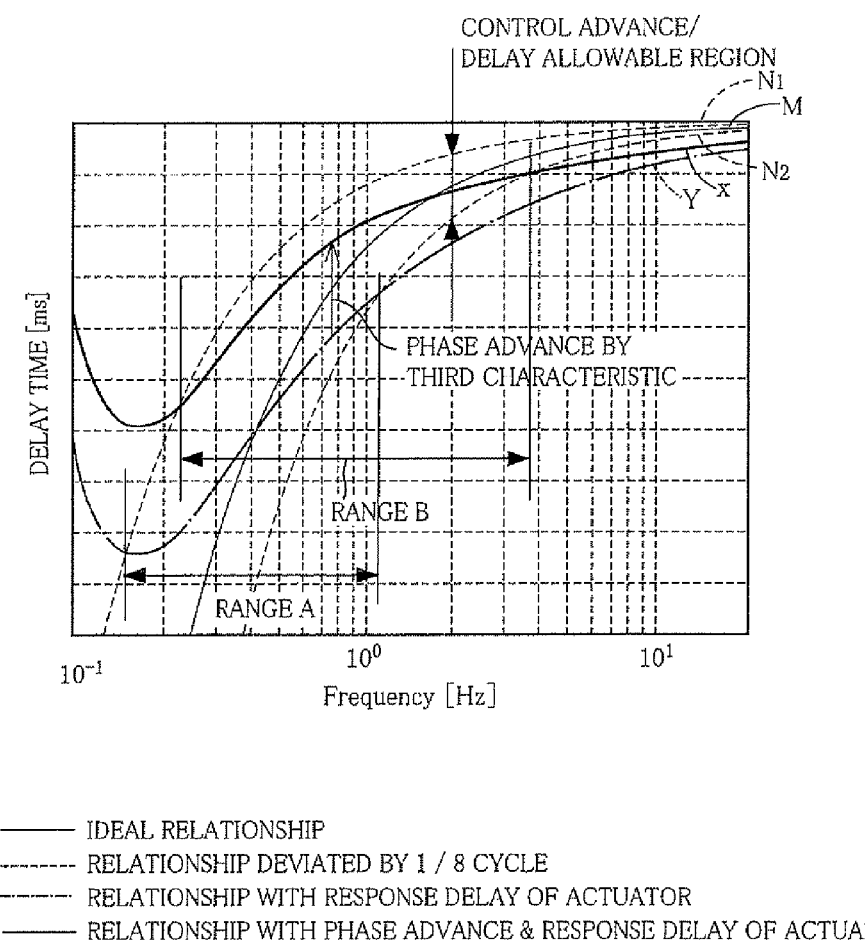
FIG. 12 is a graph showing characteristic of a sprung-portion vibration phase advancer of the suspension control unit.

The vibration (i.e., sprung-portion absolute velocity $V_U$) thus processed by the first filter 253 is supplied to a sprung-portion vibration phase advancer 254, so as to be subjected to a phase advance processing. The sprung-portion vibration phase advancer 254 has a characteristic as shown in FIG. 12, and is configured to advance the phase of the supplied vibration as input signal by a predetermined degree. The vibration (i.e., sprung-portion absolute velocity $V_U$) thus processed by the sprung-portion vibration phase advancer 254 is supplied to a target damping force determiner 256. In the target damping force determiner 256, a target damping force $F_U$ is determined based on the sprung-portion absolute velocity $V_U$. In this instance upon determination of the target damping force $F_U$, the sprung/unsprung-portions relative velocity $V_S$ (i.e., differential of vehicle height value) is also taken into consideration. The sprung-portion absolute velocity $V_U$ obtained by the sprung-portion absolute velocity calculator 252 is supplied also to a sprung-portion displacement calculator 258. In the displacement calculator 258, the absolute velocity $V_U$ is integrated whereby a displacement $X_U$ of the sprung portion (hereinafter simply referred to as sprung-portion displacement $X_U$) is obtained.

The characteristic of the sprung-portion vibration phase advancer 254 is shown in FIG. 12. In FIG. 12, each of thin solid line M and broken lines $N_1$, $N_2$ represents a relationship between the frequency and a delay time without the response delay of the actuator 124 being taken into consideration, in a case in which the processing by the sprung-portion vibration phase advancer 254 is not performed. The delay time is a length of time of delay of the sprung-portion absolute velocity $V_U$ relative to the detected value $G_U$ detected by the sprung-portion acceleration sensor 196. The sprung-portion absolute velocity $V_U$, which is obtained by integrating the detected value $G_U$ detected by the sprung-portion acceleration sensor 196, is delayed relative to the detected value $G_U$ by 90°($\pi/2$) in phase. This phase delay can be converted into a length of time, and can be expressed as the above-described delay time for each frequency level. The thin solid line M represents the relationship between the frequency and the delay time where the sprung-portion absolute velocity $V_U$ is obtained. In other words, since the delay of the sprung-portion absolute velocity $V_U$ relative to the vibration of the sprung-portion absolute velocity $V_U$ is 0 (zero), the relationship represented by the thin solid line M can be referred to as an ideal relationship. Each of the broken lines $N_1$, $N_2$ represents the relationship between the frequency and the delay time, which is deviated from the relationship represented by the thin solid line M by one-eighth (⅛) cycle ($\pi/4$) in phase. The relationship represented by the broken line $N_1$ is advanced relative to the ideal relationship by one-eighth cycle in phase, while relationship represented by the broken line $N_2$ is delayed relative to the ideal relationship by one-eighth cycle in phase. It is known that the vibration suppressing effect can be obtained even when the control is carried out with a delay relative to the actual vibration as long as an amount of the delay is not larger than one-eighth (⅛) cycle of the vibration. Therefore, a region defined between the two thin broken lines $N_1$, $N_2$ may be referred to as control advance/delay allowable region. The vibration can be satisfactorily suppressed by the control by using the relationship between the frequency and the delay time, when the used relationship lies within the control advance/delay allowable region. It is noted that, in graph of FIG. 12, the delay time is represented in ordinate of the graph, and is reduced and increased in upward and downward directions, respectively, as seen in the graph of FIG. 12.

Each of thick solid line X and one-dot chain line Y represents a relationship between the frequency and the delay time with the response delay of the actuator 124 being taken into consideration. The one-dot chain line Y represents the relationship between the frequency and the delay time in a case in which the processing by the sprung-portion vibration phase advancer 254 is not performed. The thick solid line X represents the relationship between the frequency and the delay time in a case in which the processing by the sprung-portion vibration phase advancer 254 is performed. In the relationship represented by the one-dot chain line Y, in principle, the delay time is longer by the response delay time of the actuator 124 than in the relationship represented by the thin solid line M, but the delay time is reduced due to, for example, characteristic of the noise eliminator 250 in a low frequency range. In the relationship represented by the thick solid line X, the delay time is shorter by a length of time corresponding to a degree in phase, which is dependent on characteristic of the sprung-portion vibration phase advancer 254, than in the relationship represented by the one-dot chain line Y. Where the phase is advanced by a certain degree irrespective of value of the frequency, a length of time corresponding to the certain degree in phase is longer in a case in which the frequency is low, than in a case in which the frequency is high. Therefore, a difference of the delay time between the relationships represented by the one-dot chain line Y and the thick solid line X, i.e., a gap between the one-dot chain line Y and the thick solid line X, is larger in the case of the low frequency, than in the case of the high frequency. Each of the relationships represented by the respective thick solid line X and one-dot chain line Y contains a range in which the control is effectively performable and which is defined between the two thin solid lines $N_1$, $N_2$. The control effectively performable range in the case in which the phase advance processing is not performed, i.e., the range in which the one-dot chain line Y is within the control advance/delay allowable region, is represented by the range A. The control effectively performable range in the case in which the phase advance processing is performed, i.e., the range in which the thick solid line X is within the control advance/delay allowable region, is represented by the range B. As is apparent from FIG. 12, the range B covers a higher frequency range, as compared with the range A. Further, the sprung-portion resonance frequency, which is dependent on specification of the vehicle, lies in substantially a central portion of the range B. Therefore, where the control is effectively performable in the range B, the vibration of the sprung-portion resonance frequency can be satisfactorily suppressed whereby the ride comfort can be improved, even if the sprung-portion resonance frequency is somewhat changed due to change in weight of luggage loaded on the vehicle and weight of passenger riding on the vehicle. The degree by which the phase is advanced in the sprung-portion vibration phase advancer 254 is referred to as third characteristic.

In the present embodiment, the characteristic (filter characteristic) of each processing portion is evaluated based on the relationship between the frequency and the delay time, as shown in FIG. 12. Conventionally, the characteristic has been evaluated based on a relationship between the frequency and delay in phase. The replacement of the phase delay with the delay time provides an advantage that the characteristic can be easily evaluated with the response delay of the actuator 124 being taken into consideration. Since the response delay time of the actuator 124 is a value that is constant irrespective of the value of the frequency, the relationship between the frequency and the delay time that includes the response delay time of the actuator 124 can be obtained by shifting the relationship between the frequency and the delay time that does not include the response delay time of the actuator 124, by an amount corresponding to the response delay time of the actuator 124. Thus, it is possible to easily obtain the relationship between the frequency and the delay time including the response delay time and accordingly to evaluate the filter based on the total delay time including the response delay time.

Meanwhile, the detected value H detected by the vehicle height sensor 198 is supplied to a phase compensator 260, as shown in FIG. 15, so as to be subjected to a phase compensation. It is known that, due to characteristics of the sprung-portion acceleration sensor 196 and the vehicle height sensor 198, the detected value detected by the vehicle height sensor 198 is deviated in phase from the detected value detected by the sprung-portion acceleration sensor 196 in a certain frequency range. The phase compensation is carried out for compensating the phase deviation. The vehicle height value H (i.e., displacement of the sprung portion relative to the unsprung portion) processed by the phase compensator 260 is supplied to an unsprung-portion displacement calculator 262. To the unsprung-portion displacement calculator 262, the output value (i.e., sprung-portion displacement $X_U$) of the sprung-portion displacement calculator 258 is also supplied, so that the unsprung-portion displacement $X_L$ is calculated in accordance with the following expression:

$$X_L = X_U - H = X_U - (X_U - X_L)$$

The thus obtained unsprung-portion displacement $X_L$ is supplied to a characteristic selector 268 (that may be referred to as filter selector or processing portion selector) via a second filter 264. The second filter 264 includes a band-pass filter, so as to allow vibration components whose frequencies are within a predetermined frequency range including ranges $B_1$, $B_2$ (see FIGS. 13A and 13B) to pass therethrough and remove vibration components whose frequencies are outside the predetermined frequency range including the ranges $B_1$, $B_2$, so that the vibration components whose frequencies are outside the effective range are not subjected to the unsprung-portion-displacement-basis control.

The characteristic selector 268 is configured to select a first unsprung-portion vibration phase advancer 270 when the frequency of the actual vibration of the unsprung portion is not higher than a predetermined threshold value fth and to select a second unsprung-portion vibration phase advancer 272 when the frequency of the actual vibration of the unsprung portion is higher than the predetermined threshold value fth. The first unsprung-portion vibration phase advancer 270 has a first characteristic and may be referred to as low-frequency vibration processing portion, while the second unsprung-portion vibration phase advancer 272 has a second characteristic and may be referred to as high-frequency vibration processing portion. In the present embodiment, the predetermined threshold value fth is about 4 Hz as an upper limit of the range B. The threshold value fth may be larger or smaller than 4 Hz, as long as the threshold value fth is higher than the sprung-portion resonance frequency and is not higher than the unsprung-portion resonance frequency. When the first unsprung-portion vibration phase advancer 270 is selected by the characteristic selector 268, the unsprung-portion displacement $X_L$ processed by the second filter 264 is supplied to the first unsprung-portion vibration phase advancer 270, and is subjected to the phase advance processing performed in accordance with the first characteristic. When the second unsprung-portion vibration phase advancer 272 is selected by the characteristic selector 268, the unsprung-portion displacement $X_L$, processed by the second filter 264 is supplied to the second unsprung-portion vibration phase advancer 272, and is subjected to the phase advance processing performed in accordance with the second characteristic. The second characteristic is different from the first and third characteristics with respect to a degree by which the phase of the vibration is advanced. The phase of the vibration is advanced by a larger degree when the phase advance processing is performed in accordance with the second characteristic, than when the phase advance processing is performed in accordance with the first or third characteristic. In the present embodiment, the degree by which the phase of the vibration is advanced is smaller than 90° (0.5π), irrespective of which one of the first, second and third characteristics is selected. The first, second and third characteristics are different from each other with respect to the degree by which the phase of the vibration is advanced. When the phase advance processing is performed in accordance with the first characteristic, the phase of the vibration is advanced by 50° (0.27π). When the phase advance processing is performed in accordance with the third characteristic, the phase of the vibration is advanced by 60° (0.33π). When the phase advance processing is performed in accordance with the second characteristic, the phase of the vibration is advanced by 85° (0.47π). After being subjected to the phase advance processing performed by either one of the first and second unsprung-portion vibration phase advancers 270, 272, the unsprung-portion displacement $X_L$, is supplied to an ordinary target-elastic-force determiner 274.

Figure 13A:
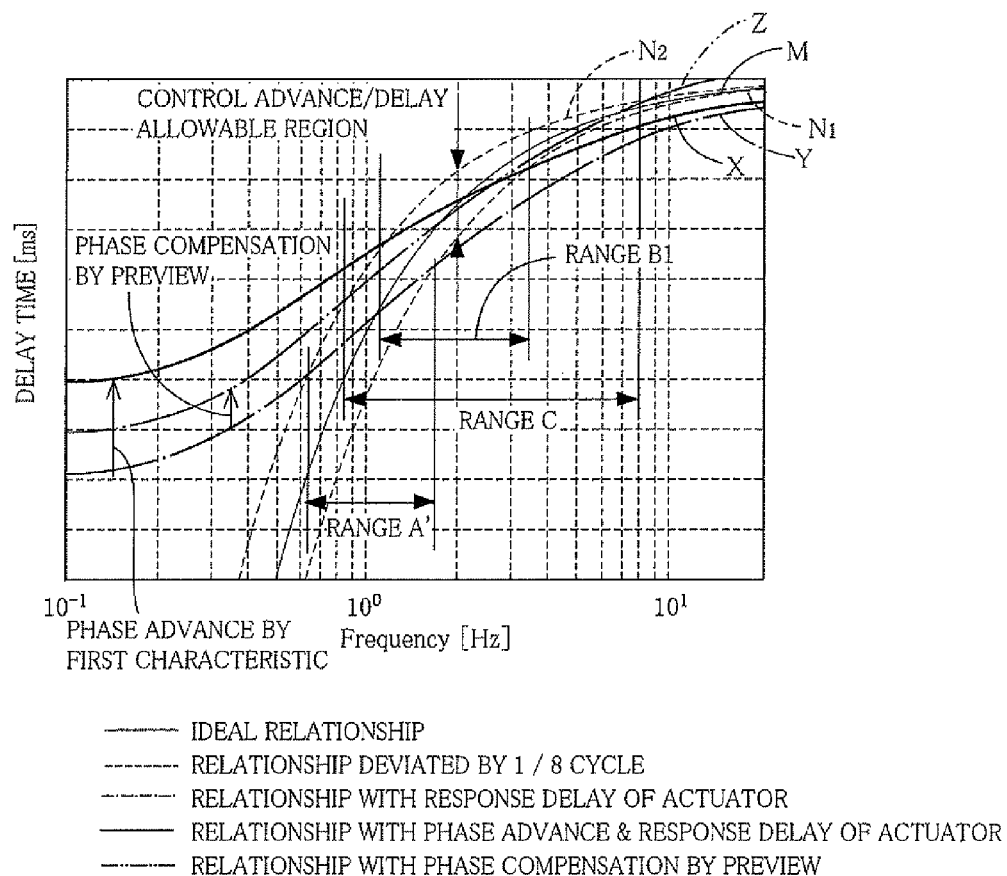
FIG. 13A is a graph showing characteristic of a first unsprung-portion vibration phase advancer of the suspension control unit.
Figure 13B:
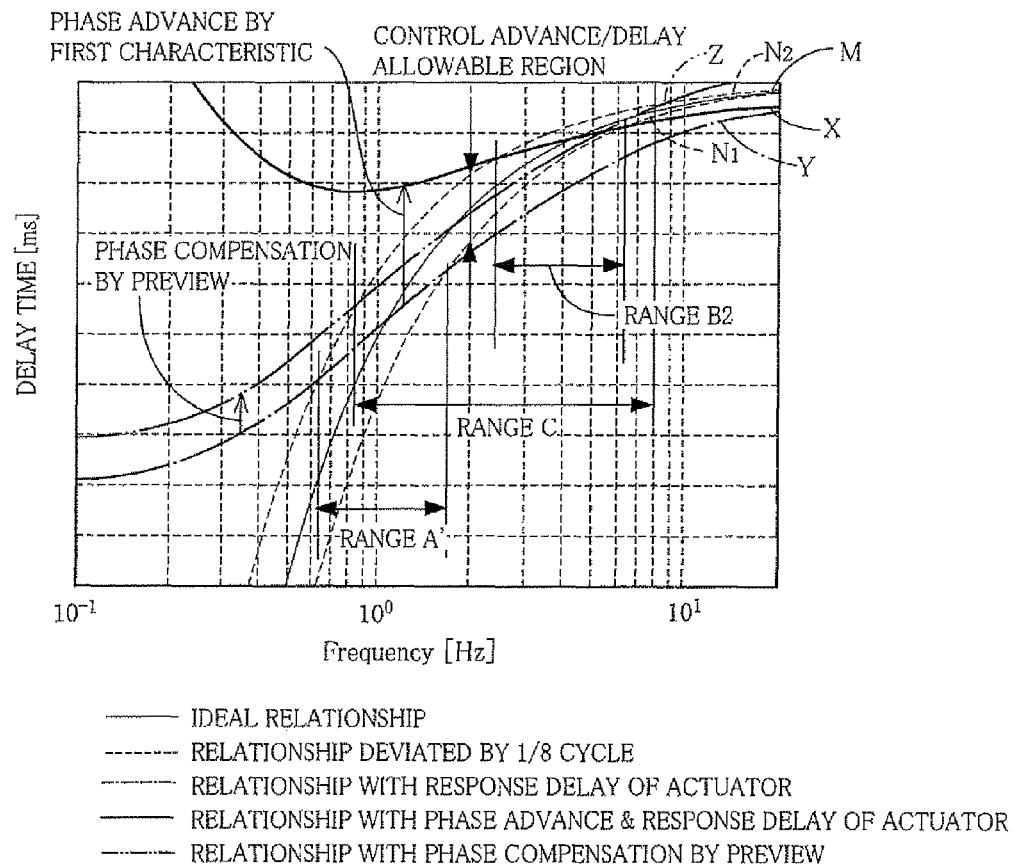
FIG. 13B is a graph showing characteristic of a second unsprung-portion vibration phase advancer of the suspension control unit.

FIG. 13A shows the first characteristic contained in the first unsprung-portion vibration phase advancer 270. FIG. 13B shows the second characteristic contained in the second unsprung-portion vibration phase advancer 272. As in FIG. 12, in FIGS. 13A and 13B, each of the thin solid line M and broken lines $N_1$, $N_2$ represents a relationship between the frequency and the delay time without the response delay of the actuator 124 being taken into consideration. The unsprung-portion displacement $X_L$ is obtained by twice integrating the detected value $G_U$ detected by the sprung-portion acceleration sensor 196, namely, by integrating the detected value $G_U$ by the sprung-portion absolute velocity calculator 252 and the sprung-portion displacement calculator 258. Therefore, the unsprung-portion displacement $X_L$ is delayed relative to the detected value $G_U$ by 180° (π) in phase. This phase delay can be converted into a length of time, and can be expressed as the delay time for each frequency level. The relationship between the delay time and the frequency is represented by the thin solid line M. Each of the broken lines $N_1$, $N_2$ represents the relationship between the frequency and the delay time, which is deviated from the relationship represented by the thin solid line M by one-eighth (⅛) cycle (π/4) in phase. The region defined between the two thin broken lines $N_1$, $N_2$ may be referred to as the control advance/delay allowable region. It is noted that, also where the unsprung-portion displacement $X_L$ is obtained based on a value $G_L$ detected by an unsprung-acceleration sensor, the unsprung-portion displacement $X_L$ is obtained by twice integrating the detected value $G_L$.

As in FIG. 12, in FIGS. 13A and 13B, each of the thick solid line X and one-dot chain line Y represents a relationship between the frequency and the delay time with the response delay of the actuator 124 being taken into consideration. The one-dot chain line Y represents the relationship between the frequency and the delay time in a case in which the processing by the first unsprung-portion vibration phase advancer 270 or second unsprung-portion vibration phase advancer 272 is not performed. The thick solid line X represents the relationship between the frequency and the delay time in a case in which the processing by the first unsprung-portion vibration phase advancer 270 or second unsprung-portion vibration phase advancer 272 is performed. In the relationship represented by the thick solid line X, the delay time is shorter by a length of time corresponding to a degree in phase, which is dependent on characteristics of the unsprung-portion vibration phase advancers 270, 272, than in the relationship represented by the one-dot chain line Y.

As is apparent from FIGS. 13A and 13B, the degree of phase advance in accordance with the second characteristic shown in FIG. 13B is larger than that in accordance with the first characteristic shown, in FIG. 13A. When the phase advance processing is performed in accordance with the first characteristic, the control effectively performable range is shifted from the range A' to the range $B_1$, as shown in FIG. 13A. When the phase advance processing is performed in accordance with the second characteristic, the control effectively performable range is shifted from the range A' to the range $B_2$, as shown in FIG. 13B. The range $B_2$ covers a higher frequency range, as compared with the range A'. The range $B_1$ includes the sprung-portion resonance frequency while the range $B_2$ includes the unsprung-portion resonance frequency. Therefore, in the present embodiment, the first unsprung-portion vibration phase advancer 270 is selected when the frequency of the vibration of the unsprung portion is not higher than the above-described predetermined threshold value fth, and the second unsprung-portion vibration phase advancer 272 is selected when the frequency of the vibration of the unsprung portion is higher than the above-described predetermined threshold value fth.

Figure 16:
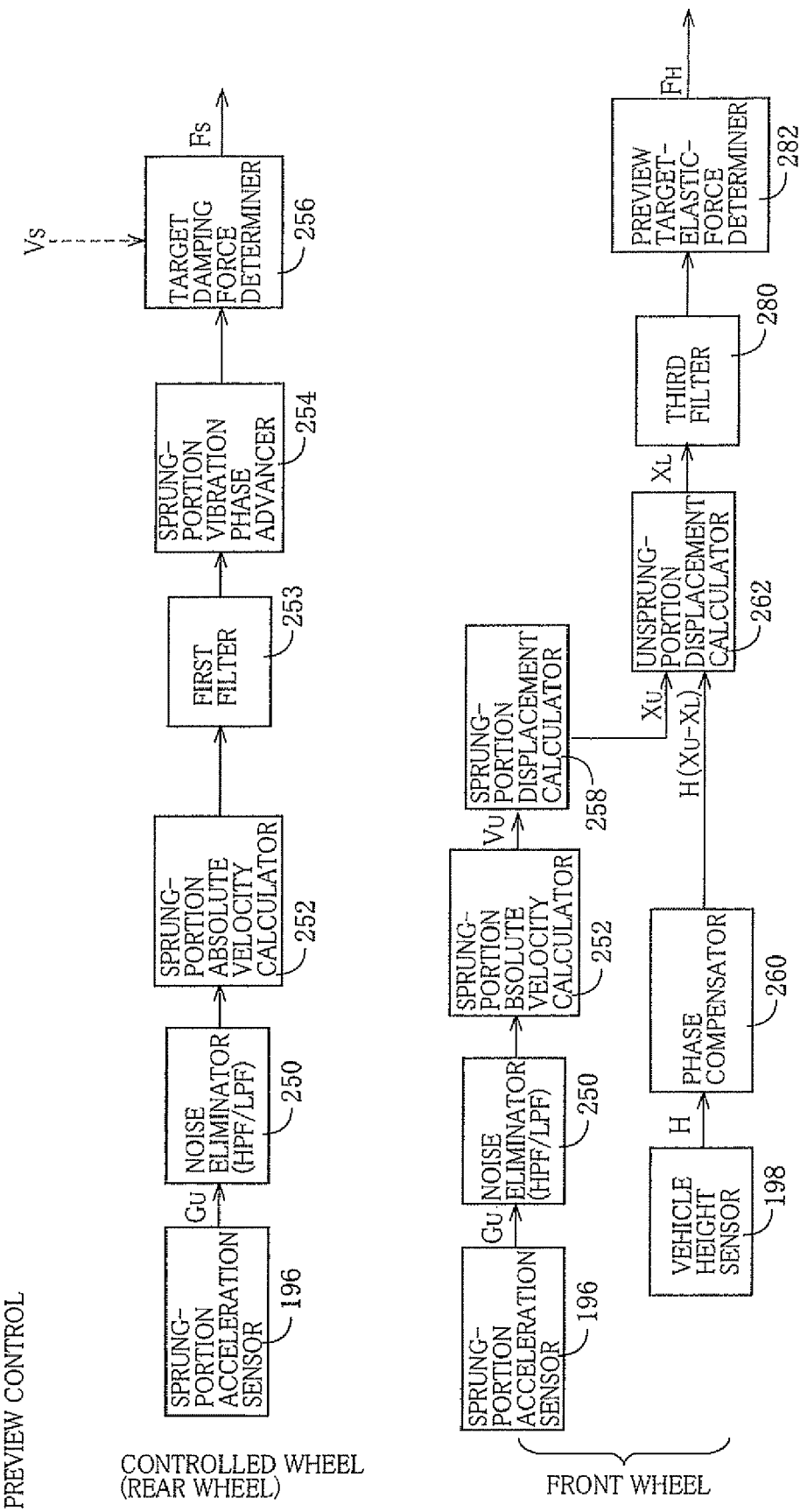
FIG. 16 is a block diagram showing another part of the suspension control unit.

When the preview control is carried out, the values detected by the sprung-portion acceleration sensor 196 and the vehicle height sensor 198 are subjected to a series of processings as shown in FIG. 16. The same reference signs will be used to identify processing portions having the same procedures or functions as those in the above-described processing in the ordinary control as shown in FIG. 15, and descriptions of these portions will be omitted. The sprung-portion-velocity-basis control is carried out through substantially the same procedures as in the ordinary control. The sprung-portion absolute velocity $V_U$ is obtained based on the value $G_U$ detected by the sprung-portion acceleration sensor 196 provided in the mount portion 54 that corresponds to the rear wheel 12ij as the controlled wheel, and the target damping force $F_S$ is determined based on the obtained sprung-portion absolute velocity $V_U$. In the unsprung-portion-displacement-basis control that is carried out for suppressing the vibration of the second lower arm 46 provided for the controlled rear wheel 12Rj, the unsprung-portion displacement $X_L$, in the form of the displacement of the second lower arm 46 that is provided for the front wheel 12Fj (that is located in the same side as the controlled rear wheel 12Rj) is obtained based on the values $G_U$, H detected by the sprung-portion acceleration sensor 196 and vehicle height sensor 198 provided in the portion of the vehicle body 14 that corresponds to the same front wheel 12 Fj. The thus obtained unsprung-portion displacement $X_L$, is supplied to a third filter 280 that allows vibration components whose frequencies are within a frequency range C (which will be described below) to pass therethrough. The third filter 280 eliminates the vibration components whose frequencies are outside the preview-control effectively performable range C. The vibration components (unsprung-portion displacement $X_L$) allowed to pass through the third filter 280 are supplied to a preview target-elastic-force determiner 282 by which a preview target elastic force is determined. In the preview target-elastic-force determiner 282, the phase of the unsprung-portion displacement $X_L$ is delayed by an amount corresponding to the putting-back time $T_Q$, and the target elastic force $F_H$ is determined based on the unsprung-portion displacement $X_L$ that has been subjected to the phase delay processing.

In FIGS. 13A and 13B, a two-dot chain line Z represents a relationship between the frequency and the delay time in a case in which the preview control is performed. In the relationship represented by the two-dot chain line Z, the delay time is shorter by the response delay time $T_D$ of the actuator 124 than in the relationship represented by the one-dot chain line Y. In the preview control in which the response delay time $T_P$ of the actuator 124 is taken into consideration, it is possible to practically eliminate the response delay time. The above-described preview-control effectively performable range C is a range in which the two-dot chain line Z is within the region defined between the two thin solid lines $N_1$, $N_2$, and is wide enough to include the ranges $B_1$, $B_2$.

When the preview control is effectively performable, the target vertical force $F_B^*$ is a sum of the target damping force $F_S$ determined for the rear wheel 12R in the target damping force determiner 256 and the target elastic force $F_H$ determined in the preview target-elastic-force determiner 282. As shown in FIG. 1A, in a case in which the frequency of vibration of the unsprung portion is not higher than the predetermined threshold value fth, the sprung-portion-velocity-basis control and the unsprung-portion-displacement-basis control (preview control) are both carried out when the vibration frequency lies within the preview-control effectively performable range C, and only the sprung-portion-velocity-basis control is carried out without the preview control being carried out when the vibration frequency does not lie within the preview-control effectively performable range C. As shown in FIG. 1B, in a case in which the frequency of vibration of the unsprung portion is higher than the predetermined threshold value fth, the preview control is carried out without the sprung-portion-velocity-basis control being carried out when the vibration frequency lies within the preview-control effectively performable range C. The target vertical force $F_B^*$ that is to be generated by the vertical force generator 24 provided for the front wheel 12F, is a sum of the target damping force $F_S$ determined in the target damping force determiner 256 and the target elastic force $F_H$ determined in the ordinary target-elastic-force determiner 274. The target vertical force $F_B^*$ that is to be generated by the vertical force generator 24 provided for the rear wheel 12R in a case in which the preview control is not effectively performable, is also a sum of the target damping force $F_S$ determined in the target damping force determiner 256 and the target elastic force $F_H$ determined in the ordinary target-elastic-force determiner 274. As shown in FIG. 1A, in a case in which the frequency of vibration of the unsprung portion is not higher than the predetermined threshold value fth, the sprung-portion-velocity-basis control and the unsprung-portion-displacement-basis control (ordinary control) are both carried out when the vibration frequency lies within the range $B_1$, and only the sprung-portion-velocity-basis control is carried out without the unsprung-portion-displacement-basis control (ordinary control) being carried out when the vibration frequency does not lie within the range $B_1$. As shown in FIG. 1B, in a case in which the frequency of vibration of the unsprung portion is higher than the predetermined threshold value fth, only the unsprung-portion-displacement-basis control (ordinary control) is carried out without the sprung-portion-velocity-basis control being carried out when the vibration frequency lies within the range $B_2$.

As shown in FIG. 1A, when the sprung-portion-velocity-basis control and the unsprung-portion-displacement-basis control (ordinary control or preview control) are both carried out, the sprung-portion-vibration-directed gain $G_S$ used for the sprung-portion-velocity-basis control is set to 0.5 while the unsprung-portion-vibration-directed gain $G_H$ used for the unsprung-portion-displacement-basis control is set to 0.8. As is obvious from an experiment or simulation, when the sprung-portion-velocity-basis control and the unsprung-portion displacement control (ordinary control or preview control) are both carried out, the vibration of the sprung portion can be more satisfactorily suppressed in the arrangement in which the gain $G_H$ is larger than the gain $G_S$. In this sense, the gain $G_H$ used for the unsprung-portion-displacement-basis control and the gain $G_S$ used for the sprung-portion-velocity-basis control may be referred to as a larger gain and a smaller gain, respectively.

Figure 25A:
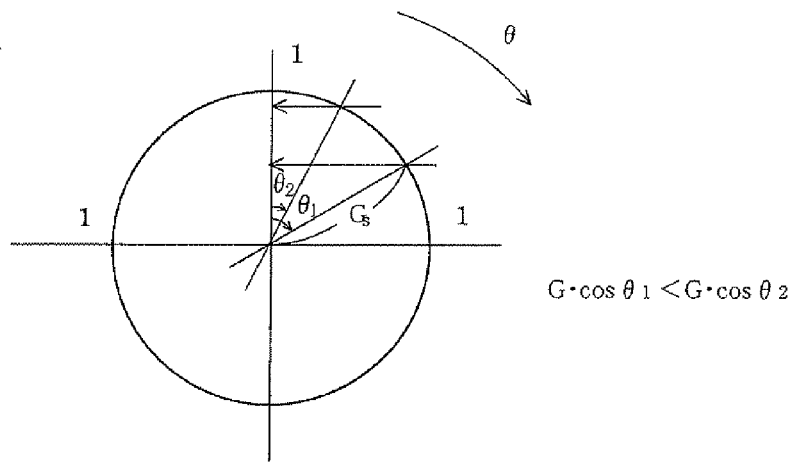
FIGS. 25A-25C are views for explaining a method of determining gains used for a sprung-portion-velocity-basis control and an unsprung-portion-displacement-basis control.
Figure 25B:
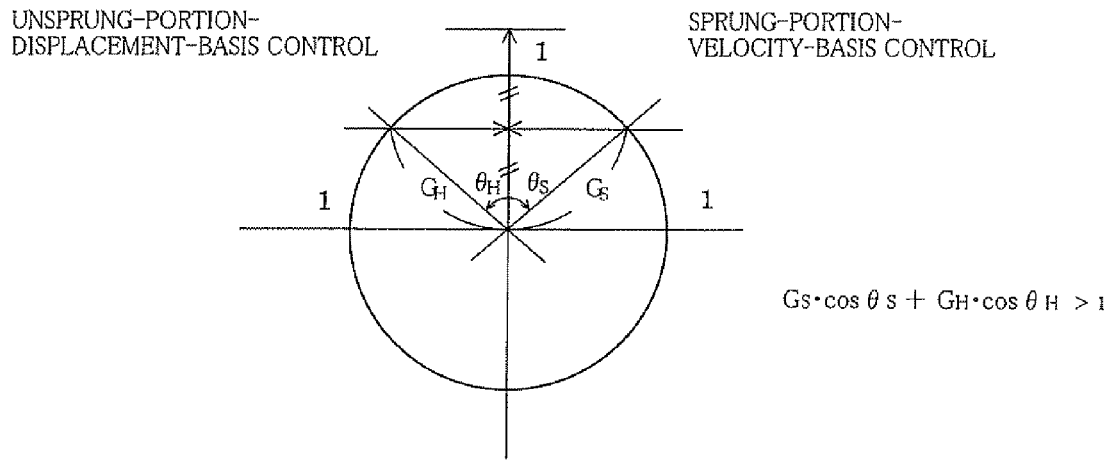
Figure 25C:
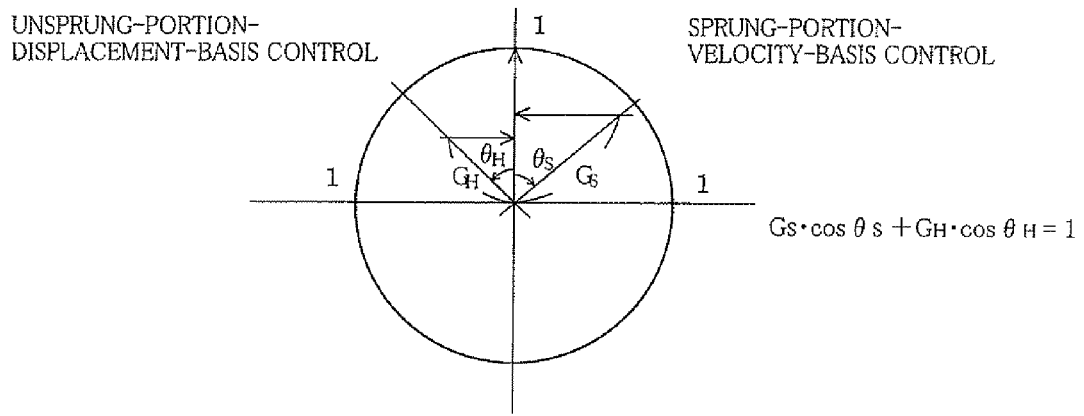

As described above, each of the sprung-portion-velocity-basis control and unsprung-portion-displacement-basis control can be carried out with a deviation from the actual vibration by an amount that is not larger than one-eighth (⅛) cycle of the vibration or 45° in phase of the vibration. FIG. 25A shows a ratio of contribution of the gain for suppressing the vibration, which is represented by $G \cdot \cos|\theta|$ where the deviation is represented by an absolute value $\theta$ in phase. As is apparent from FIG. 25A, the ratio of contribution of the gain is smaller when the deviation is large than when the deviation is small.

$$|\theta_1| > |\theta_2|$$

$$G \cdot \cos|\theta_1| < G \cdot \cos|\theta_2|$$

Where each of the gains $G_S$, $G_H$ used for the sprung-portion-velocity-basis control and unsprung-portion-displacement-basis control is set to 1 (one), as shown in FIG. 25B, the control for suppressing the vibration becomes excessive. That is, it is not desirable that each of the gains $G_S$, $G_H$ is set to one.

$$G_S \cdot \cos \theta_S + G_H \cdot \cos \theta_H > 1$$

$$G_S = G_H = 1$$

It is desirable that a sum of the ratio of contribution of the gain $G_S$ used for the sprung-portion-velocity-basis control and the ratio of contribution of the gain $G_H$ used for the unsprung-portion-displacement-basis control equals to 1 (one). That is, it is desirable to satisfy the following expression:

$$G_S \cdot \cos \theta_S + G_H \cdot \cos \theta_H > 1$$

From the above expression, it is understood that, in a case in which the sprung-portion-velocity-basis control and unsprung-portion-displacement-basis control are carried out with the same amount of deviation from the actual vibration, one of the gains $G_S$, $G_H$ may be reduced when the other of the gains $G_S$, $G_H$ is increased.

The backgrounds as described above are taken into consideration upon determination of the gains $G_S$, $G_H$ used for the sprung-portion-velocity-basis control and unsprung-portion-displacement-basis control. The gain $G_S$ does not necessarily have to be set to 0.5, while the gain $G_H$ does not necessarily have to be set to 0.8. The gain $G_S$ may be set to a value selected from a range of 0.1 to 1.2, while the gain $G_H$ may be set to a value selected from a range of 0.3 to 1.5. The gain $G_S$ is preferably not larger than 1.2, more preferably not larger than 1.0, still more preferably not larger than 0.8, and is preferably not smaller than 0.2, more preferably not smaller than 0.4.

The gain $G_H$ is preferably not larger than 1.3, more preferably not larger than 1.1, still more preferably not larger, than 0.9, and is preferably not smaller than 0.3, more preferably not smaller than 0.5.

As shown in FIG. 1B, the gain $G_H$ may be set to 1.0 when used for the ordinary unsprung-portion-displacement-basis control, while the gain $G_H$ is set to 0.8 when used for the preview unsprung-portion-displacement-basis control. In the present embodiment, the gain $G_H$ used for the preview control is always set to 0.8 irrespective of value of the vibration frequency.

Figure 17:
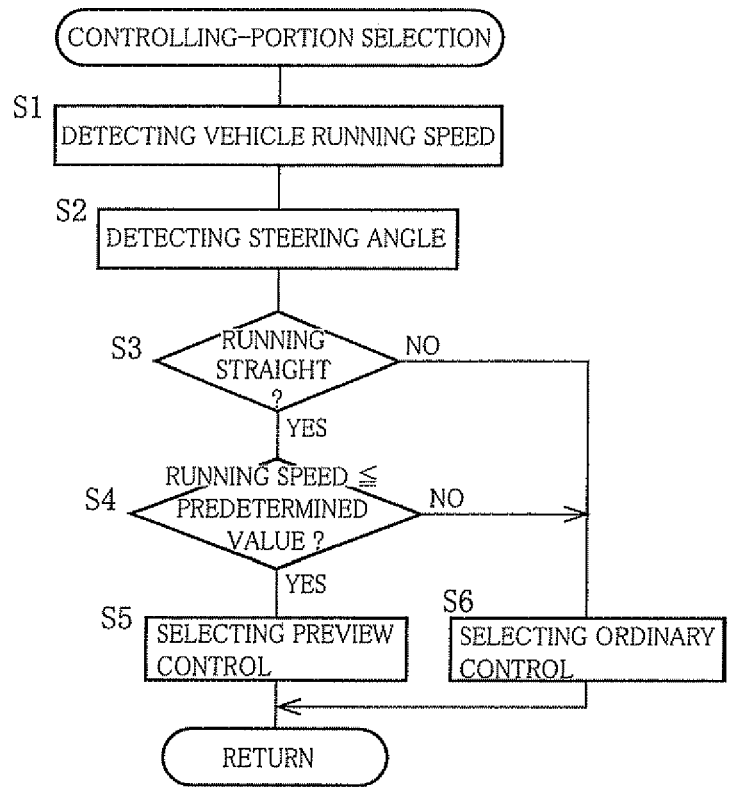
FIG. 17 is a flow chart showing a controlling-portion selecting routine program that is stored in a storage portion of the suspension control unit.

The above-described controls are carried out by executions of routine program shown by flow charts of FIGS. 17-23. Where the controlled wheel is provided by each front wheel 12F, the ordinary control is always carried out. Where the controlled wheel is provided by each rear wheel 12R, a controlling-portion selecting routine program shown by the flow chart of FIG. 17 is executed at a predetermined time interval. The controlling-portion selecting routine program is initiated with step S1 that is implemented to detect the vehicle running speed V. In step S2, the steering angle θ of the steering wheel as the steering operation member is detected. Then, step S3 is implemented to judge whether an absolute value of the steering angle θ is equal to or smaller than a predetermined value θth that permits the vehicle to be regarded to run straight. In step S4, it is determined whether the running speed V is equal to or lower than a predetermined value $V_{SMAX}$. When a positive judgment (YES) is obtained in both of steps S3 and S4, it is considered that the preview control is effectively performable and the control flow goes to step S5 that is implemented to select the preview control. On the other hand, when a negative judgment (NO) is obtained in either of steps S3 and S4, namely, when the vehicle is being turning or running at a speed V higher than the predetermined value $V_{SMAX}$, it is not considered that the preview control is not effectively performable and the control flow goes to step S6 that is implemented to select the ordinary control.

Figure 18:
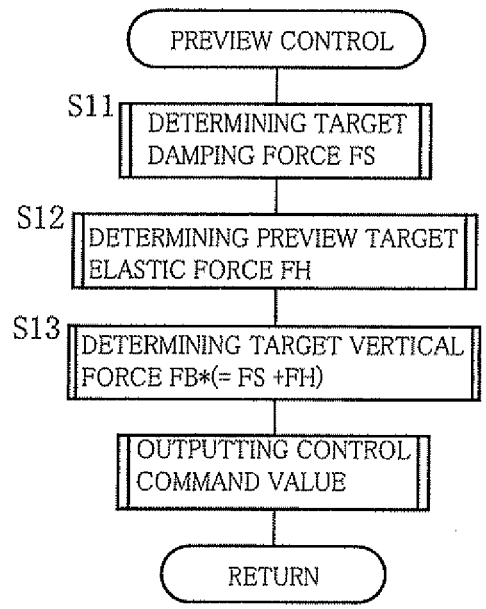
FIG. 18 is a flow chart showing a preview controlling routine program that is stored in the storage portion of the suspension control unit.

When the preview control is selected, a preview controlling routine program shown by the flow chart of FIG. 18 is executed. Steps S11 and S12 are implemented to determine the target damping force $F_S$ and the preview target elastic force $F_H$, respectively. In step S13, the target vertical force $F_B^*$ is determined as a sum of the target damping force $F_S$ and the preview target elastic force $F_H$. Step S14 is implemented to obtain the target rotational angle $θ_M^*$ corresponding to the target vertical force $F_B^*$ and determine the supplied electric current i* based on the target rotational angle $θ_M^*$. Then, in step S14, the control command value is prepared based on, for example, values of the supplied electric current i* and target vertical force $F_B^*$ and changes of the values of the current i* and force $F_B^*$, and the prepared control command value is outputted.

$F_B^* = F_S + F_H$, $θ_M^* = f(F_B^*)$, $i^* = g(θ_M^*)$, where "f" and "g" represent predetermined functions.

Figure 23:
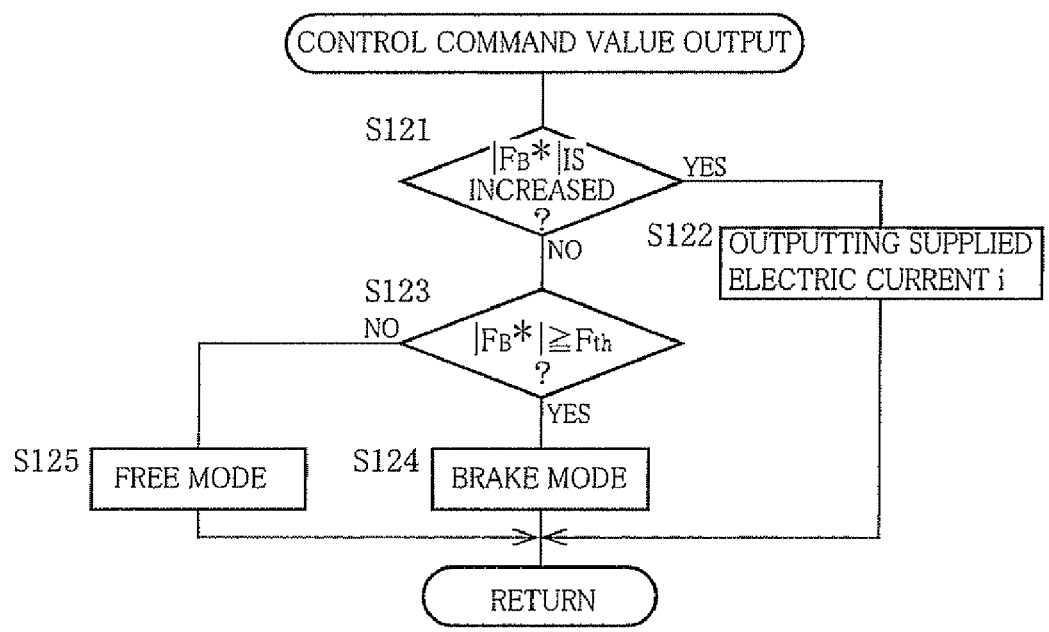
FIG. 23 is a flow chart showing a control command value outputting routine program as a sub-routine program of each of the above-described preview controlling routine program and ordinary controlling routine program.
Figure 24:
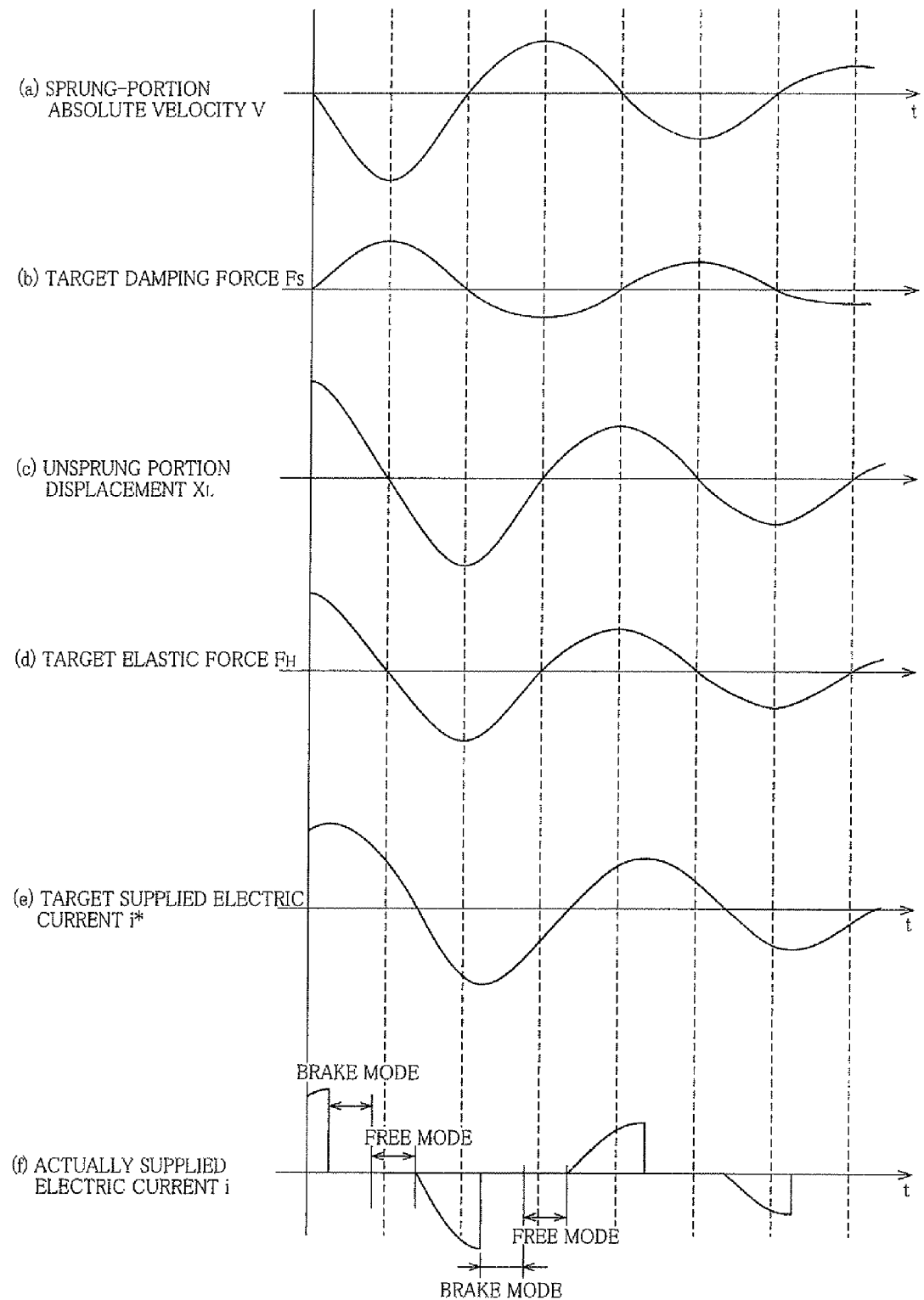
FIG. 24 is a graph showing the control command value.

Step S14 is implemented by execution of a control command value outputting routine program that is shown by the flow chart of FIG. 23. In step S121, it is judged whether an absolute value of the target vertical force $F_B^*$ is being increased or not. When it is being increased, step S122 is implemented to output the control command value representing the supplied electric current i*, which is supplied to the inverter 178. When it is not being increased, namely, when it is reduced or substantially held constant, step S123 is implemented to judge whether the absolute value of the target damping force $F_B^*$ is equal to or larger than the threshold value Fth. When it is not smaller than the threshold value Fth, step S124 is implemented to select the braking mode as one of the operational modes of the electric motor 140, and the control command value representing the selection of the braking mode is outputted. When it is smaller than the threshold value Fth, step S125 is implemented to select the free mode as one of the operational modes of the electric motor 140, and the control command value representing the selection of the free mode is outputted. As shown in FIG. 24, the electric current is supplied to the motor 140 when the absolute value of the target vertical force $F_B^*$ is being increased, and is not supplied to the motor 140 when the absolute value of target vertical force $F_B^*$ is being reduced. A load applied to the wheel 12 constitutes a force which acts between the sprung and unsprung portions and which is applied to the actuator 124 via the second lower arm 46 and the L-shaped bar 122, whereby the motor 140 is returned to the reference angular position even without supply of the electric current the motor 140. Further, although the actuator 124 whose positive/negative efficiency product is low is hard to be affected by influence of the external force, the motor 140 is moved by the external force so as to be returned to the reference angular state when being placed in the free mode. Thus, the supply of the electric current is stopped when the absolute value of the damping force is to be reduced, thereby making it possible to reduce consumption of the electric power. Further, since the motor 140 is placed in the braking mode when the absolute value of the target damping force $F_B^*$ is large, it is possible to avoid the absolute value of the damping force from being abruptly reduced by the external force. Still further, when the absolute value of the target damping force $F_B^*$ is being reduced, it is possible to regenerate an energy and accordingly to further improve the energy efficiency. Moreover, since the motor 140 is not energized when the absolute value of the target damping force $F_B^*$ is being reduced, the rotational direction of the motor 140 is changeable more quickly than in an arrangement in which the motor 140 is energized even in reduction of the absolute value of the target damping force $F_B^*$, thereby avoiding reduction of responsiveness of the motor 140. It is noted that the graph of FIG. 24 shows a presumed case in which the frequency of vibration of the sprung portion and the frequency of vibration of the unsprung portion are equal to each other.

Figure 19:
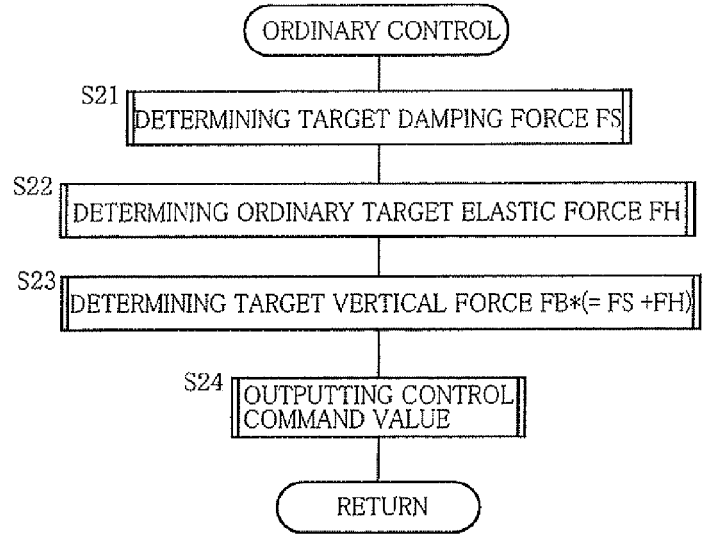
FIG. 19 is a flow chart showing an ordinary controlling routine program that is stored in the storage portion of the suspension control unit.

FIG. 19 is a flow chart showing an ordinary controlling routine program that is executed for carrying out the above-described ordinary control that is performed for each front wheel 12F and also for each rear wheel 12R when the ordinary control is selected for the rear wheel 12R. Steps S21 and S22 are implemented to determine the target damping force $F_S$ and the ordinary target elastic force $F_H$, respectively. In step S23, the target vertical force $F_B^*$ is determined as a sum of the target damping force $F_S$ and the ordinary target elastic force $F_H$. In step S24, as in step S14 of the above-described preview controlling routine program, the control command value is prepared and then outputted.

Figure 20:
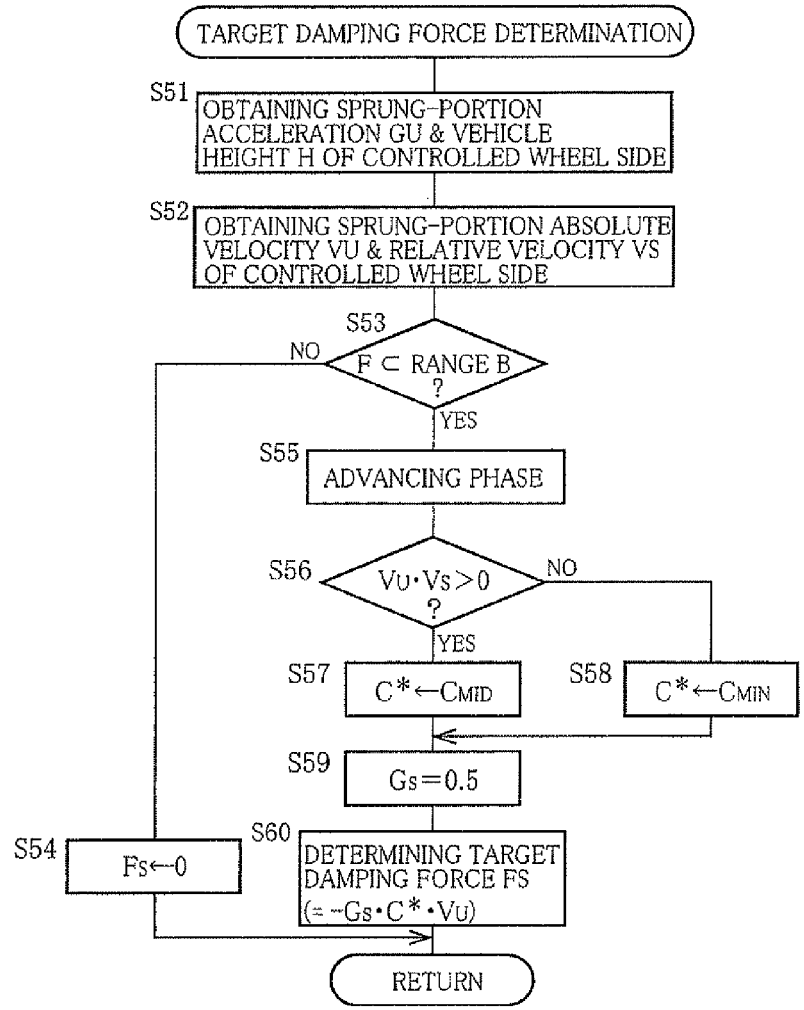
FIG. 20 is a flow chart showing a target damping force determining routine program as a sub-routine program of each of the above-described preview controlling routine program and ordinary controlling routine program.

Step S11 of the preview controlling routine program and step S21 of the ordinary controlling routine program are implemented by execution of a target damping force determining routine program that is shown by the flow chart of FIG. 20. This routine program is initiated with step S51 that is implemented to detect the sprung-portion acceleration $G_U$ an the form of the acceleration of a portion of the vehicle body 14 which corresponds to the controlled wheel 12ij (that is provided by the front or rear wheel), and to detect the vehicle height H in the form of the distance between the portion of the vehicle body 14 that corresponds to the controlled wheel 12$ij$ and the second lower arm 46 provided for the controlled wheel 12$ij$. Then, step S52 is implemented to obtain the sprung-portion absolute velocity $V_U$ by integrating the sprung-portion acceleration $G_U$, and to obtain the sprung/unsprung-portions relative velocity $V_S$ by differentiating the vehicle height H. It is noted that the sprung-portion acceleration $G_U$ is subjected to processing performed by the above-described noise eliminator 250 before being integrated and that the vehicle height H is subjected to processing performed by the phase compensator 260 before being differentiated. Step S52 is followed by step S53 that is implemented to judge whether the frequency f of the vibration of the sprung portion (i.e., the above-described corresponding portion of the vehicle body 14) lies within the range B in which the sprung-portion-velocity-basis control is effectively performable. When the vibration frequency f is outside the range B, the sprung-portion-velocity-basis control is not carried out and the control flow goes to step S54 in which the target damping force $F_S$ is set to zero (0). In the present embodiment, the vibration allowed by the band-pass filter to pass therethrough has the frequency lying within the range B, while the vibration rejected by the band-pass filter has the frequency not lying within the range B. When the frequency f lies within the range B, the control flow goes to step S55 in which the sprung-portion absolute velocity $V_U$ is subjected to the phase advance processing performed in accordance with the third characteristic.

Step S55 is followed by step S56 that is implemented to judge whether a product of the sprung-portion absolute velocity $V_U$ and the relative velocity $V_S$ is a positive value or negative value. When it is a positive value, the damping coefficient C* is set to a predetermined value $C_{MID}$ in step S57. When it is a negative value, the damping coefficient C* is set to a predetermined value $C_{MIN}$ in step S58. Step S57 or step S58 is followed by step S59 in which the gain $G_S$ is set to 0.5. Then, in step S60, the target damping force $F_S$ is determined in accordance with the following expression:

$$F_S = -G_S \cdot C^* \cdot V_U$$

It is noted that the sprung/unsprung-portions relative velocity $V_S$ as well as the sprung-portion absolute velocity $V_U$ is subjected to the phase advance processing before the relative velocity $V_S$ is used for determination of the damping coefficient C*.

Figure 21:
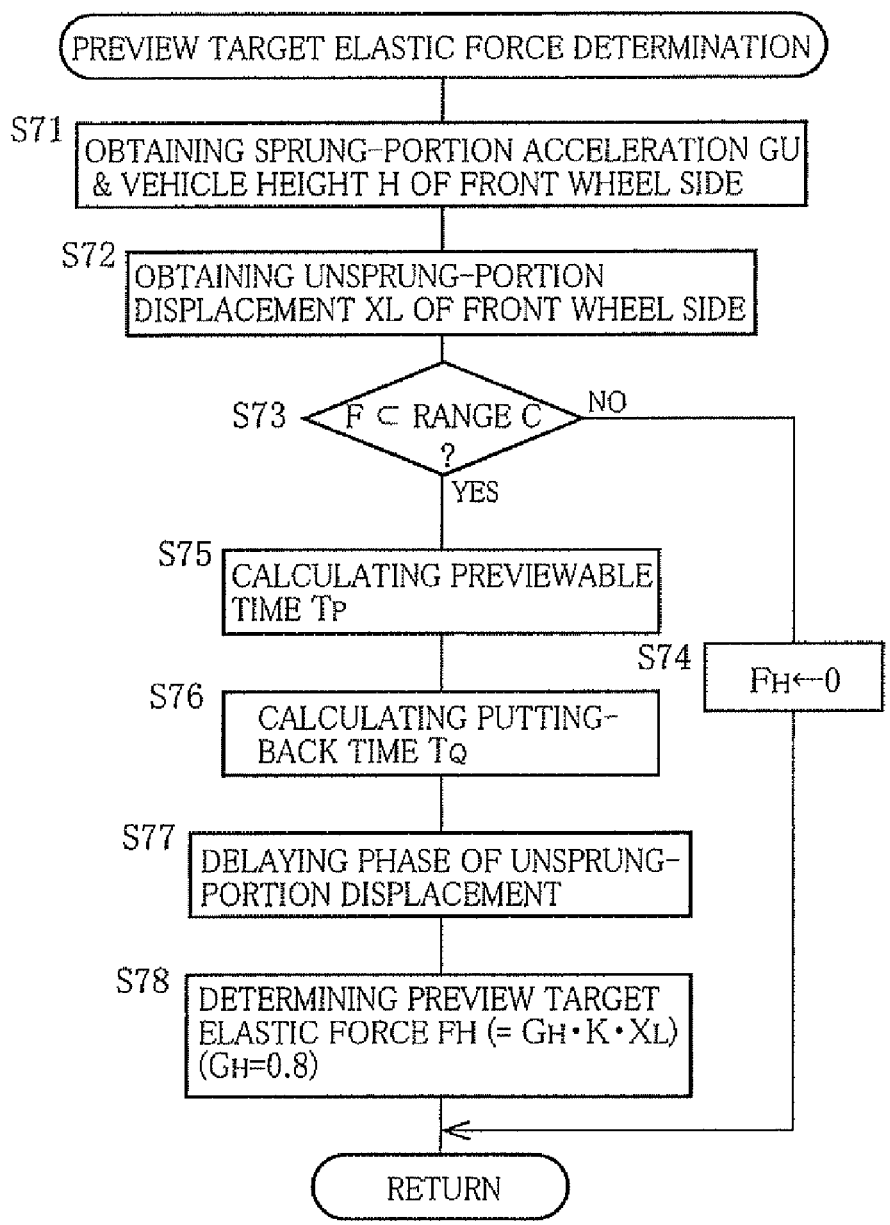
FIG. 21 is a flow chart showing a preview target elastic force determining routine program as a sub-routine program of the above-described preview controlling routine program.

Step S12 of the preview controlling routine program is implemented by execution of a preview target elastic force determining routine program that is shown by the flow chart of FIG. 21. This routine program is initiated with step S71 that is implemented to obtain the sprung-portion acceleration $G_U$ and the vehicle height H. The obtained sprung-portion acceleration $G_U$ is an acceleration of the portion of the vehicle body 14 that corresponds to the front left wheel 12FL in a case in which the controlled wheel is provided by the rear left wheel 12RL, and is an acceleration of the portion of the vehicle body 14 that corresponds to the front right wheel 12FR in a case in which the controlled wheel is provided by the rear right wheel 12RR. The obtained vehicle height H is a distance between the portion of the vehicle body 14 that corresponds to the front left wheel 12FL and the second lower arm 46 provided for the front left wheel 12FL in the case in which the controlled wheel is provided by the rear left wheel 12RL, and is a distance between the portion of the vehicle body 14 that corresponds to the front right wheel 12FR and the second lower arm 46 provided for the front right wheel 12FR in the case in which the controlled wheel is provided by the rear right wheel 12RR. Then, in step S72, the unsprung-portion displacement $X_L$ in the form of the displacement of the second lower arm 46 provided for the front right wheel 12FR or front left wheel 12FL is obtained. Step S73 is implemented to judge whether the frequency f of the vibration of the unsprung portion lies within the preview-control effectively performable range C. When the vibration frequency f is outside the range C, the control flow goes to step S74 in which the preview target elastic force $F_H$ is set to 0 (zero). When the vibration frequency f lies within the range C, step S75 is implemented to calculate the previewable time $T_P$ and step S76 is implemented to calculate the putting-back time $T_Q$. Then, in step S77, the phase of the unsprung-portion displacement $X_L$ (that has been obtained in step S72) is delayed by an amount that corresponds to the putting-back time $T_Q$, i.e., an amount dependent on the putting-back time $T_Q$ and the frequency f. Step S77 is followed by step S78 that is implemented to obtain the preview target elastic force based on the unsprung-portion displacement $X_L$ (that has been subjected to the phase delay processing), modulus K of elasticity and gain $G_H$ (0.8).

$$F_H = G_H \cdot K \cdot X_L$$

It is noted that, upon determination of the preview target elastic force, the unsprung-portion displacement $X_L$ is not subjected to the phase advance processing.

Figure 22:
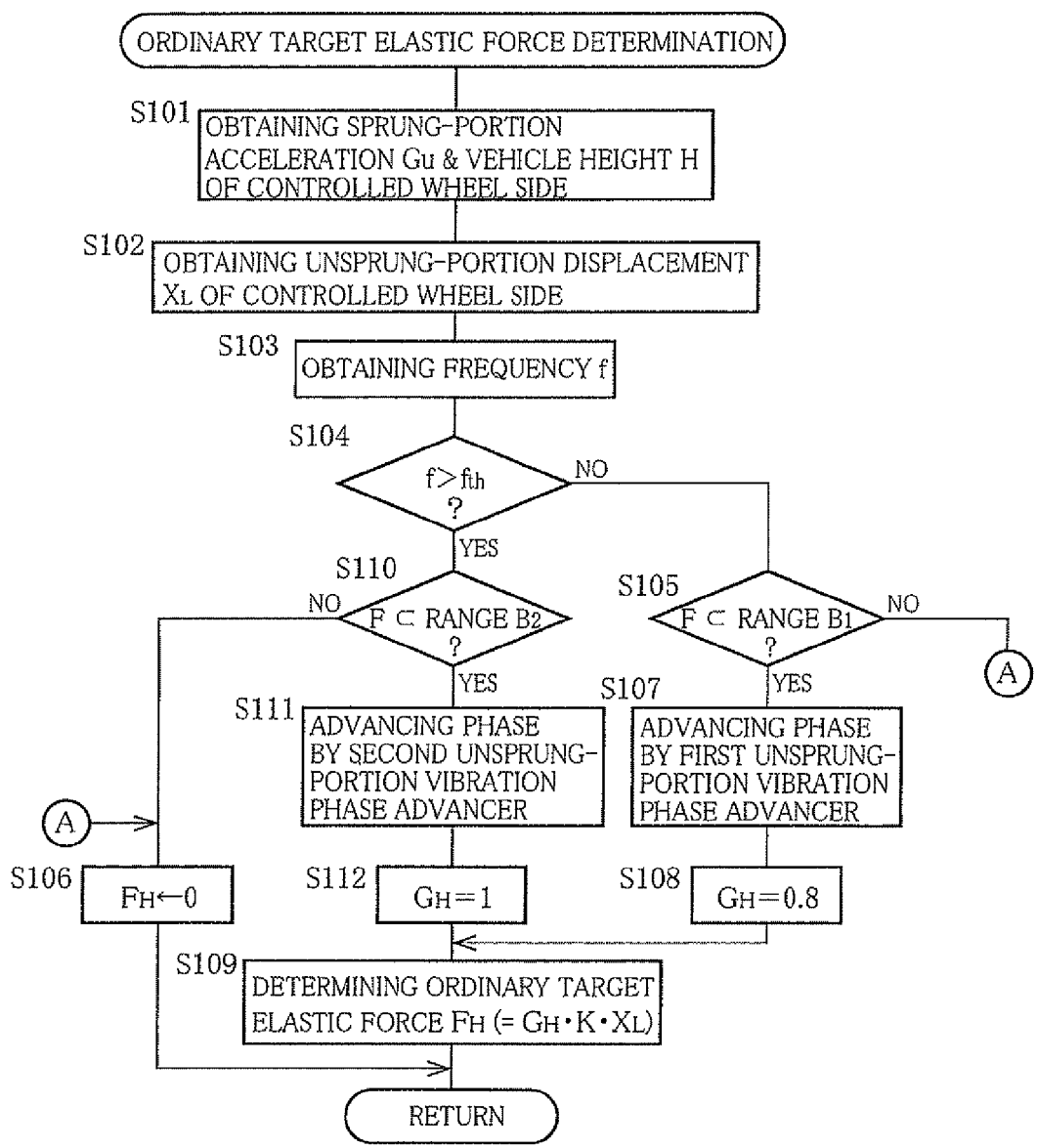
FIG. 22 is a flow chart showing an ordinary target elastic force determining routine program as a sub-routine program of the ordinary controlling routine program.

Step S22 of the preview controlling routine program is implemented by execution of an ordinary target elastic force determining routine program that is shown by the flow chart of FIG. 22. This routine program is initiated with step S101 that is implemented to obtain the sprung-portion acceleration $G_U$ in the form of the acceleration of the portion of the vehicle body 14 that corresponds to the controlled wheel 12$ij$ and the vehicle height H in the form of the distance between the portion of the vehicle body 14 that corresponds to the controlled wheel 12$ij$ and the second lower arm 46 provided for the controlled wheel 12$ij$. Then, in step S102, the unsprung-portion displacement $X_L$ in the form of the displacement of the second lower arm 46 provided for the controlled wheel 12$ij$ is obtained. In step S103, the frequency f of vibration of the second lower arm 46 provided for the controlled wheel 12$ij$ is obtained. Step S104 is implemented to judge whether the vibration frequency f is higher than the predetermined threshold value fth. It is possible to obtain the frequency based on the number of times at which the displacement $X_L$ of the second lower arm 46 becomes 0 (zero) within a predetermined length of time. Further, it is possible to judge whether the frequency of the vibration is higher than the predetermined threshold value fth, by using a filter that allows the vibration having a frequency higher than the predetermined threshold value fth, to pass therethrough. That is, when an output of the filter is larger than a certain level, it is possible to determine the frequency of the vibration inputted to the filter is higher than the predetermined threshold value fth. When the frequency f of the vibration of the second lower arm 46 is not higher than the predetermined threshold value fth, step S105 is implemented to judge whether the vibration frequency f lies within the range $B_1$. When the frequency f is outside the range $B_1$, the control flow goes to step S106 in which the target elastic force $F_H$ is set to 0 (zero). When the frequency f lies within the range $B_1$, the control flow goes to step S107 in which the vibration is subjected to the phase advance processing performed by the first unsprung-portion vibration phase advancer 270. That is, the first unsprung-portion vibration phase advancer 270 is selected so that the phase advance processing is performed in accordance with the first characteristic. Step S107 is followed by step S108 in which the gain $G_H$ is set to 0.8. Then, step S109 is implemented to determine the target elastic force $F_H(=G_H \cdot K \cdot X_L)$.

When the frequency f of the vibration of the second lower arm 46 is higher than the predetermined threshold value fth, namely, a positive judgment (YES) is obtained in step S104, the control flow goes to step S110 that is implemented to judge whether the frequency f lies within the range $B_2$. When the frequency f is outside the range $B_2$, the control flow goes to step S106 in which the target elastic force $F_H$ is set to 0 (zero). When the frequency f lies within the range $B_2$, the control flow goes to step S111 in which the unsprung-portion displacement $X_H$ is subjected to the phase advance processing performed by the second unsprung-portion vibration phase advancer 272. That is, the second unsprung-portion vibration phase advancer 272 is selected so that the phase advance processing is performed in accordance with the second characteristic whereby the phase is advanced by a large degree. Step S111 is followed by step S112 in which the gain $G_H$ is set to 1 (one). Then, in step S109, the target elastic force $F_H$ is obtained.

As described above, when the vibration has frequency close to the sprung-portion resonance frequency, the sprung-portion-velocity-basis control and unsprung-portion-displacement-basis control are both carried out, whereby the vibration of the sprung portion can be satisfactory suppressed. In this case, in principle, the unsprung-portion-displacement-basis control is carried out as the preview control, the vibration of the unsprung portion can be satisfactorily suppressed whereby the vibration of the sprung portion can be satisfactorily suppressed. Further, also in a case in which the unsprung-portion-displacement-basis control is carried out as the ordinary control rather than as the preview control, since the control is carried out based on the unsprung-portion displacement subjected to the phase advance processing, it is possible to satisfactorily suppress the vibration of the unsprung portion having the frequency close to the sprung-portion resonance frequency and accordingly to improve the ride comfort. Further, owing to the phase advance processing, the sprung-portion-velocity-basis control and unsprung-portion-displacement-basis control are performable in a frequency range in which the sprung-portion resonance frequency lies substantially at its center. Therefore, the vibration of the sprung-portion resonance frequency can be satisfactorily suppressed, even if the sprung-portion resonance frequency is somewhat changed due to change in weight of luggage loaded on the vehicle and weight of passenger riding on the vehicle. Further, owing to the provision of the second unsprung-portion vibration phase advancer 272 by which the phase is advanced by a large degree and the first unsprung-portion vibration phase advancer 270 by which the phase is advanced by a small degree, it is possible to select a suitable one of the first and second unsprung-portion vibration phase advancers 270, 272, depending on the frequency level of the vibration. That is, the second unsprung-portion vibration phase advancer 272 is selected when the vibration has a high frequency, and the first unsprung-portion vibration phase advancer 270 is selected when the vibration has a low frequency, so that the vibration of the unsprung portion can be satisfactorily suppressed irrespective of whether the vibration frequency is high or low, whereby the vibration of the sprung portion can be suppressed. Moreover, when the sprung-portion-absolute-velocity-basis control and unsprung-portion-displacement-basis control are both carried out, each of the gains used for the respective controls is set to a value smaller than 1 (one), so that it is possible to further reliably avoid the target rotational angle $\theta_M^*$ from being excessively large and accordingly to avoid an excessive consumption of the energy.

As described above, in the above-described embodiment, the sprung-portion acceleration sensor 196, vehicle height sensor 198, noise elimination 250, phase compensator 260, sprung-portion absolute velocity calculator 252, sprung-portion displacement calculator 258 and unsprung-portion displacement calculator 262 cooperate with each other to constitute a vibration obtaining device. The noise elimination 250, phase compensator 260, sprung-portion absolute velocity calculator 252, sprung-portion displacement calculator 258 and unsprung-portion displacement calculator 262 are included in the suspension ECU 168, and constitute portions of the suspension ECU 168 which are assigned to store and implement steps S51, S52 (see FIG. 20), steps S71, S72 (see FIG. 21) and steps S101, S102 (see FIG. 22). The sprung-portion acceleration sensor 196, noise eliminator 250 and sprung-portion absolute velocity calculator 252 cooperate with each other to constitute a sprung-portion vibration obtaining portion of the vibration obtaining device. The sprung-portion acceleration sensor 196, vehicle height sensor 198, noise eliminator 250, sprung-portion absolute velocity calculator 252, sprung-portion displacement calculator 258, phase compensator 260 and unsprung-portion displacement calculator 262 cooperate with each other to constitute an unsprung-portion vibration obtaining portion of the vibration obtaining device.

The sprung-portion vibration phase advancer 254, first unsprung-portion vibration phase advancer 270 and second unsprung-portion vibration phase advancer 272 cooperate with each other to constitute a processing device, and are assigned to store and implement step S55 (see FIG. 20) and steps S107, S111 (see FIG. 22). The suspension ECU 168 includes portions which are assigned to store and execute the controlling-portion selecting routine program (see FIG. 17), preview controlling routine program (see FIG. 18) and ordinary controlling routine program (see FIG. 19), and which cooperate with each other to constitute the suspension controller that serves also as a vertical-force-generator controlling portion. The suspension ECU 168 includes portions which are assigned to store and implement steps S22-S24 (see FIG. 19) and steps S105-S109 (see FIG. 22) and which cooperate with each other to constitute a first unsprung-portion-vibration-basis controlling portion. The suspension ECU 168 includes portions which are assigned to store and implement steps S22-S24 (see FIG. 19) and steps S109-S112 (see FIG. 22) and which cooperate with each other to constitute a second unsprung-portion-vibration-basis controlling portion. The suspension ECU 168 includes portions which are assigned to store and implement steps S11, S13, S14, S21, S23, S24 (see FIGS. 18 and 19) and which cooperate with each other to constitute a sprung-portion-vibration-basis controlling portion.

The characteristic selector 268 is constituted by portions of the suspension ECU 168 which are assigned to store and implement steps S104, S107, S111 (see FIG. 22), and serves also as a frequency-basis selecting portion. Further, the characteristic selector 268 serves also as a frequency-basis controlling-portion selector, since the characteristic selector 268 selects one of the characteristics whereby the control is performed based on the vibration processed in accordance with the selected one of the characteristics. Moreover, an effectiveness-basis controlling-portion selector is constituted by portions of the suspension ECU 168 which are assigned to store and execute the controlling-portion selecting routine program (see FIG. 17). A sprung-portion-vibration-directed-gain-basis controlling portion is constituted by portions of the suspension ECU 168 which are assigned to store and implement steps S59, S60 (see FIG. 20), steps S11, S13, S14 (see FIG. 18) and steps S21, S23, S24 (see FIG. 19). An unsprung-portion-vibration-directed-gain-basis controlling portion is constituted by portions of the suspension ECU 168 which are assigned to store and implement steps S108, S112, S109 (see FIG. 22) and steps S22-S24 (see FIG. 19).

The suspension may be controlled in a manner different from that in the above-described embodiment. For example, for suppressing vibration of the unsprung portion, the damping force can be controlled based on an unsprung-portion absolute velocity $V_L$ (i.e., absolute velocity of the unsprung portion). In this case, the target vertical force $F_B^*$ may be obtained in accordance with the following expression:

$$F_B^* = G_U \cdot C^* \cdot V_U - G_L \cdot C_L \cdot V_L$$

In the above expression, "$C_L$" represents a damping coefficient that may be a predetermined constant value, and "$G_L$," represents a gain that may be set to 0.8 or 1.0 as in the above-described embodiment.

The damping coefficient $C^*$ used for the sprung-portion-velocity-basis control may be a predetermined constant value. Further, the vertical force may be controlled in a feedback manner.

In the above-described embodiment, the displacement $X_L$ of the unsprung portion is obtained based on the values detected by the sprung-portion acceleration sensor 196 and the vehicle height sensor 198. However, an unsprung-portion acceleration sensor may be provided for detecting acceleration of the unsprung portion, so that the displacement $X_L$ of the unsprung portion is obtained by twice integrating a value $G_L$ detected by the unsprung-portion acceleration sensor. In this case, the frequency of vibration of the unsprung portion can be obtained based on the value $G_L$ detected by the unsprung-portion acceleration sensor or a value (e.g., sprung-portion absolute velocity $V_L$, unsprung-portion displacement $X_L$) that is calculated from the detected value $G_L$. Further, the frequency of vibration of the unsprung portion may be obtained also based on vibration of the sprung portion. For example, between the vibration of the unsprung portion and the vibration of the sprung portion, there is a relationship represented by a predetermined transfer function, so that it is possible to obtain one of the vibration of the sprung portion and the vibration of the unsprung portion and frequency of the one of the vibrations of the sprung and unsprung portions, based on the other of the vibrations of the sprung and unsprung portions, according to the transfer function. Further, each of the phase advancers 254, 270, 272 may be constituted by either at least one filter or electric circuit. Still further, the vibration obtained by the vibration obtaining device may be processed by either execution of a software program or arrangement of a hardware circuit.

Further, in the above-described embodiment, both of the sprung-portion-velocity-basis control and the unsprung-portion-displacement-basis control are carried out by controlling the vertical force generator 24. However, it is possible to modify the above-described embodiment such that the sprung-portion-velocity-basis control and the unsprung-portion-displacement-basis control are carried out by the shock absorber 22 and the vertical force generator 24, respectively. In such a modification of the embodiment, the target vertical force $F_B^*$, which is to be generated by the vertical force generator 24, is a value $F_H$ ($F_B^* = F_H$) that is determined in one of the ordinary target-elastic-force determiner 274 and the preview target-elastic-force determining portion 266. A gain used for determination of the target vertical force $F_B^*$ may be either the same value as in the above-described embodiment or may be set to 1 (one) as a constant value.

Figure 26:
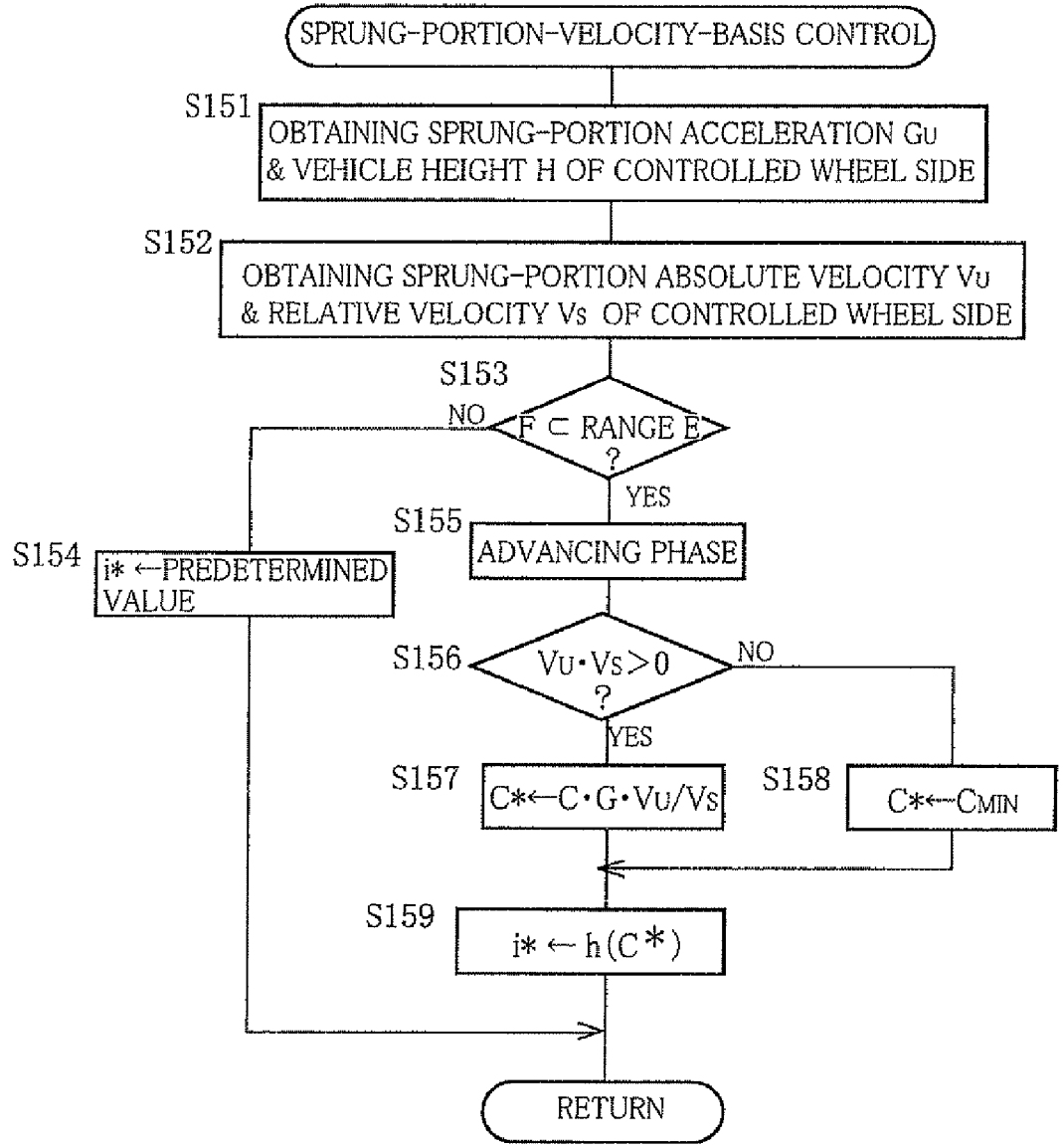
FIG. 26 is a flow chart showing a sprung-portion-velocity-basis controlling routine program that is stored in the storage portion of the suspension control unit.

FIG. 26 is a flow chart showing a sprung-portion-velocity-basis controlling routine program that is executed for controlling the shock absorber 22 so as to carry out the sprung-portion-velocity-basis control, by way of example. This routine program is initiated with step S151 that is implemented to detect the sprung-portion acceleration $G_U$ in the form of the acceleration of a portion of the vehicle body 14 which corresponds to the controlled wheel 12ij, and to detect the vehicle height H in the form of in the form of the distance between the portion of the vehicle body 14 that corresponds to the controlled wheel 12ij and the second lower arm 46 provided for the controlled wheel 12ij. Then, step S152 is implemented to obtain the sprung-portion absolute velocity $V_U$ and the sprung/unsprung-portions relative velocity $V_S$. Step S152 is followed by step S153 that is implemented to judge whether the frequency f of the vibration of the sprung portion (i.e., the above-described corresponding portion of the vehicle body 14) lies within an effectively controllable range E that is dependent on, for example, responsiveness of the shock absorber 22. When the vibration frequency f is outside the range E, the control flow goes to step S154 in which the supplied electric current i is set to a predetermined value (e.g., zero). When the frequency f lies within the range E, the control flow goes to step S155 in which the phase is advanced by a small degree. In steps S156 through S158, the target damping coefficient $C^*$ is determined based on a product of the sprung-portion absolute velocity $V_U$ and the sprung/unsprung-portions relative velocity $V_S$. In this modified embodiment, when the product is a positive vale, the target damping coefficient $C^*$ is set to a value ($C \cdot V_U / V_S$). When the product is a negative value, the target damping coefficient $C^*$ is set to a value $C_{MIN}$. Then, step S159 is implemented to determine the supplied electric current i* that makes it possible to obtain the determined target damping coefficient $C^*$ and then to output the determined electric current i*. The supplied electric current i* is determined in accordance with the following expression:

$$i^* = h(C^*)$$

wherein "h" represents a function.

The supplied electric current i* corresponds to the control command value, and the control command value representing the supplied electric current i* is supplied to the inverter 222. In this control of the shock absorber 22, the electric current is supplied to the electric motor 90 irrespective of increase and reduction of the damping coefficient $C^*$, since the electric power consumed by the electric motor 90 is small. In this modified embodiment, the phase advance processing is not essential since the responsiveness of the shock absorber 22 is higher than that of the vertical force generator 24. However, it is possible to reduce or eliminate influence of the response delay, by carrying out the phase advance processing. Further, the controllable frequency range E is wider than the controllable frequency ranges in the vertical force generator 24, so that the sprung-portion-velocity-basis control can be effectively performable over the wide frequency range of vibration.

Further, the suspension, to which the present invention is applicable, is not limited to details of the above-described embodiment. For example, the suspension may include a hydraulic cylinder device that is disposed in parallel with the coil spring 20 between the sprung and unsprung portions of the vehicle. In this case, by controlling a hydraulic pressure of the hydraulic cylinder device, it is possible to control the vertical force acting between the sprung and unsprung portions.

Figure 27:
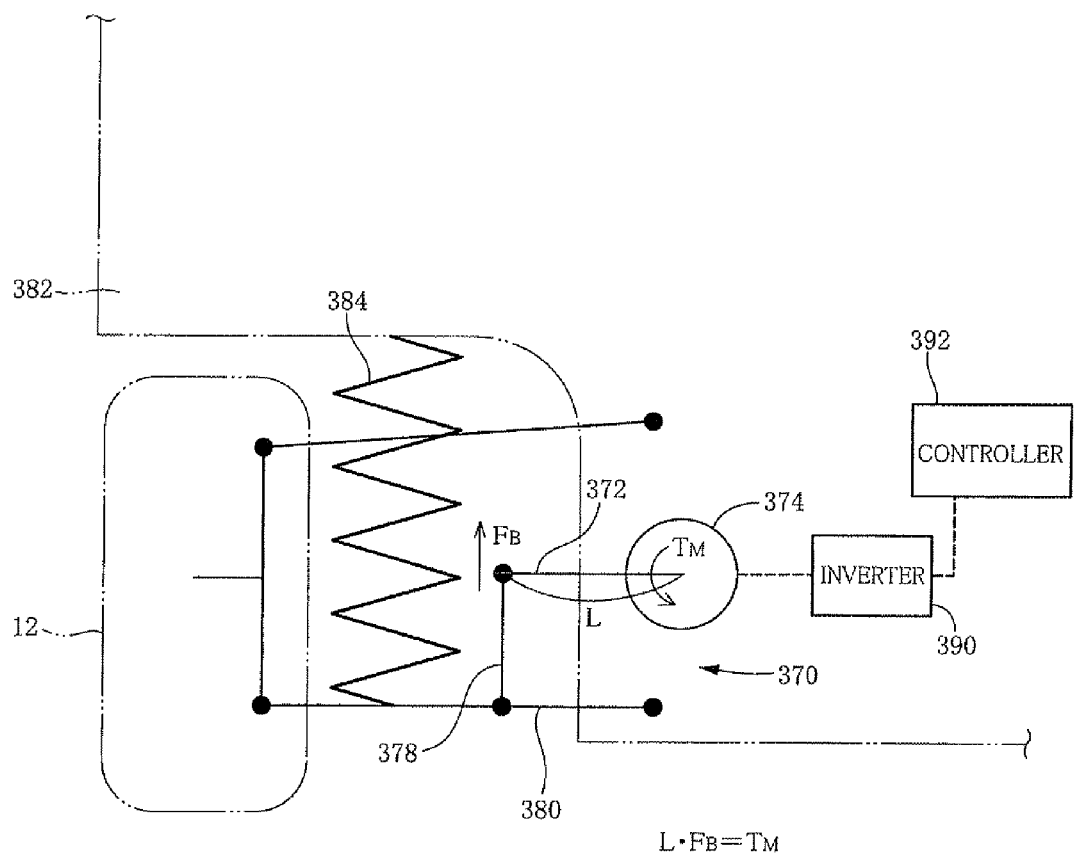
FIG. 27 is view conceptually showing another suspension that can be included in the suspension system.

Further, the present invention is applicable also to control of a suspension shown in FIG. 27. In the present embodiment, a vertical force generator 370 includes a straight rod 372 in place of the L-shaped bar. The straight rod 372 is connected at one of its opposite end portions to an actuator 374, and is connected at the other of its opposite end portions to an unsprung portion 380 via a linkage member 378. The actuator 374 is attached to a sprung portion 382 in the form of the vehicle body. The straight rod 372 is disposed between the sprung portion 382 and the unsprung portion 380. A coil spring 384 also is disposed between the sprung portion 382 and the unsprung portion 380 so that the coil spring 384 and the straight rod 372 as an elastic member are disposed in parallel with each other. The actuator 374 includes an electric motor and a speed reducer, such that the rod 372 is connected to an output shaft of the electric motor via the speed reducer so as to receive a motor torque $T_M$ that is applied by activation of the electric motor. Further, since a bending movement $L \cdot F_B^*$ applied to the straight rod 372 becomes equal to the motor torque $T_M$ applied to the rod 372, a reaction force $F_B^*$ can be obtained in accordance with the following expression:

$$F_B^* T_M/L$$

The reaction force $F_B^*$ is a force acting against the force $F_B^*$ that is applied to the unsprung portion 380 by the vertical force generator 370. The actuator 374 is connected, via an inverter 390, to a controller 392 that is principally constituted by a computer. As in the above-described embodiment, for example, the sprung-portion acceleration sensors, vehicle height sensors, wheel-turning amount sensors, operating-amount sensor and brake ECU are connected to the controller 392. The inverter 390 is controlled based on commands supplied from the controller 392, so as to control an output torque of the electric motor 374. As in the above-described embodiments, the target vertical force $F_B^*$ may be a sum of the elastic force $F_H$ dependent on the displacement of the unsprung portion and the damping force $F_S$ dependent on the absolute velocity of the sprung portion, as expressed by the following expression:

$$F_B^* = (G \cdot K \cdot X_L) + (-G \cdot C \cdot V_U)$$

While the presently preferred embodiments of the invention have been described above in detail by reference to the accompanying drawings, for illustrative purpose only, it is to be understand that the construction of the suspension and the control of the suspension are not limited to the details described above and that that the present invention may be embodied with various other changes, modifications and improvements, such as those described in the SUMMARY OF THE INVENTION, which may occur to those skilled in the art.

The invention claimed is:
1. A suspension system comprising:
(a) a vibration obtaining device configured to obtain vertical vibration of each of at least one of a sprung portion and an unsprung portion of a vehicle;
(b) a processing device configured to subject the obtained vibration to a phase advance processing, and having a plurality of characteristics different from each other with respect to a degree by which a phase of the obtained vibration is advanced;
(c) a characteristic selector configured to select one of the plurality of characteristics, based on frequency of the obtained vibration of each of at least one of the sprung and unsprung portions, whereby the obtained vibration is subjected to the phase advance processing that is performed in accordance with the selected one of the plurality of characteristics of said processing device;
(d) a suspension controller configured to control a suspension disposed between the sprung and unsprung portions, based on the vibration subjected to the phase advance processing;
wherein said vibration obtaining device includes an unsprung-portion vibration obtaining portion configured to obtain the vibration of the unsprung portion,
wherein said processing device has first and second characteristics as the plurality of characteristics, such that the phase of the obtained vibration is advanced by a larger degree when the phase advance processing is performed in accordance with the second characteristic, than when the phase advance processing is performed in accordance with the first characteristic,
and where said characteristic selector includes a frequency-basis selecting portion configured to select the first characteristic when the frequency of the obtained vibration of the unsprung portion is lower than a predetermined threshold value, and to select the second characteristic when the frequency of the obtained vibration of the unsprung portion is not lower than the predetermined threshold value, such that the obtained vibration of the unsprung portion is subjected to the phase advance processing that is performed in accordance with the first characteristic when the frequency of the obtained vibration of the unsprung portion is lower than the predetermined threshold value, and such that the obtained vibration of the sprung portion is subjected to the phase advance processing that is performed in accordance with the second characteristic when the frequency of the obtained vibration of the unsprung portion is not lower than the predetermined threshold value.

2. The suspension system according to claim 1, wherein said suspension controller includes: (d-1) a first unsprung-portion-vibration-basis controlling portion configured, when the frequency of the obtained vibration of the unsprung portion is lower than the predetermined threshold value, to control the suspension based on the vibration of the unsprung portion that has been subjected to the phase advance processing performed in accordance with the first characteristic of said processing device; and (d-2) a second unsprung-portion-vibration-basis controlling portion configured, when the frequency of the obtained vibration of the unsprung portion is not lower than the predetermined threshold value, to control the suspension based on the vibration of the unsprung portion that has been subjected to the phase advance processing performed in accordance with the second characteristic of said processing device.

3. The suspension system according to claim 1,
wherein said vibration obtaining device includes a sprung-portion vibration obtaining portion configured to obtain the vertical vibration of the sprung portion,
wherein said processing device has a third characteristic as one of the plurality of characteristics, such that the phase of the obtained vibration is advanced by a smaller degree when the phase advance processing is performed in accordance with the third characteristic, than when the phase advance processing is performed in accordance with the second characteristic,
and wherein said suspension controller includes an sprung-portion-vibration-basis controlling portion configured to control the suspension based on the vibration of the sprung portion that has been subjected to the phase advance processing performed in accordance with the third characteristic of said processing device.

4. The suspension system according to claim 3, wherein said suspension controller includes: (d-1) a first unsprung-portion-vibration-basis controlling portion configured, when the frequency of the obtained vibration of the unsprung portion is lower than the predetermined threshold value, to control the suspension based on the vibration of the unsprung portion that has been subjected to the phase advance processing performed in accordance with the first characteristic of said processing device; and (d-2) a second unsprung-portion-vibration-basis controlling portion configured, when the frequency of the obtained vibration of the unsprung portion is not lower than the predetermined threshold value, to control the suspension based on the vibration of the unsprung portion that has been subjected to the phase advance processing performed in accordance with the second characteristic of said processing device, said suspension system comprising (e) a frequency-basis controlling-portion selector including at least one of (e-1) a first selecting portion configured, when the frequency of the obtained vibration of the unsprung portion is lower than the predetermined threshold value, to select said sprung-portion-vibration-basis controlling portion and said first unsprung-portion-vibration-basis controlling portion and (e-2) a second selecting portion configured, when the frequency of the obtained vibration of the unsprung portion is not lower than the predetermined threshold value, to select said second unsprung-portion-vibration-basis controlling portion, such that the suspension is controlled by cooperation of said sprung-portion-vibration-basis controlling portion and said first unsprung-portion-vibration-basis controlling portion when the frequency of the obtained vibration of the unsprung portion is lower than the predetermined threshold value, and such that the suspension is controlled by said second unsprung-portion-vibration-basis controlling portion when the frequency of the obtained vibration of the unsprung portion is not lower than the predetermined threshold value.

5. The suspension system according to claim 3, wherein said suspension controller includes: (d-1) a first unsprung-portion-vibration-basis controlling portion configured to control the suspension based on the vibration of the unsprung portion that has been subjected to the phase advance processing performed in accordance with the first characteristic of said processing device; and (d-2) a second unsprung-portion-vibration-basis controlling portion configured to control the suspension based on the vibration of the unsprung portion that has been subjected to the phase advance processing performed in accordance with the second characteristic of said processing device, said suspension system comprising (f) a resonance-frequency- basis controlling-portion selector including at least one of (f-1) a first selecting portion configured, when the frequency of the obtained vibration of the unsprung portion is in a first frequency range including a resonance frequency of the sprung portion, to select the sprung-portion-vibration-basis controlling portion and the first unsprung-portion-vibration-basis controlling portion and (f-2) a second selecting portion configured, when the frequency of the obtained vibration of the unsprung portion is in a second frequency range including a resonance frequency of the unsprung portion, to select the second unsprung-portion-vibration-basis controlling portion, such that the suspension is controlled by cooperation of said sprung-portion-vibration-basis controlling portion and said first unsprung-portion-vibration-basis controlling portion when the frequency of the obtained vibration of the unsprung portion is in the first frequency range, and such that the suspension is controlled by said second unsprung-portion-vibration-basis controlling portion when the frequency of the obtained vibration of the unsprung portion is in the second frequency range.

6. The suspension system according to claim 3, wherein said suspension controller includes: (d-1) a first unsprung-portion-vibration-basis controlling portion configured to control the suspension based on the vibration of the unsprung portion that has been subjected to the phase advance processing performed in accordance with the first characteristic of said processing device; and (d-2) a second unsprung-portion-vibration-basis controlling portion configured to control the suspension based on the vibration of the unsprung portion that has been subjected to the phase advance processing performed in accordance with the second characteristic of said processing device, wherein said sprung-portion-vibration-basis controlling portion includes a sprung-portion-vibration-directed-gain-basis controlling portion configured to control the suspension based on a sprung-portion-vibration-directed gain, wherein said first unsprung-portion-vibration-basis controlling portion includes an unsprung-portion-vibration-directed-gain- basis controlling portion configured to control the suspension based on an unsprung-portion-vibration-directed gain, and wherein the unsprung-portion-vibration-directed gain is larger than the sprung-portion-vibration-directed gain when said first unsprung-portion-vibration-basis controlling portion cooperates with said sprung-portion-vibration-basis controlling portion to control the suspension.

7. The suspension system according to claim 1, wherein said vibration obtaining device includes an unsprung-portion vibration predicting portion configured to predict, based on at least one value detected by at least one sensor which is provided in the vehicle and which is configured to detect a detected portion, the vertical vibration of a wheel holding portion of the unsprung portion which holds a wheel of the vehicle and which is located on a rear side of the detected portion, and wherein said suspension controller includes a preview controlling portion configured to control, based on the predicted vibration of the wheel holding portion of the unsprung portion, the suspension that is provided for the wheel.

8. The suspension system according to claim 7, wherein said suspension controller includes: (d-1) a first unsprung-portion-vibration-basis controlling portion configured to control the suspension based on the vibration of the unsprung portion that has been subjected to the phase advance processing performed in accordance with the first characteristic of said processing device; and (d-2) a second unsprung-portion-vibration-basis controlling portion configured to control the suspension based on the vibration of the unsprung portion that has been subjected to the phase advance processing performed in accordance with the second characteristic of said processing device, said suspension system comprising:

(g) a preview-control effectiveness judger configured to judge whether the suspension is effectively controllable by said preview controlling portion; and (h) an effectiveness-basis controlling-portion selector which is configured, when it is judged by said judger that the suspension is effectively controllable by said preview controlling portion, to select said preview controlling portion and said sprung-portion-vibration-basis controlling portion, and which is configured, when the suspension is not effectively controllable by said preview controlling portion, to select (α) said sprung-portion-vibration-basis controlling portion and/or (β) an unsprung-portion-vibration-basis controlling portion that is provided by one of the first and second unsprung-portion-vibration-basis controlling portions.

9. The suspension system according to claim 7, wherein said unsprung-portion vibration predicting portion includes a phase delaying portion that is configured to delay the phase of the predicted vibration of the wheel holding portion of the unsprung portion, by an amount corresponding to a length of time that is dependent on a running speed of the vehicle and a response delay time by which initiation of working of the suspension in accordance with a control command value is to be retarded after output of the control command value supplied to the suspension.

10. The suspension system according to claim 1,
wherein said suspension includes a vertical force generator which is disposed between the sprung and unsprung portions and which is configured to generate a vertical force,
and wherein said suspension controller includes a vertical-force-generator controlling portion configured to control the vertical force by electrically controlling the vertical force generator.

11. The suspension system according to claim 10,
wherein said vertical force generator includes a damping force generator configured to generate a damping force,
wherein said vibration obtaining device is configured to obtain an absolute vertical velocity of the sprung portion and a relative vertical velocity of the sprung and unsprung portions,
wherein said vertical-force-generator controlling portion includes a target-damping-force determining portion and a damping-force controlling portion,
wherein said target-damping-force determining portion is configured to determine a target damping force based on at least one of the absolute vertical velocity of the sprung portion and the relative vertical velocity of the sprung and unsprung portions,
and wherein said damping-force controlling portion is configured to control said damping force generator such that said damping force generator outputs the target damping force determined by said target-damping-force determining portion.

12. The suspension system according to claim 10,
wherein said vertical force generator includes an elastic force generator configured to generate an elastic force,
wherein said vibration obtaining device is configured to obtain an amount of vertical displacement of the unsprung portion, based on an amount of vertical displacement of the sprung portion and an amount of relative vertical displacement of the sprung and unsprung portions,
wherein said vertical-force-generator controlling portion includes a target-elastic-force determining portion and an elastic-force controlling portion,
wherein said target-elastic-force determining portion is configured to determine a target elastic force based on the amount of the vertical displacement of the unsprung portion,
and wherein said elastic-force controlling portion is configured to control said elastic force generator such that said elastic force generator outputs the target elastic force determined by said target-elastic-force determining portion.

13. The suspension system according to claim 10,
wherein the vertical force generator includes an elastic member having opposite end portions such that one of said opposite end portions is connected to the sprung portion while the other of said opposite end portions is connected to the unsprung portion,
wherein the vertical force generator includes a drive source configured to elastically deform the elastic member against a restoring force of said elastic member,
and wherein said vertical-force-generator controlling portion includes an elastic-deformation-amount controlling portion configured to control an amount of elastic deformation of said elastic member by controlling said drive source, so as to control the vertical force.

14. The suspension system according to claim 10,
wherein said vertical force generator includes a first elastic member disposed in parallel with a suspension spring that serves as a second elastic member,
and wherein said suspension spring as well as said first elastic member is disposed between the sprung portion and the unsprung portion.

15. The suspension system according to claim 2,
wherein said suspension includes an elastic force generator configured to generate an elastic force between the sprung and unsprung portions,
wherein said suspension controller includes an unsprung-portion-displacement-basis elastic-force controlling portion configured to control the elastic force based on the amount of vertical displacement of the unsprung portion,
and wherein said first unsprung-portion-vibration-basis controlling portion and said second unsprung-portion-vibration-basis controlling portion are included in said unsprung-portion-displacement-basis elastic-force controlling portion.

* * * * *